US 8,199,794 B2

(12) United States Patent
Bauch et al.

(10) Patent No.: US 8,199,794 B2
(45) Date of Patent: Jun. 12, 2012

(54) METHOD, APPARATUS AND SYSTEM FOR CHANNEL ESTIMATION IN TWO-WAY RELAYING NETWORKS

(75) Inventors: Gerhard Bauch, Munich (DE); Marc Kuhn, Zurich (CH); Armin Wittneben, Niederrohrdorf (CH); Jian Zhao, Zurich (CH)

(73) Assignee: NTT DoCoMo, Inc., Tokyo (JP)

( * ) Notice: Subject to any disclaimer, the term of this patent is extended or adjusted under 35 U.S.C. 154(b) by 723 days.

(21) Appl. No.: 12/319,583

(22) Filed: Jan. 9, 2009

(65) Prior Publication Data
US 2009/0190634 A1    Jul. 30, 2009

(30) Foreign Application Priority Data

Jan. 11, 2008   (EP) ..................................... 08000511

(51) Int. Cl.
*H04B 3/36* (2006.01)
(52) U.S. Cl. ....................................................... 375/211
(58) Field of Classification Search .................. 375/211, 375/212, 213; 455/7, 11.1; 370/315, 338
See application file for complete search history.

(56) References Cited

U.S. PATENT DOCUMENTS

| | | | |
|---|---|---|---|
| 5,596,439 A | 1/1997 | Dankberg et al. | |
| 7,933,549 B2 * | 4/2011 | Larsson | ............................ 455/7 |
| 2007/0160014 A1 * | 7/2007 | Larsson | ........................ 370/338 |

FOREIGN PATENT DOCUMENTS

| | | |
|---|---|---|
| EP | 1 850 509 A1 | 10/2007 |
| JP | 11-510344 T | 9/1999 |
| WO | 97/05711 A1 | 2/1997 |

OTHER PUBLICATIONS

Larsson, et al., "Coded Bi-directional Relaying," IEEE VTC, Vehicular Technical Conference, XP002489802, 2:851-855 (2006).
Rankov, et al., "Spectral efficient protocols for half-duplex fading relay channels," IEEE Journal, XP011168575, 25:379-389 (2007).
C.K. Ho, B. Farfang-Boroujeny, and F. Chin, Added Pilot Semi-Blind Channel Estimation Scheme for OFDM in Fading Channels, 2001, IEEE.
H. Zhu, B. Farhang-Boroujeny, and C. Schlegel, Pilot Embedding for Joint Channel Estimation and Data Detection in MIMO Communication Systems, 2003, IEEE.
B. Rankov and A. Wittneben, Spectral Efficient Protocols for Half-Duplex Fading Relay Channels, 2007, IEEE.
P. Larsson, N. Johansson, and K. Sunell, Coded Bi-directional Relaying, 2006, IEEE.
E. Telatar, Capacity of Multi-antenna Gaussian Channels, 1999, Communication Theory.

(Continued)

*Primary Examiner* — Khai Tran
(74) *Attorney, Agent, or Firm* — Nutter McClennen & Fish LLP; John J. Penny, Jr.; Christina M. Sperry

(57) ABSTRACT

An apparatus for estimating a wireless radio channel between a first terminal and a relay station, the apparatus including a receiver for receiving a signal including a superposition of previously transmitted first information from the first terminal and second information from a second terminal, the second terminal also communicating with the relay station, a storage for storing the previously transmitted first information, and a channel calculator for calculating the wireless radio channel using the received signal and the stored first information as pilot information for the received signal.

15 Claims, 35 Drawing Sheets

OTHER PUBLICATIONS

R. Pabst et. al., Relay-Based Deployment Concepts for Wireless and Mobile Broadband Radio, 2004, IEEE Communications.

Zhao et. al., Coverage Analysis for Cellular Systems with Multiple Antennas Using Decode-and-Forward Relays.

J. N. Laneman et al., Cooperative Diversity in Wireless Networks: Efficient Protocols and Outage Behavior, 2004, IEEE.

M. Biguesh and A. Gershman, Training-Based MIMO Channel Estimation: A Study of Estimator Tradeoffs and Optimal Training Signals, 2006, IEEE.

X. Deng, A. Haimovich, and J. Garcia-Frias, Decision Directed Iterative Channel Estimation of MIMO Systems, 2003, IEEE.

I. Hammerstrom et. al., MIMO Two-way Relaying with Transmit CSI at the Relay.

T. Oechtering, Broadcast Capacity Region of Two-phase Bidirectional Relaying, 2008, IEEE.

Verdu, Multiuser Detection, 1998, pp. 10, 344-361, 371.

Tse and Viswanath, Fundamentals of Wireless Communications, 2005, pp. 361-363, 426-433.

Kay, Fundamentals of Statistical Signal Processing, 1993, pp. 223, 226.

Japanese Office Action, Feb. 14, 2011.

* cited by examiner (a) First phase (b) Second phase

Using orthogonal or non-orthogonal pilots to estimate the channel

Using self-interference to improve pilot estimated channel

FIG 6
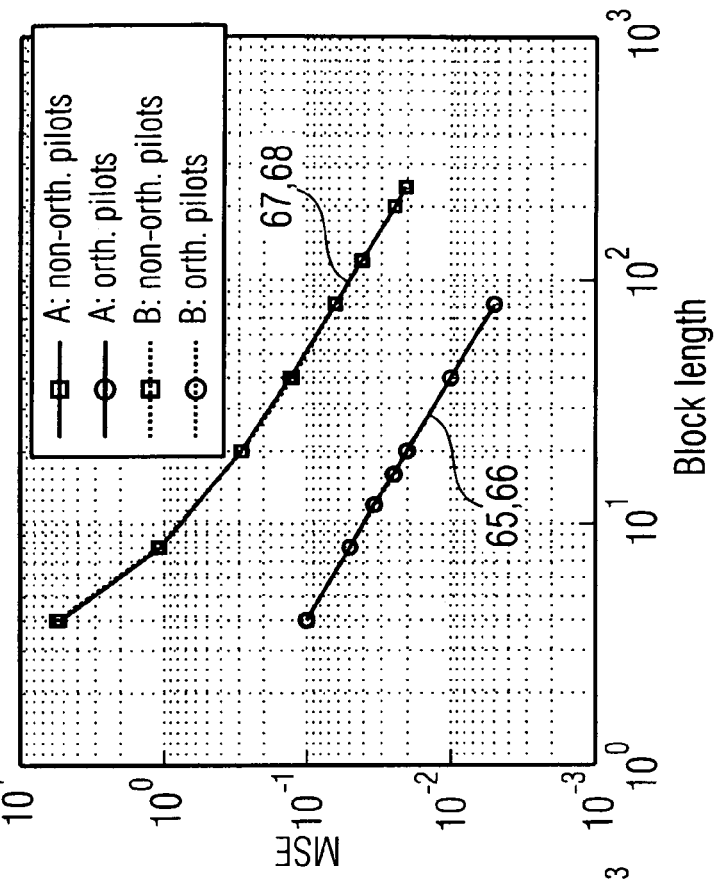
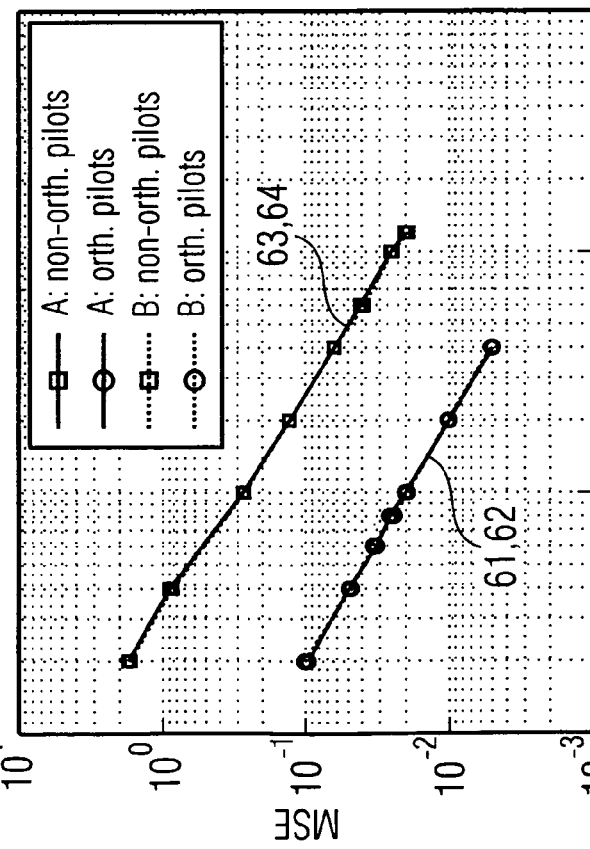

FIG 8
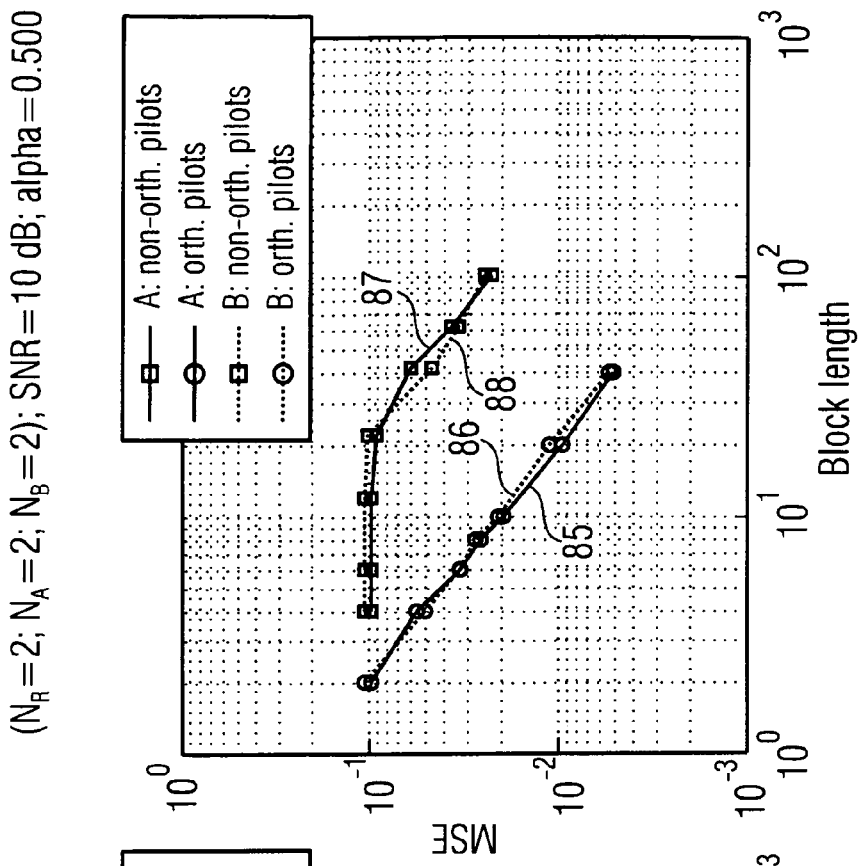
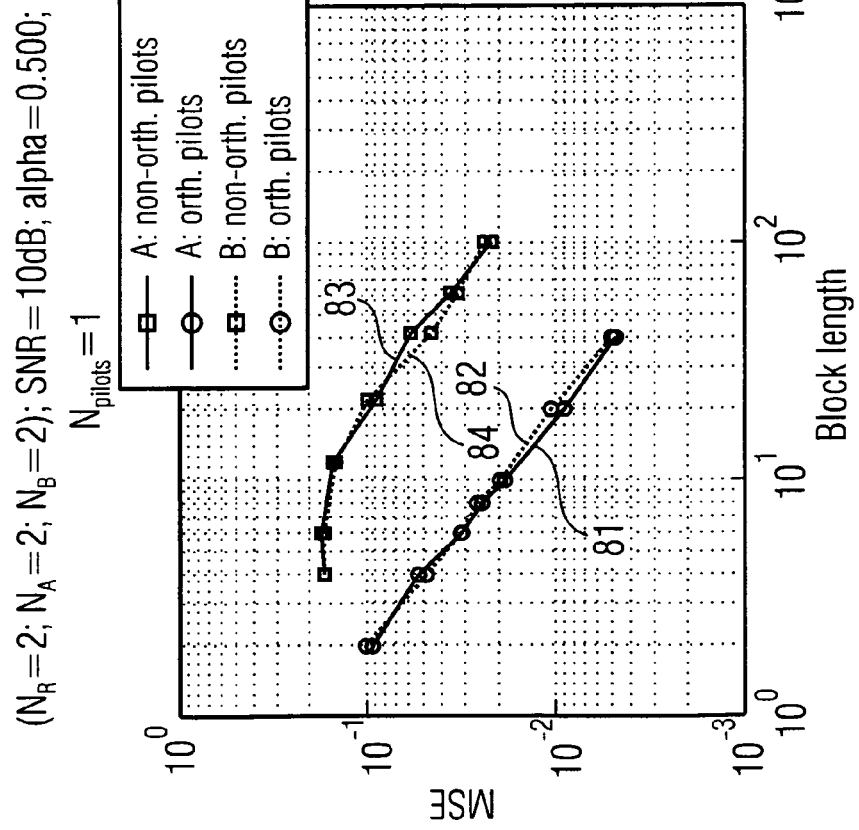

FIG 9
(A)
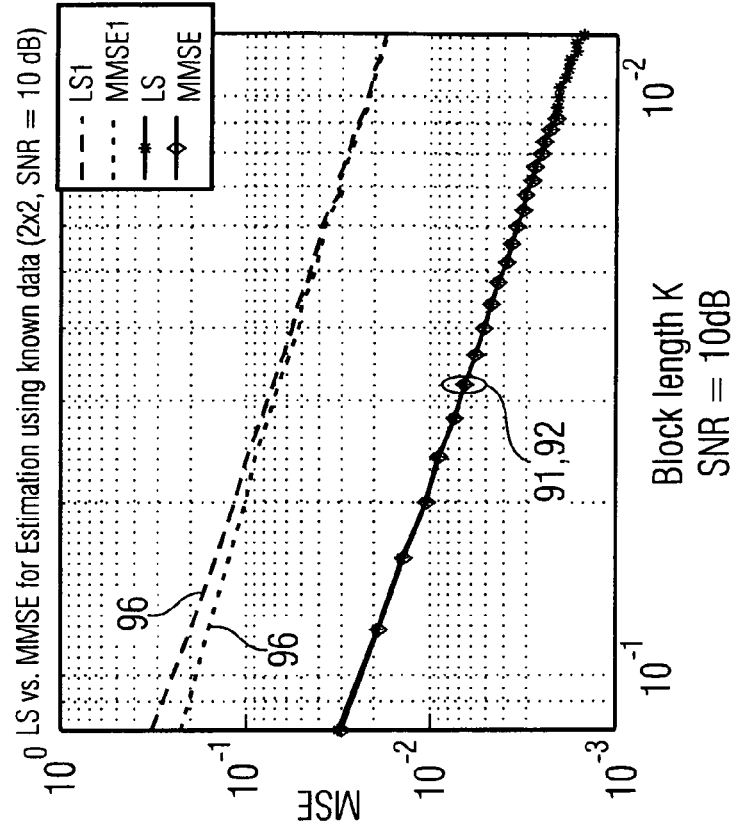
(B)
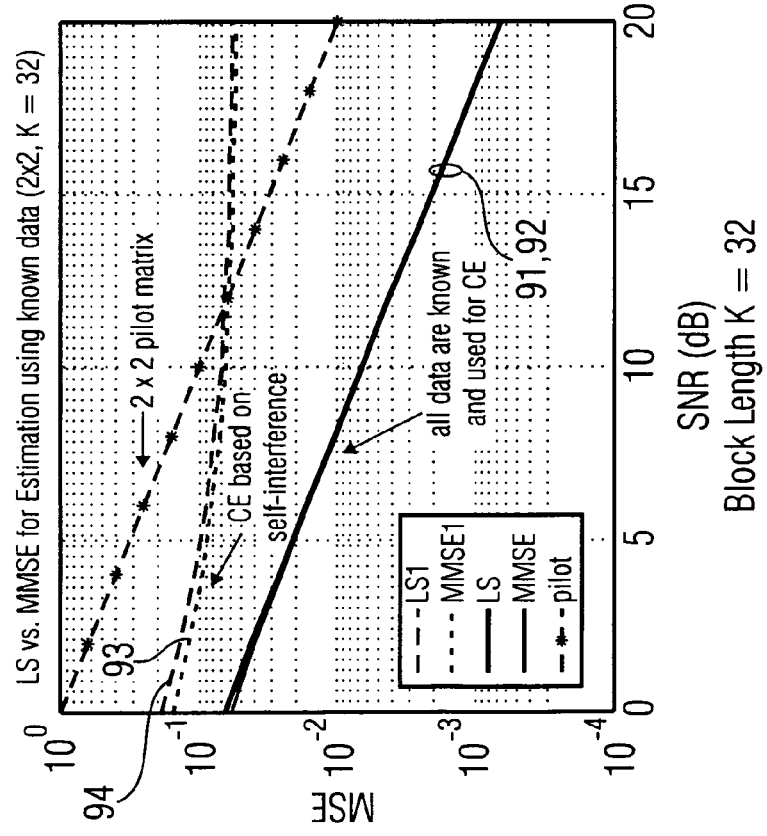
LS vs. MMSE for estimation using known data in a 2 × 2 block fading channel. The dashed lines represent channel estimation using only the self-interference while the solid lines represent channel estimation using the perfect transmitted data.

FIG 13
(A)
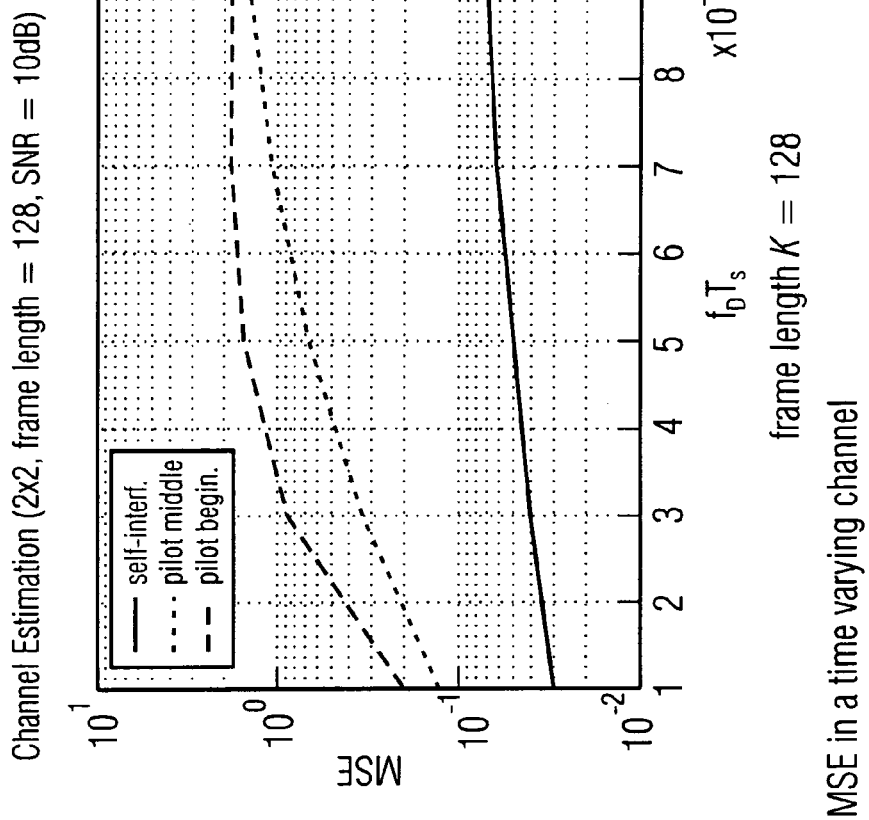
(B)
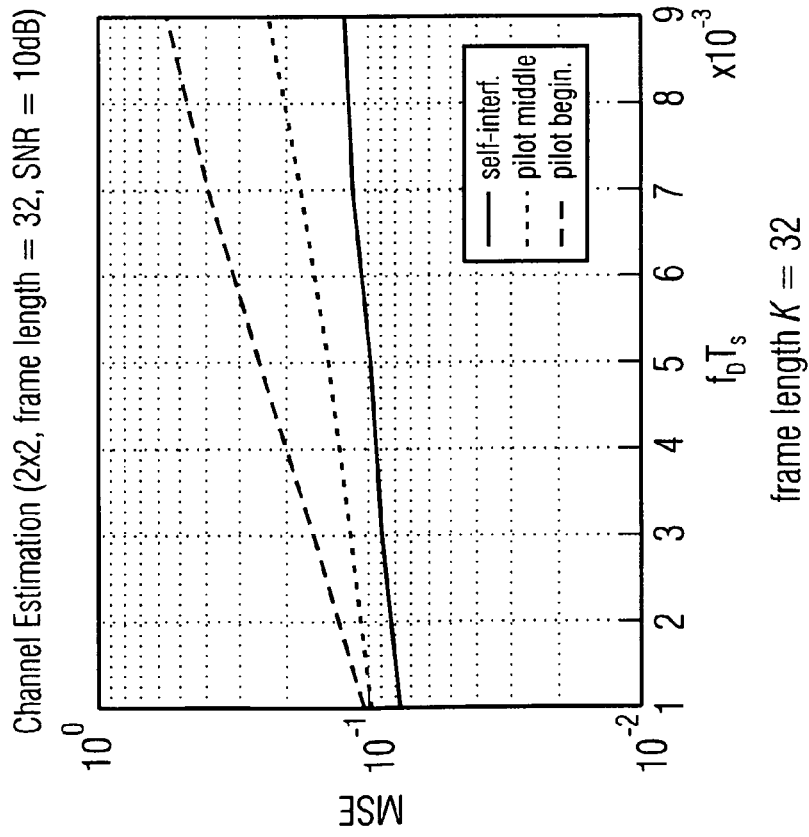
Initial channel estimation MSE in a time varying channel

FIG 14
(A)
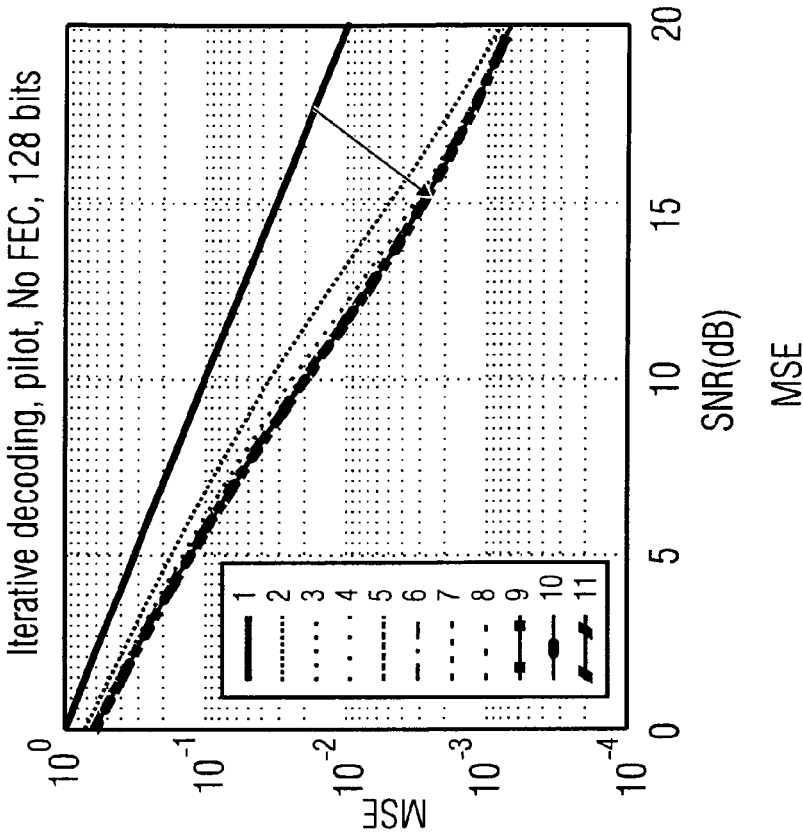
(B)
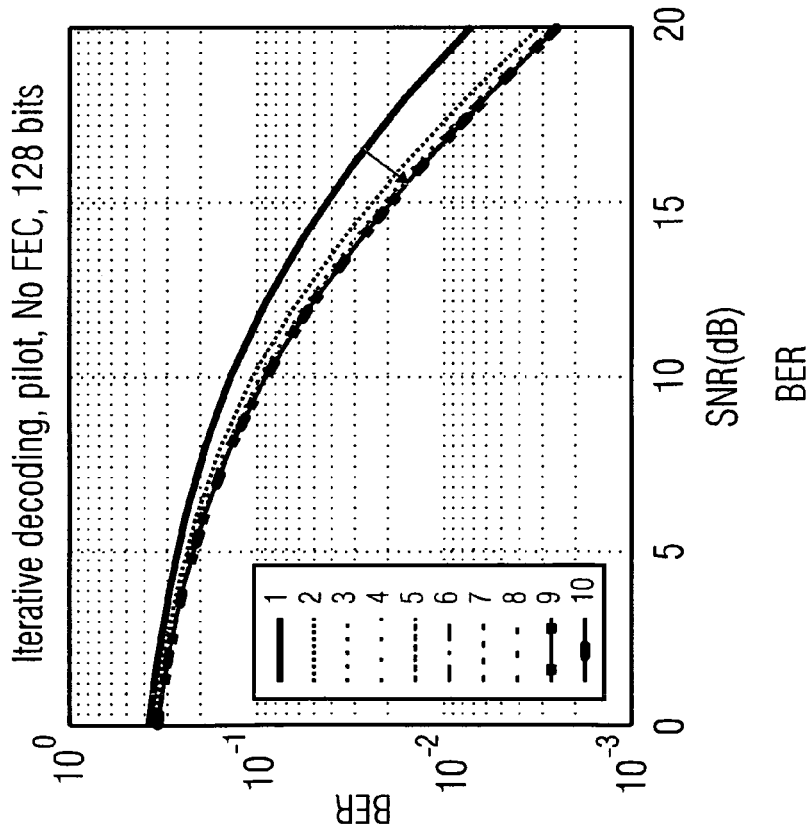
Pilot assisted iterative LS channel estimation in block fading channel (K =32)

FIG 15
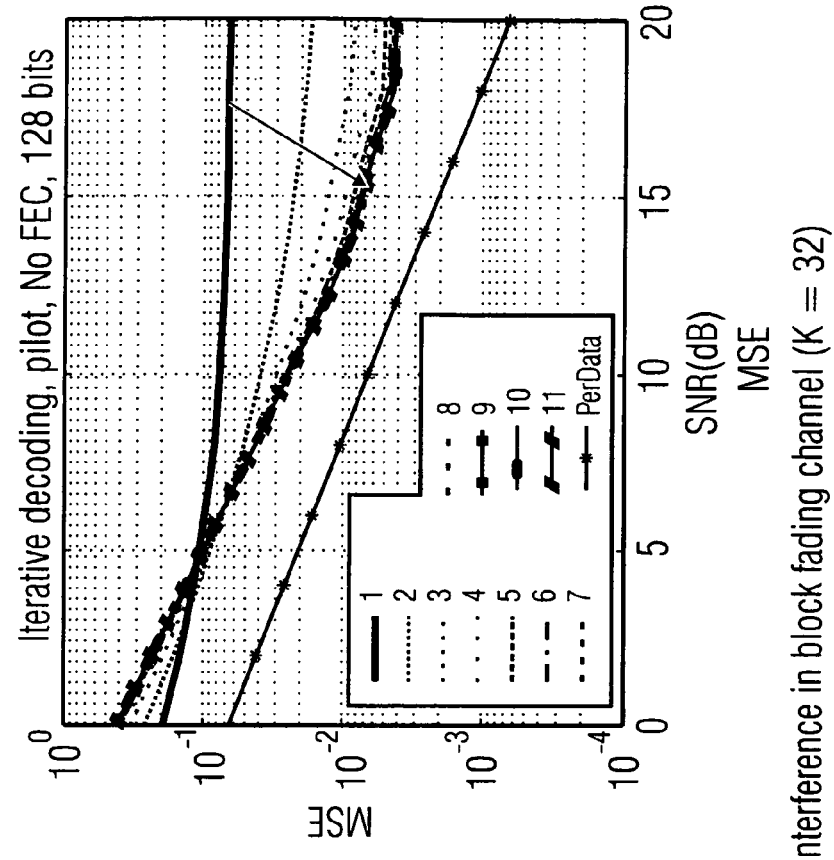
(B)
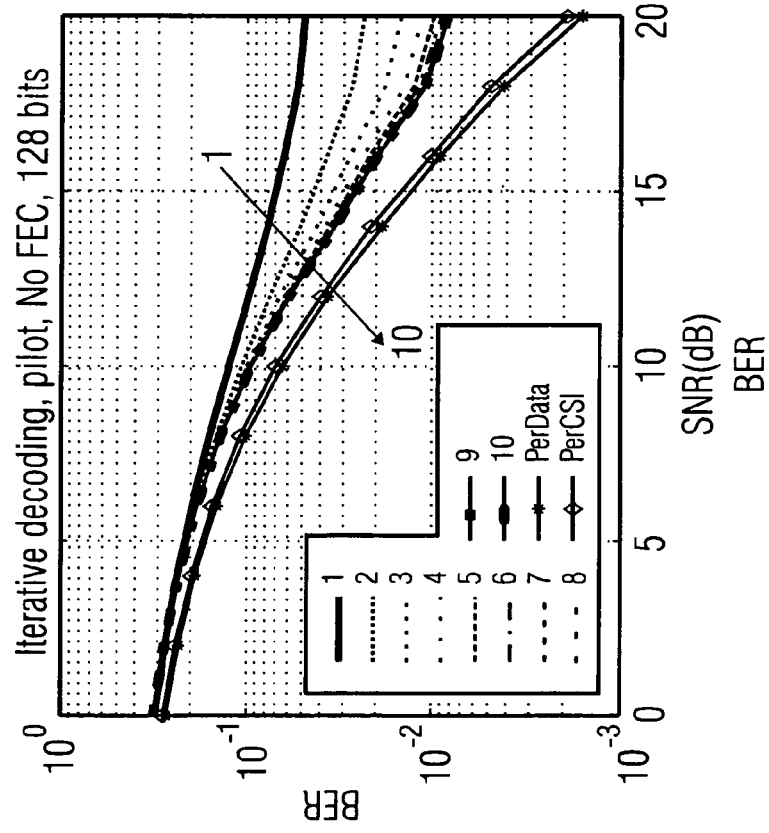
(A)

FIG 16
(A) 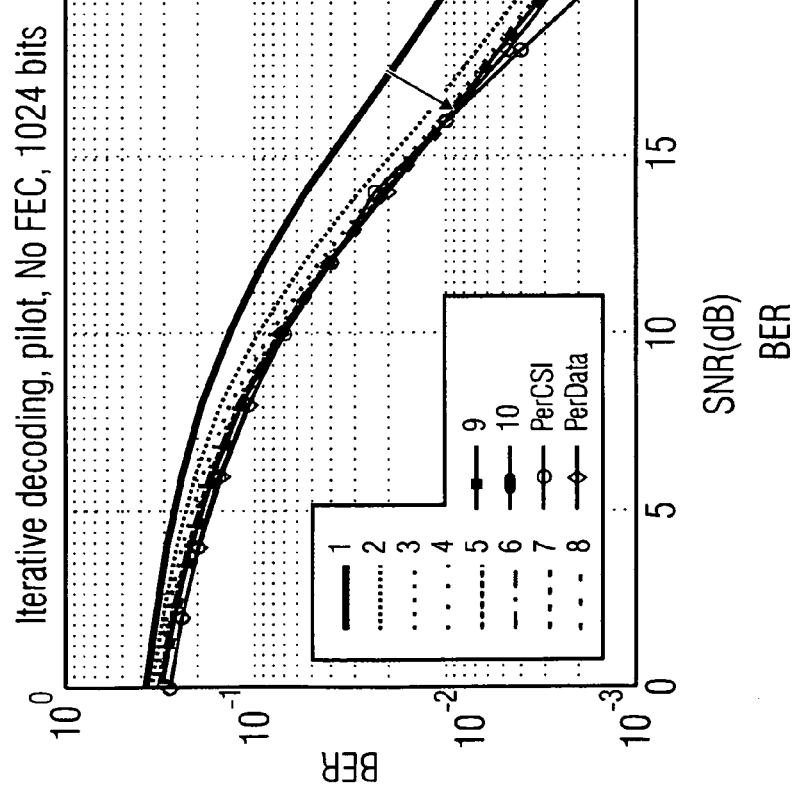
(B) 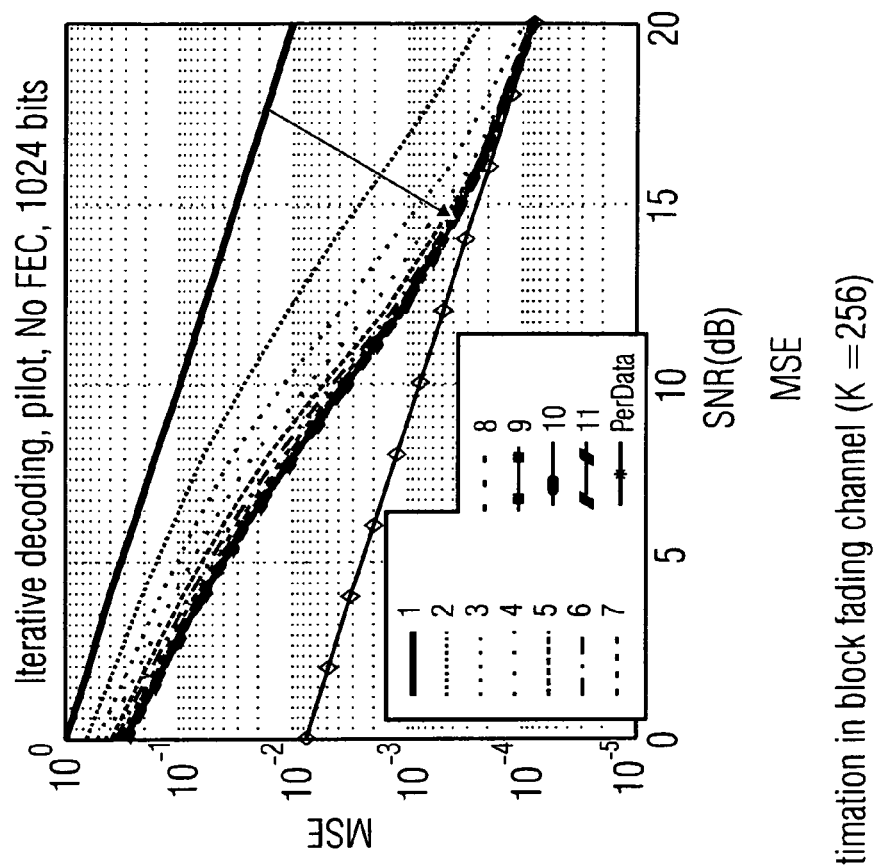
Pilot assisted iterative LS channel estimation in block fading channel ($K = 256$)

FIG 17
(A) 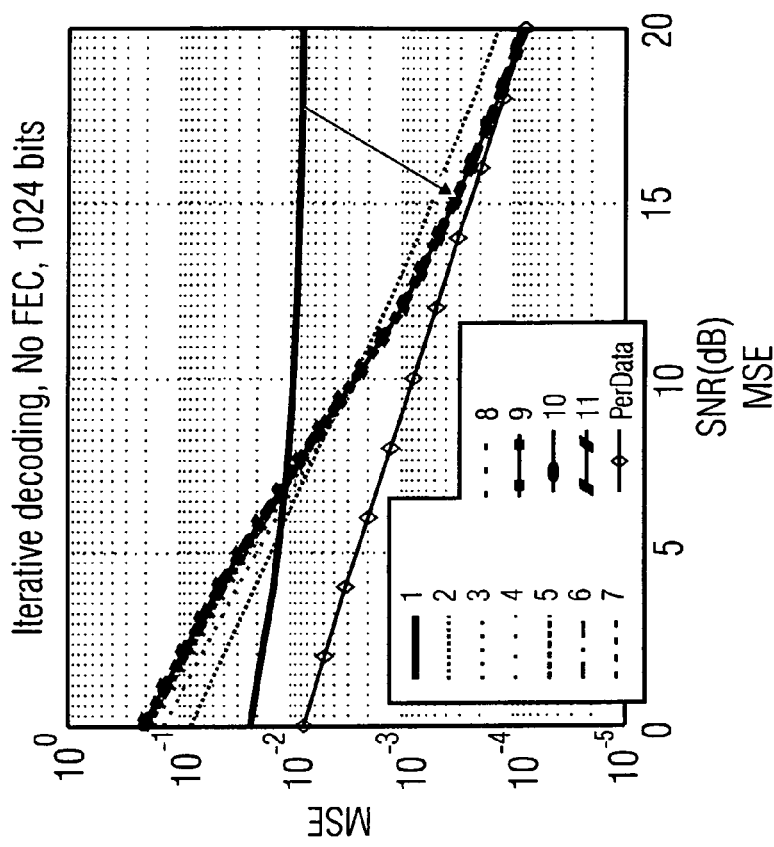
(B) 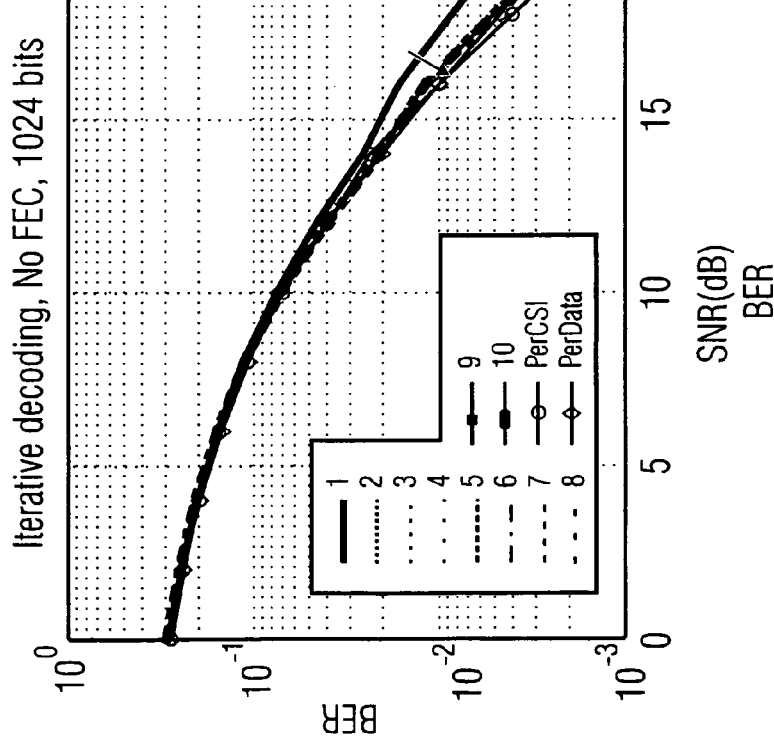
Iterative LS channel estimation using self-interference in block fading channel (K = 256)

FIG 18
(A)
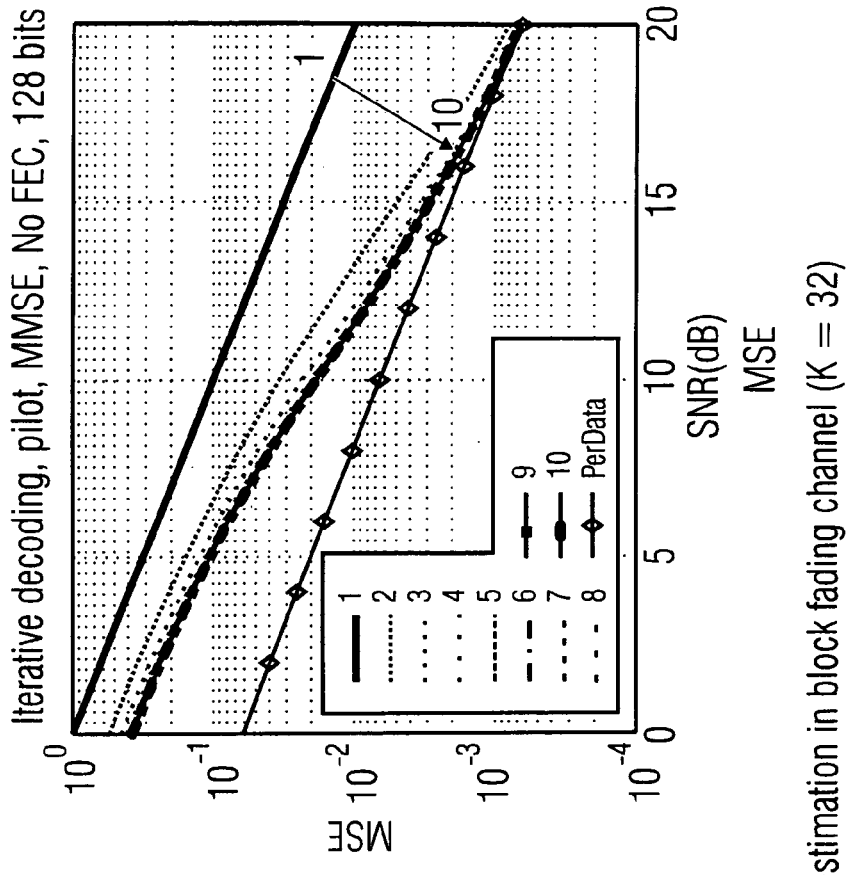
(B)
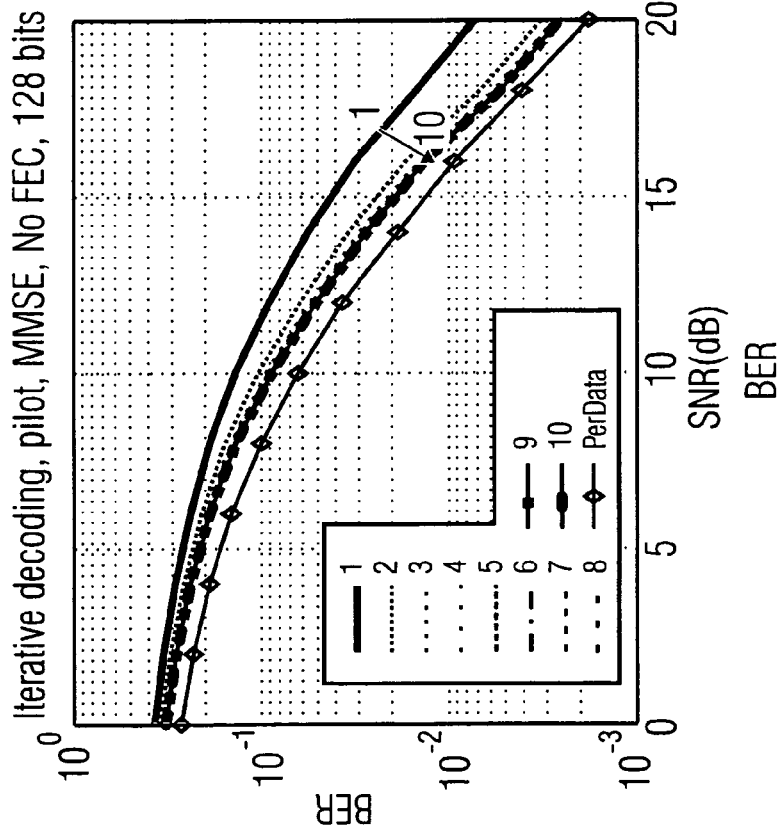

FIG 19
(A)
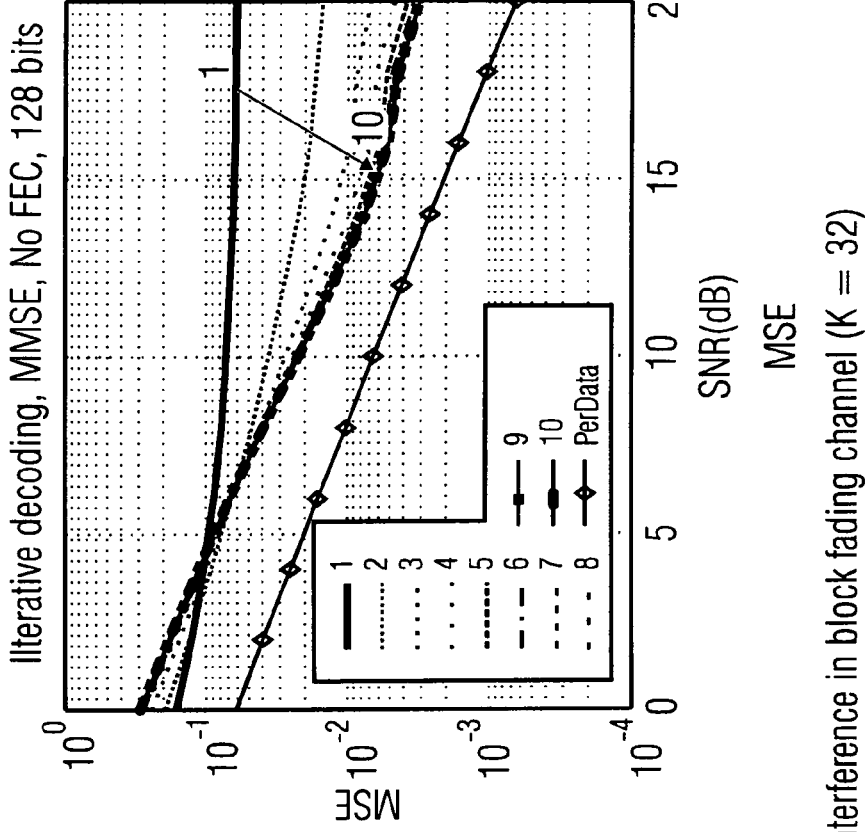
(B)
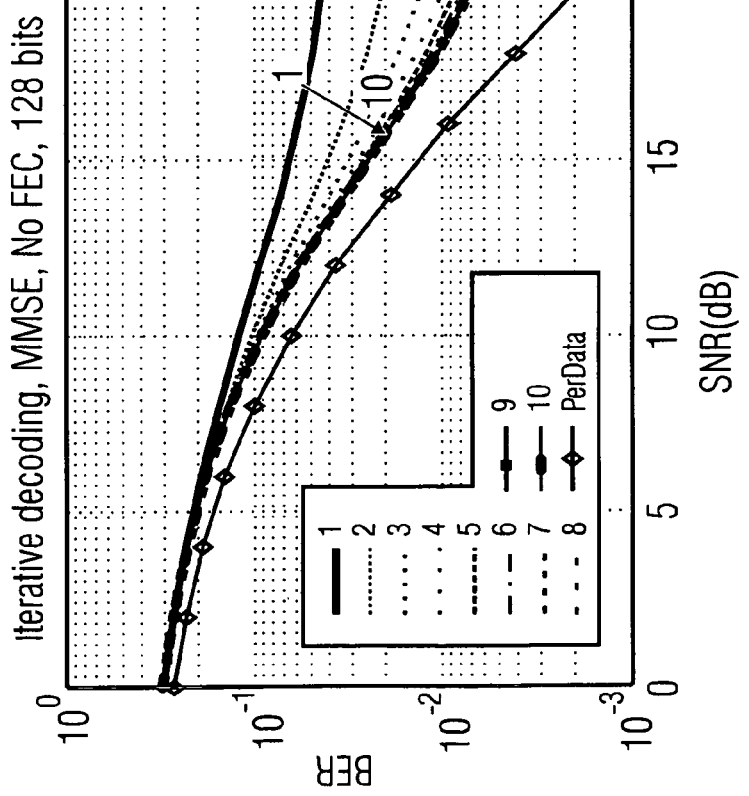

FIG 20
(A)
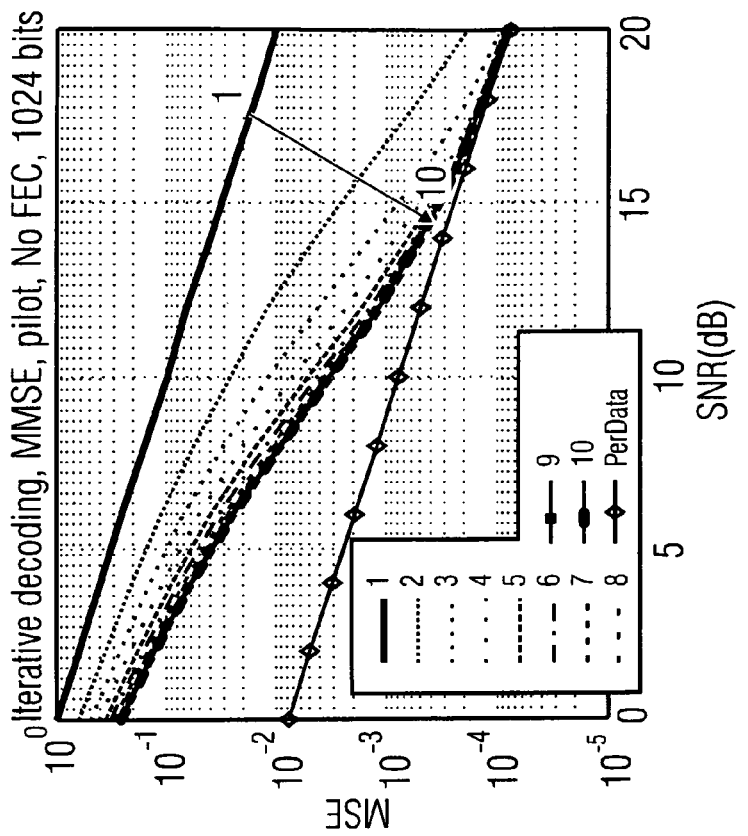
(B)
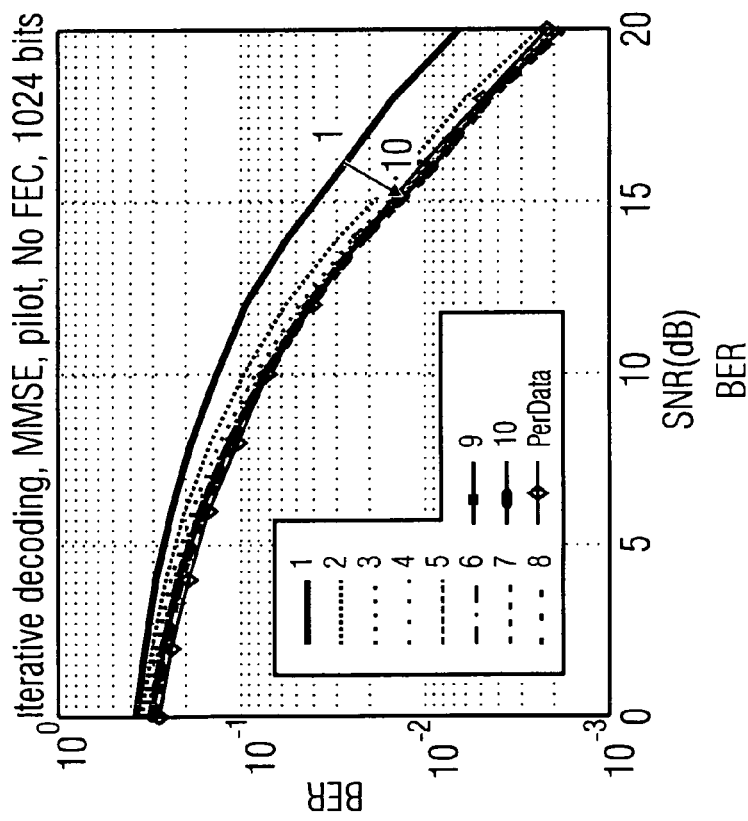
Pilot assisted iterative MMSE channel estimation in block fading channel (K = 256)

FIG 21
(A) 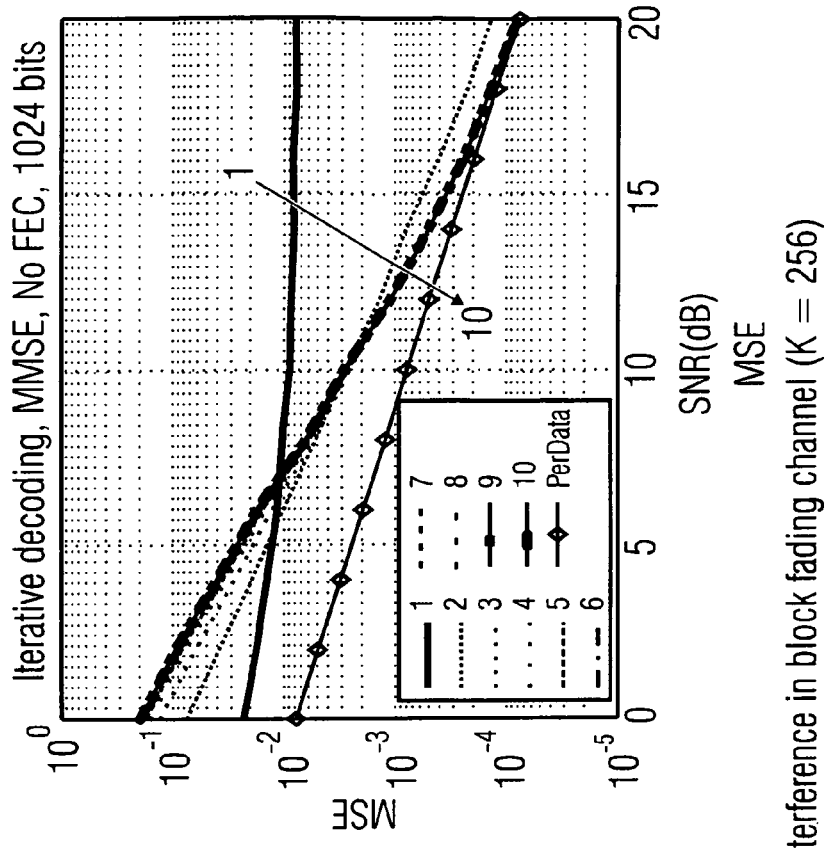
(B) 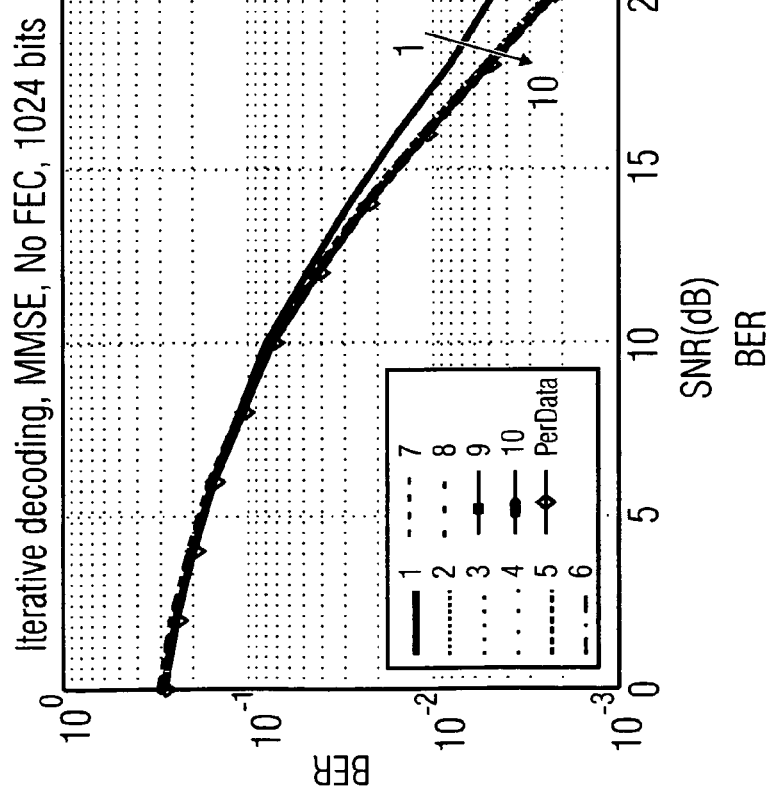

FIG 22
(A)
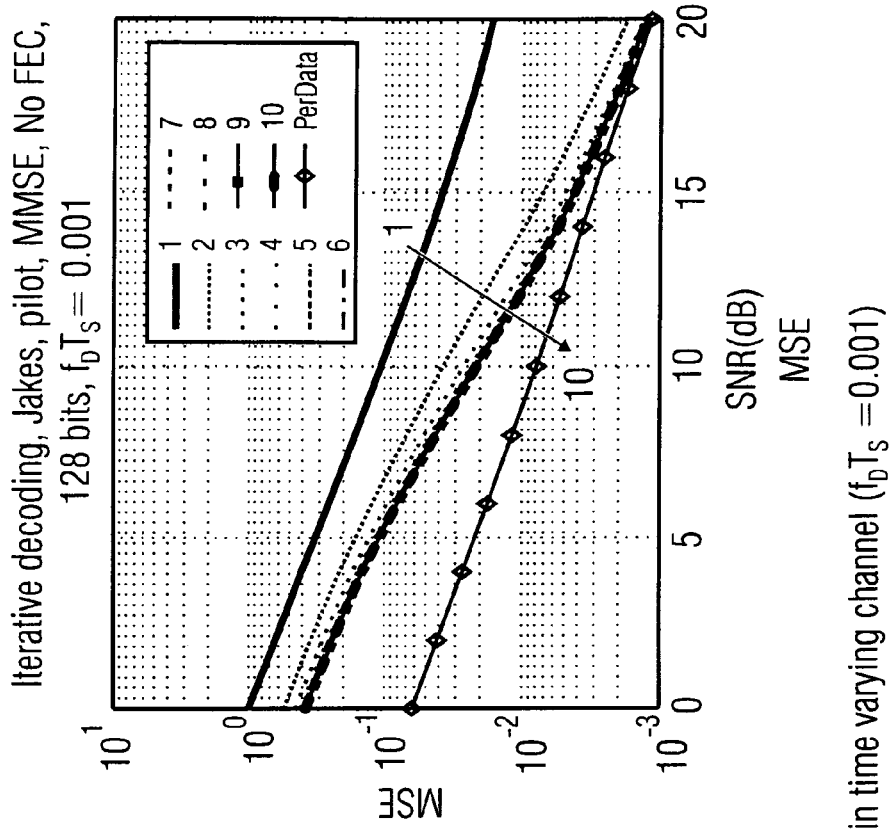
(B)
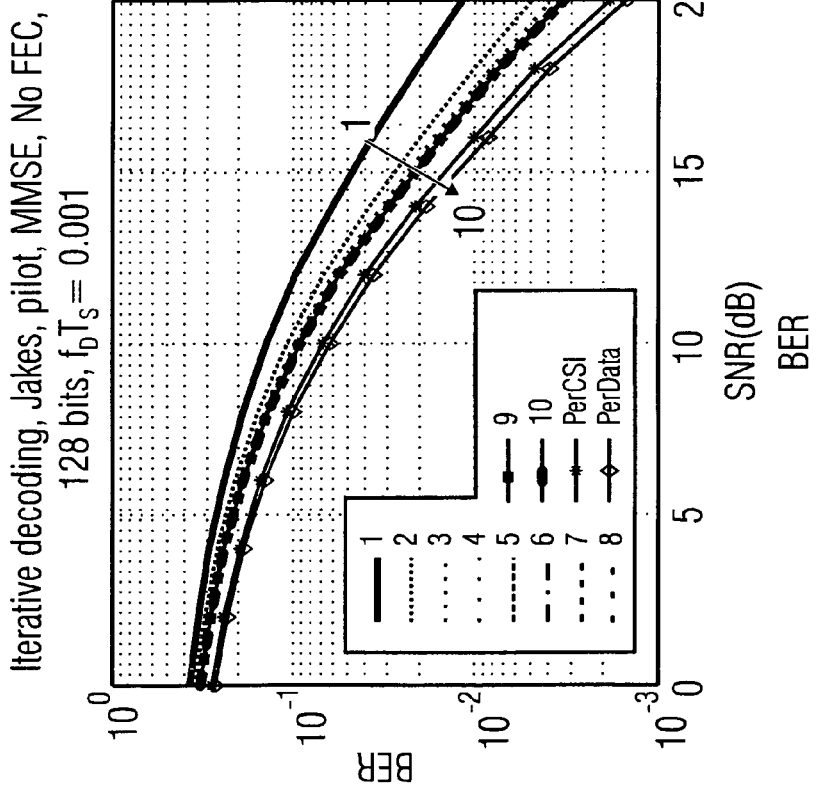

FIG 23
(A)
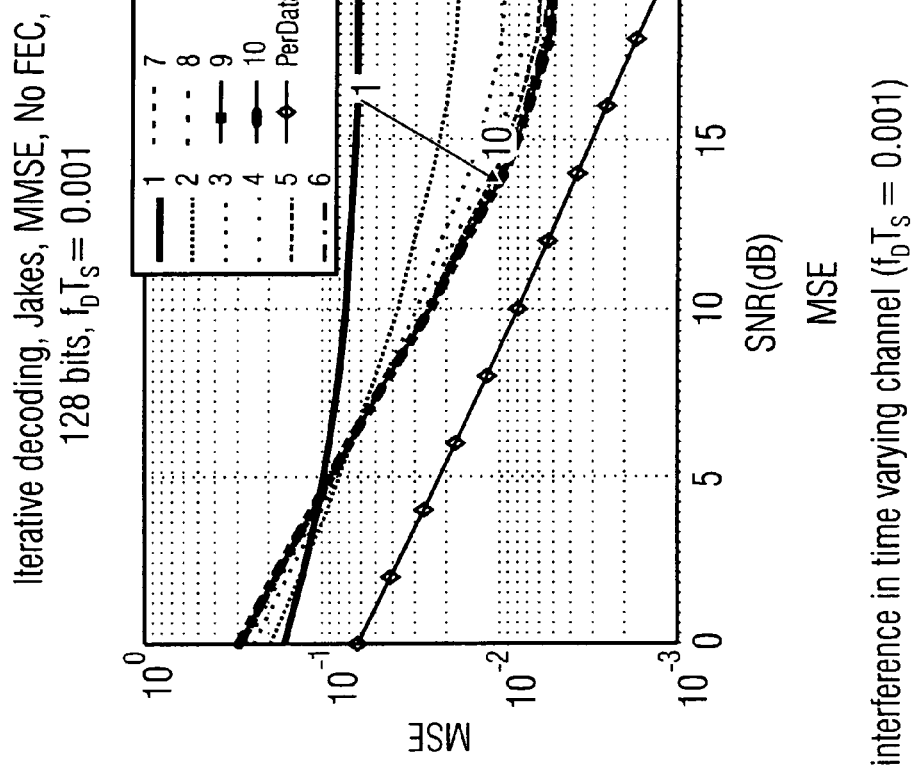
(B)
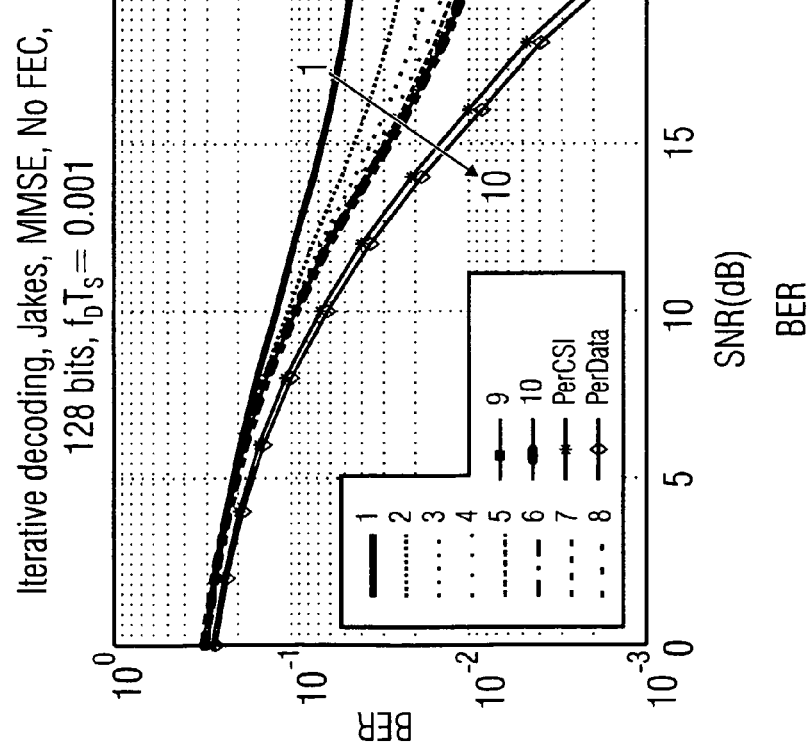
Iterative MMSE channel estimation using self-interference in time varying channel ($f_D T_s = 0.001$)

FIG 24
(B)
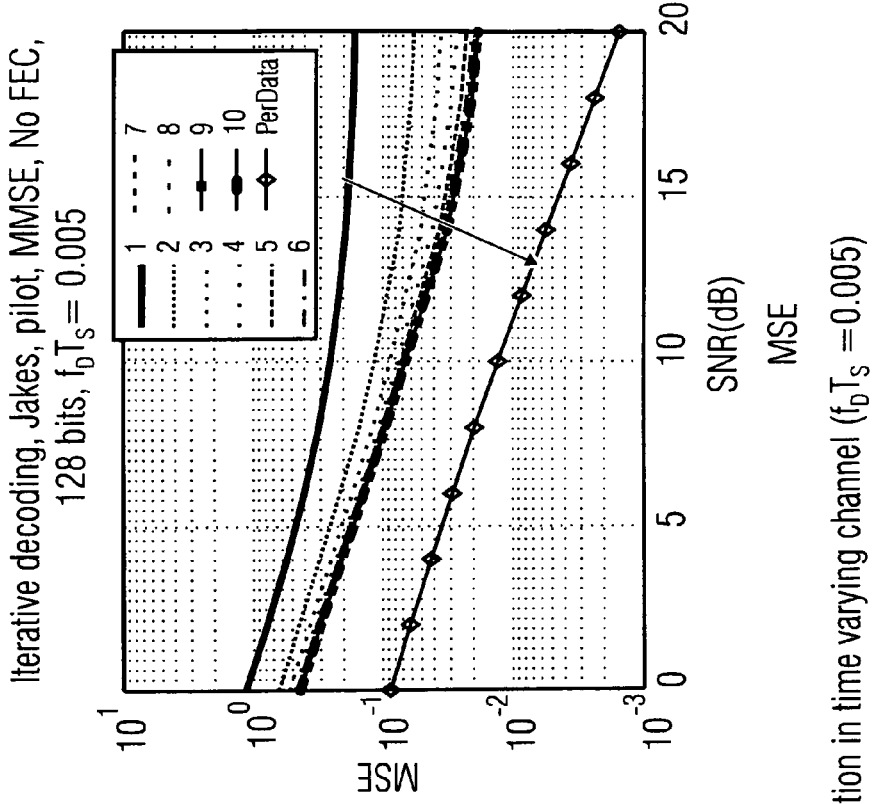
(A)
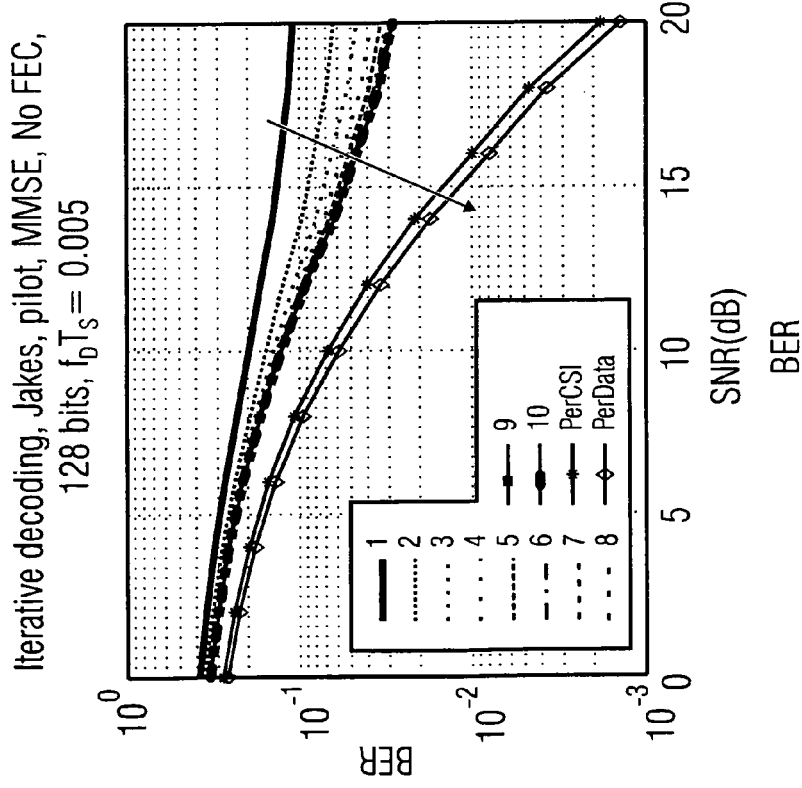
Pilot assisted iterative channel estimation in time varying channel ($f_DT_S = 0.005$)

FIG 25
(A)
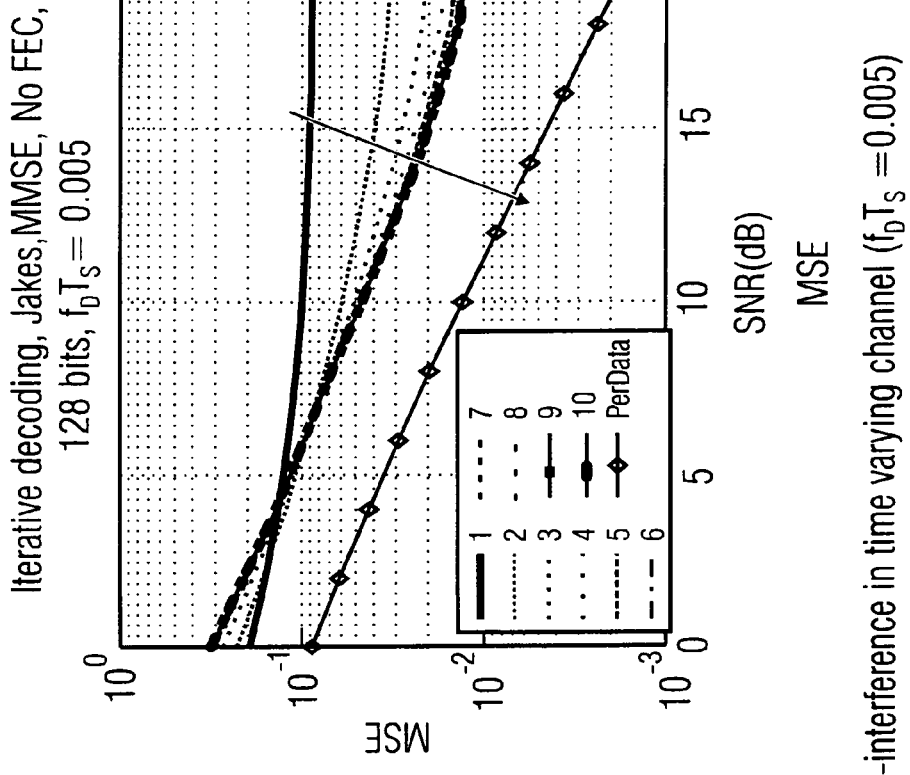
(B)
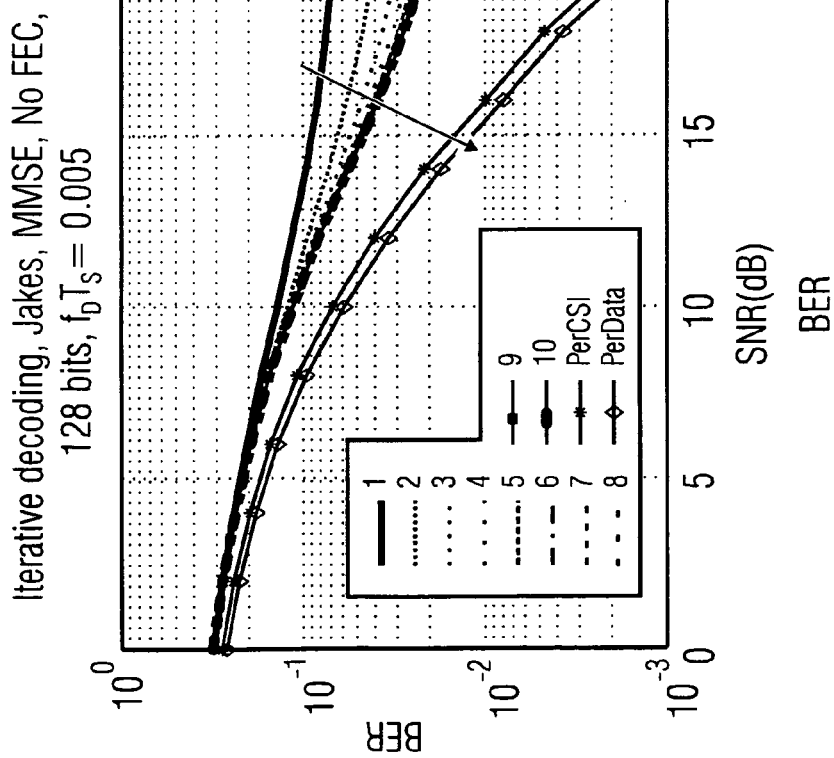
Iterative MMSE channel estimation using self-interference in time varying channel ($f_D T_S = 0.005$)

FIG 26
(A)
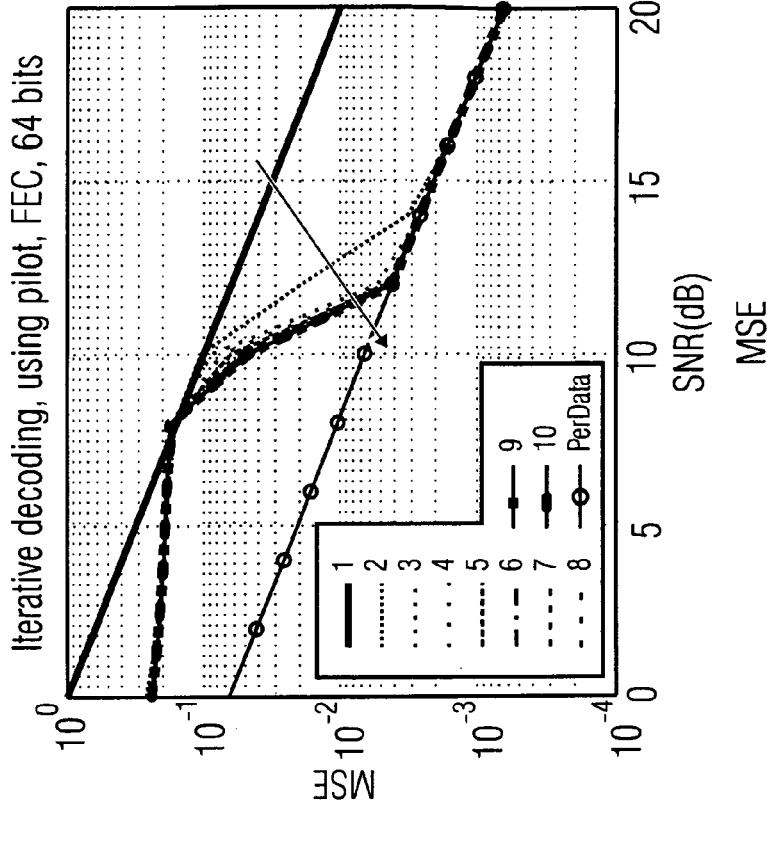
(B)
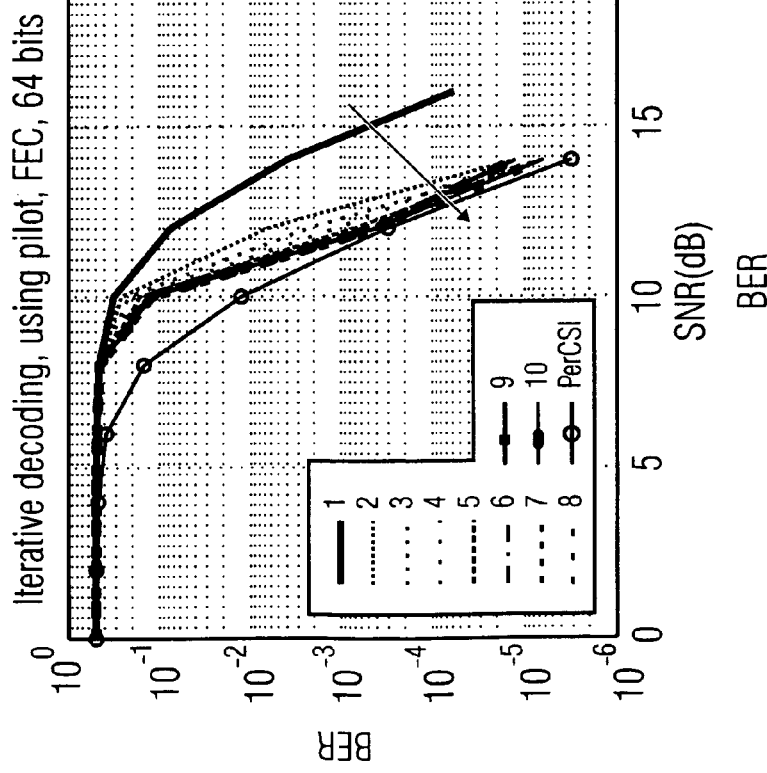
Pilot assisted iterative LS channel estimation with FEC (RS perfect decoding, Rayleigh channel), channel remains constant for K = 32 time slots FIG 27
(A) 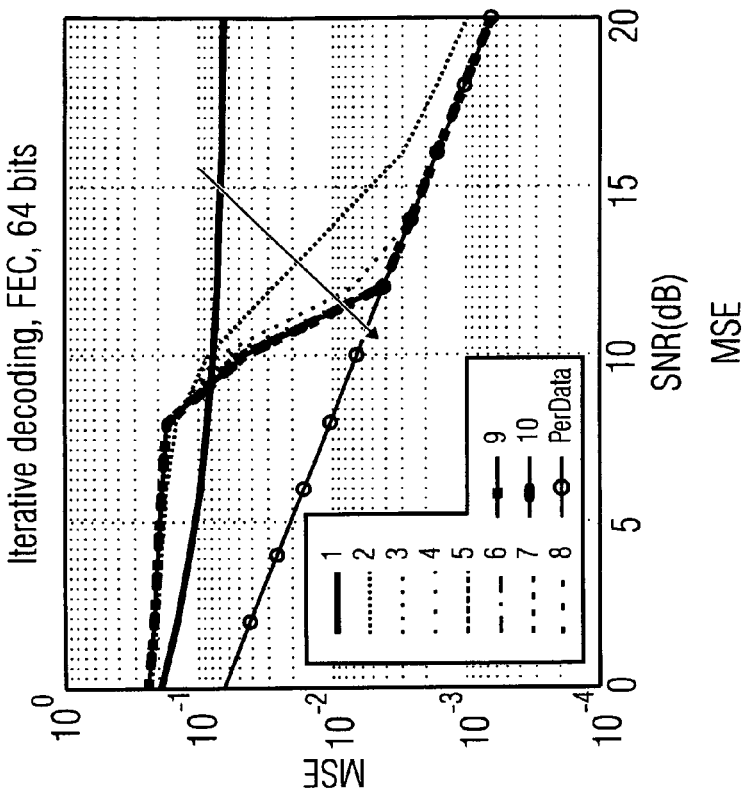
(B) 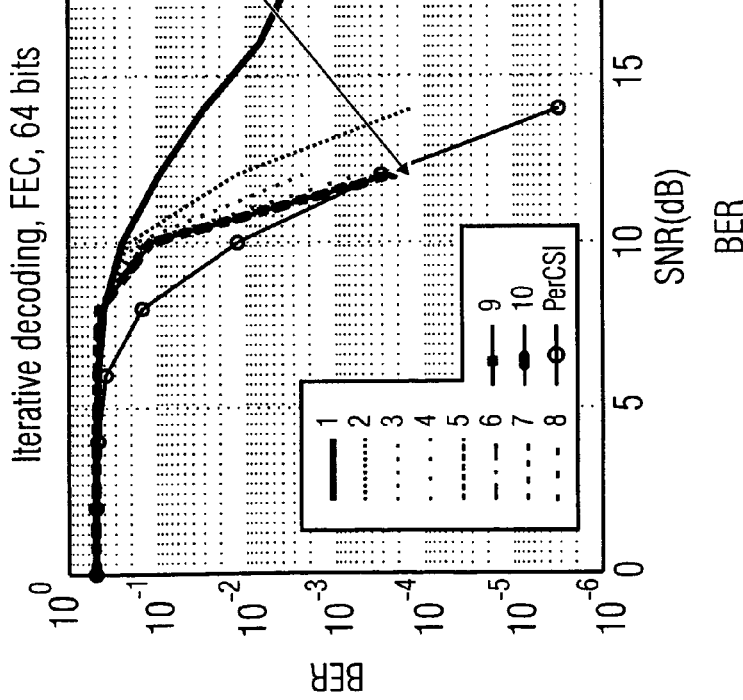
Iterative LS channel estimation with FEC using self-interference (RS perfect decoding, Rayleigh channel), channel remains constant for $K = 32$ time slots

FIG 28
(A) 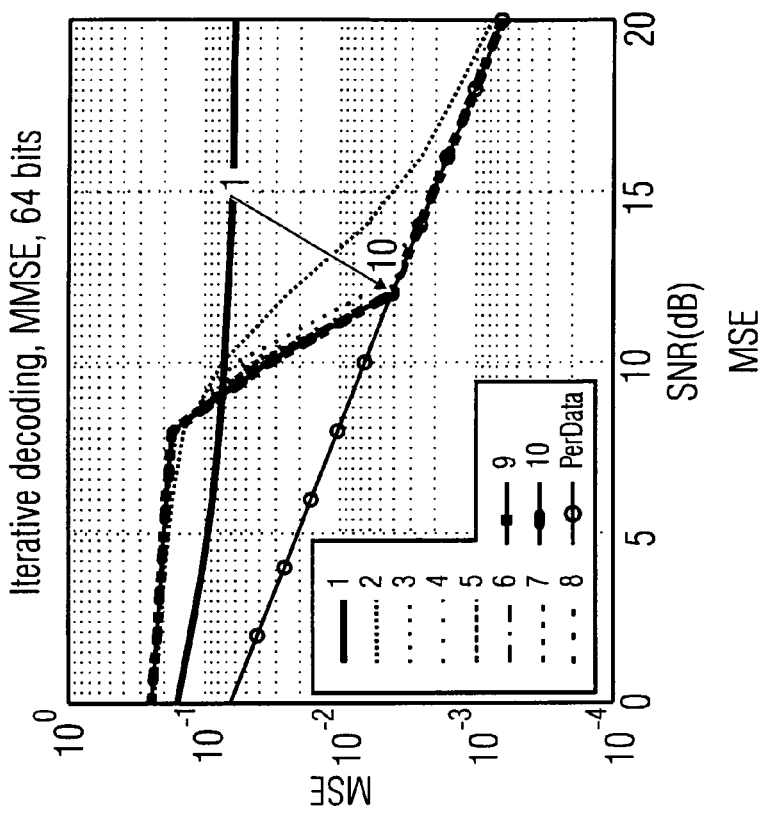
(B) 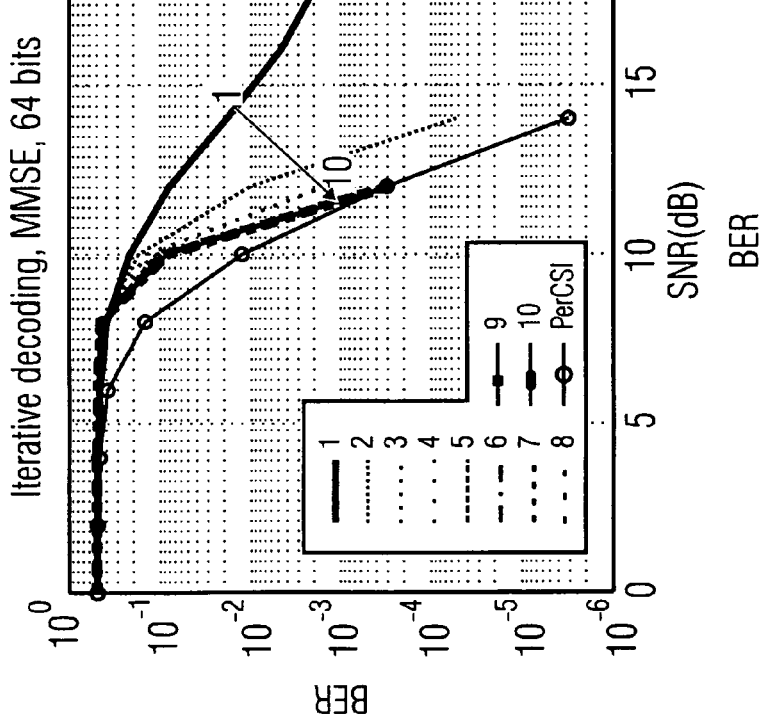
Iterative the MMSE channel estimation with FEC using self-interference (RS perfect decoding, Rayleigh channel), channel remains constant for $K = 32$ time slots

FIG 29
(A)
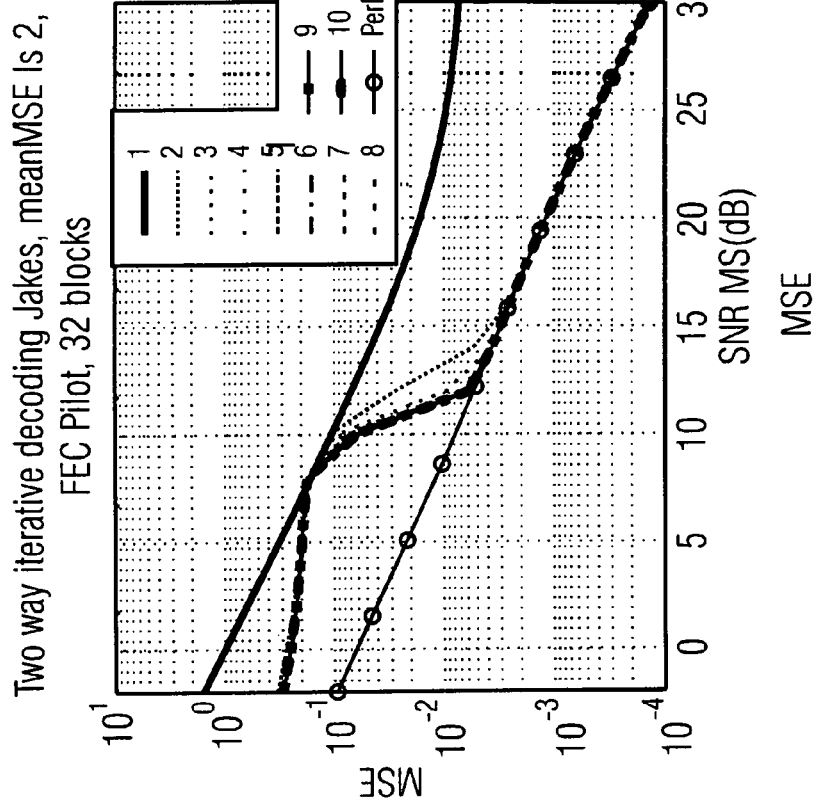
(B)
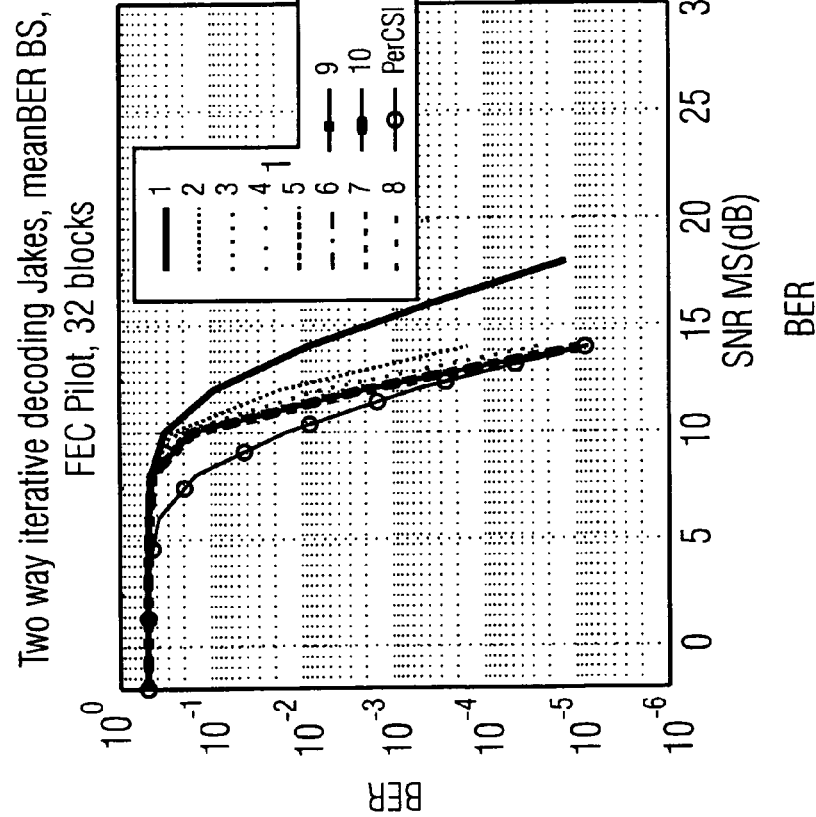
Pilot assisted iterative channel estimation with FEC (RS perfect decoding, $f_D T_s = 0.001$), the hop between BS and RS has $SNR_{BS} = 20$dB.

FIG 31
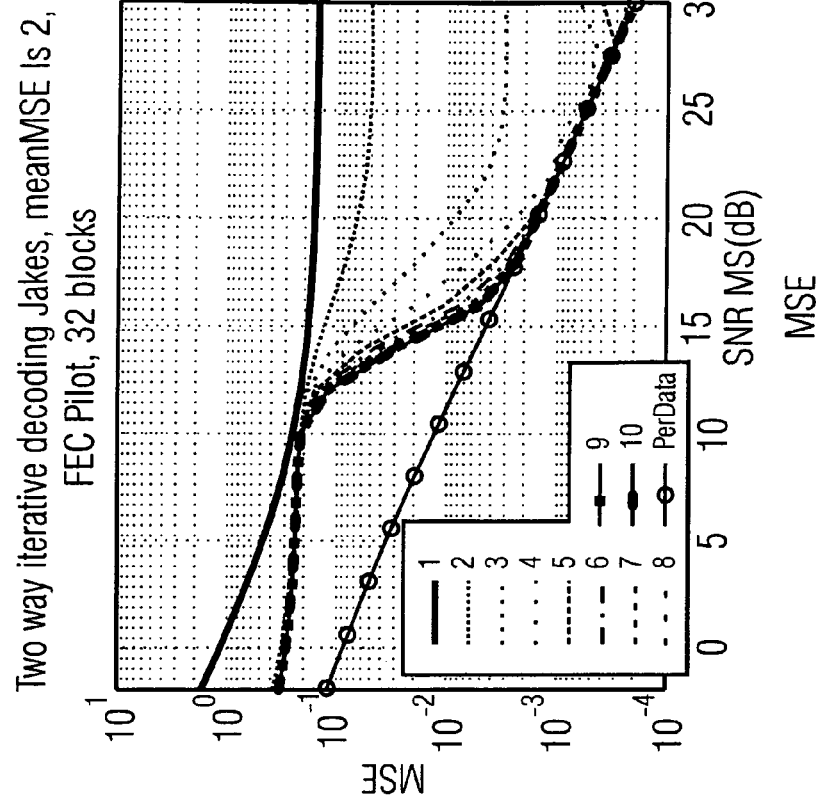
(B)
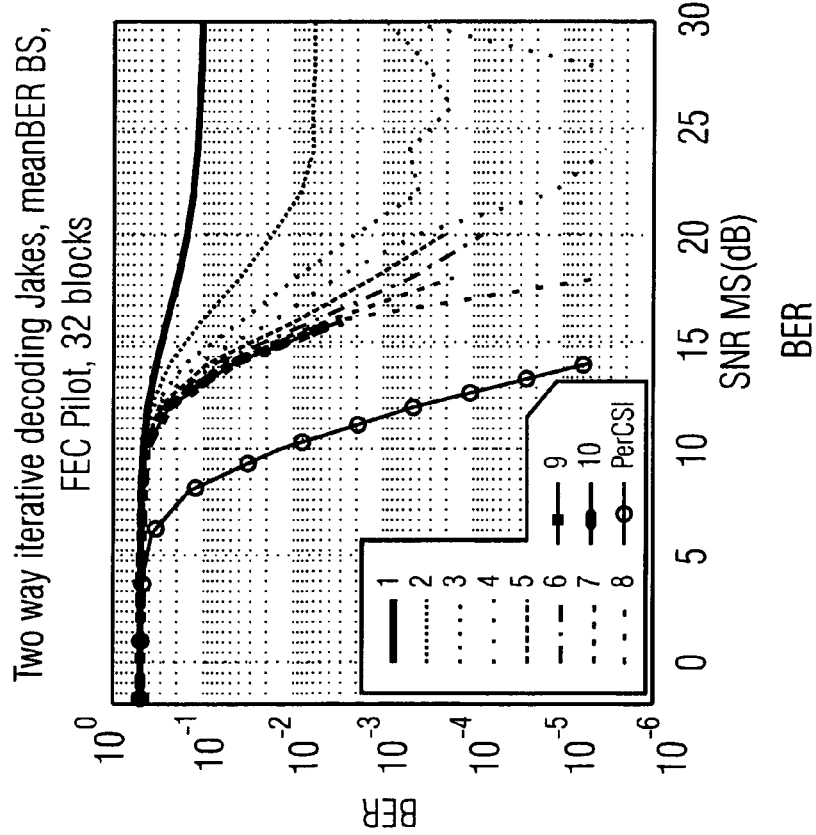
(A)

FIG 32
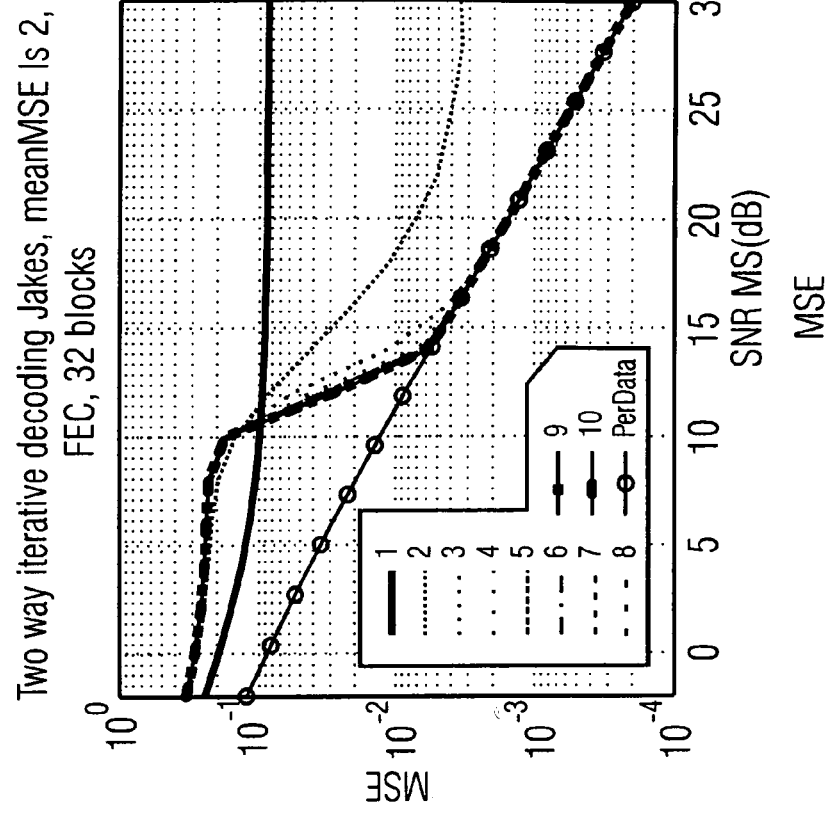
(A) Two way iterative decoding Jakes, meanBER BS, FEC, 32 blocks
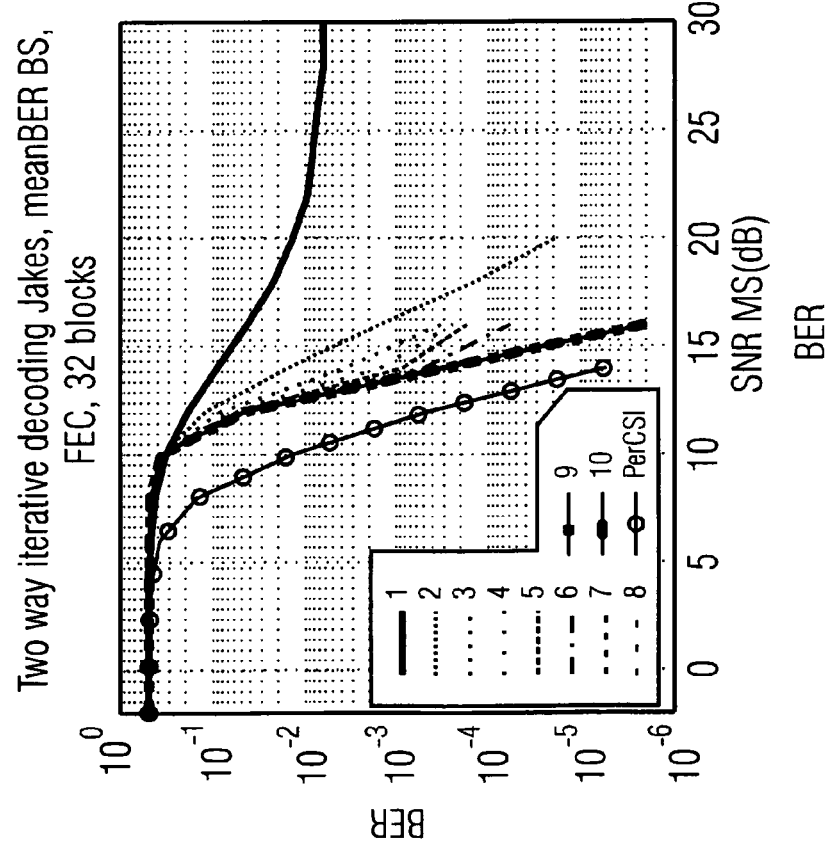
(B) Two way iterative decoding Jakes, meanMSE is 2, FEC, 32 blocks
Self-interference assisted iterative channel estimation with FEC (RS perfect decoding, $f_D T_s = 0.005$), the hop between BS and RS has $SNR_{BS} = 20$dB.

FIG 33
(A)
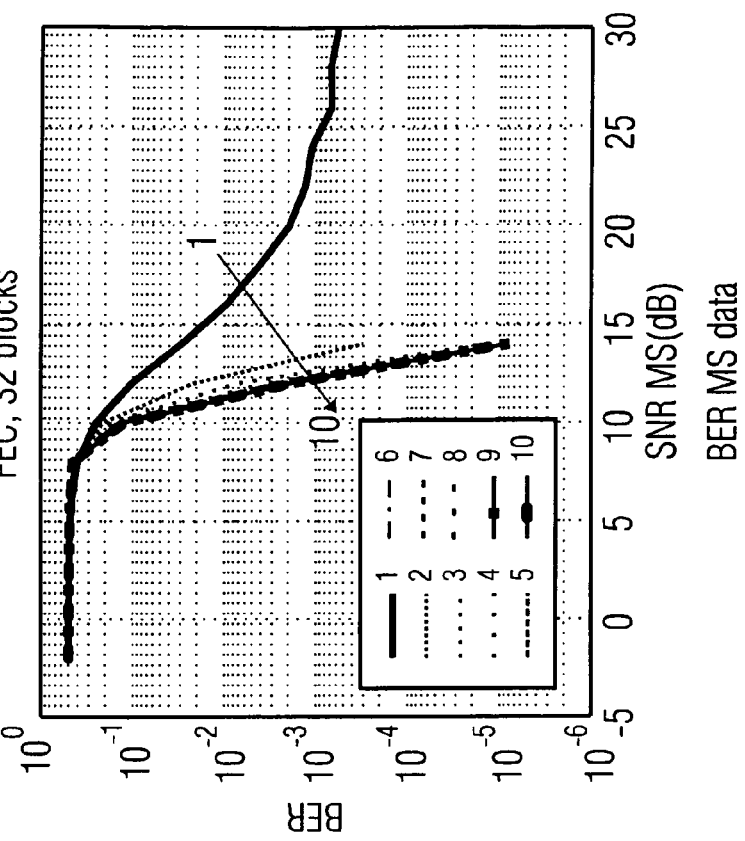
Two way iterative decoding, meanBER MS, FEC, 32 blocks
(B)
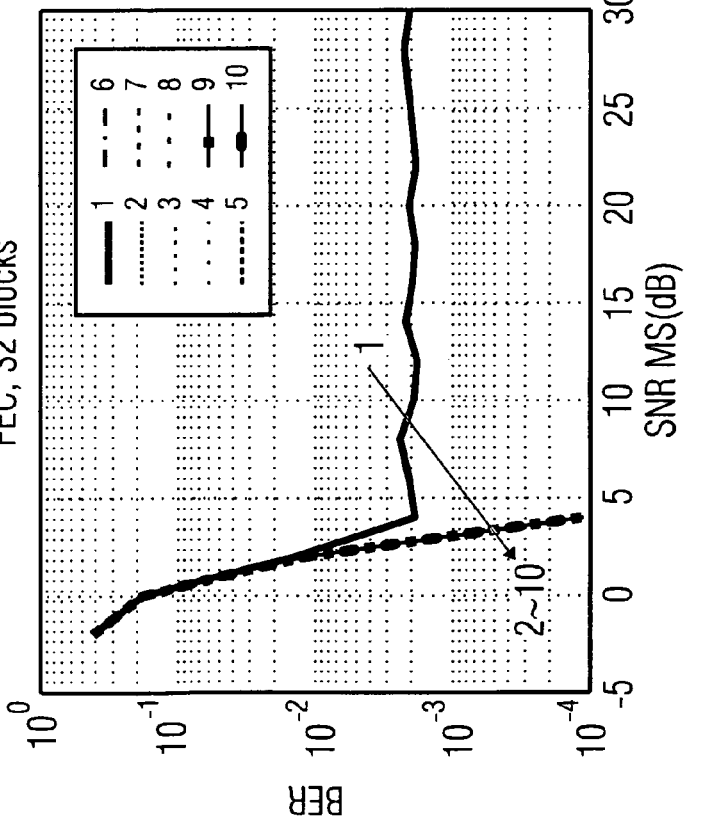
Two way iterative decoding, meanBER BS, FEC, 32 blocks
BER performance of iterative channel estimation with FEC using self-interference (first hop Rayleigh fading), channel remains constant for $K = 32$ time slots, the hop between BS and RS has $SNR_{BS} = 20dB$ FIG 34
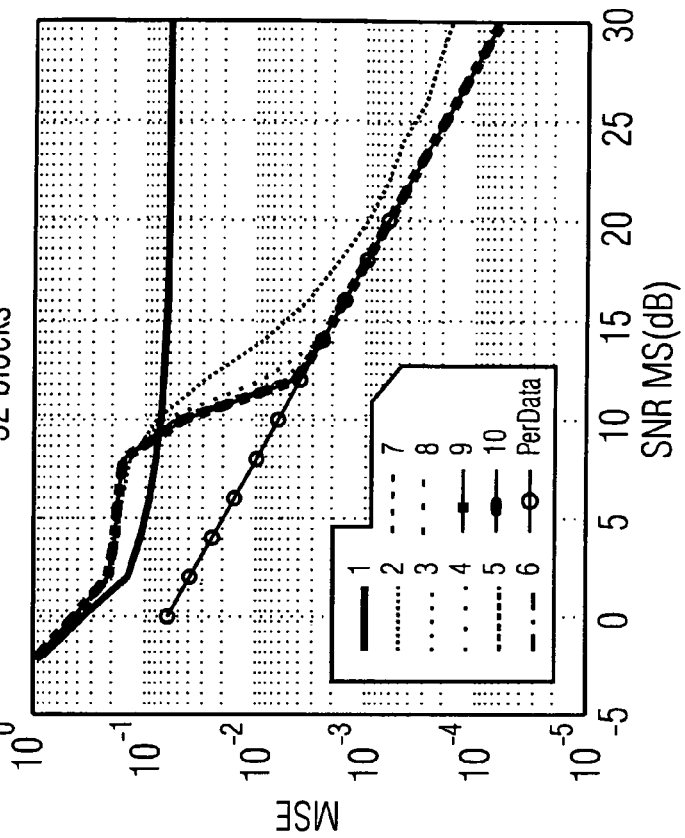
(B) Two way iterative decoding, meanMSE is 2, FEC, 32 blocks
MSE of RS-BS channel estimation
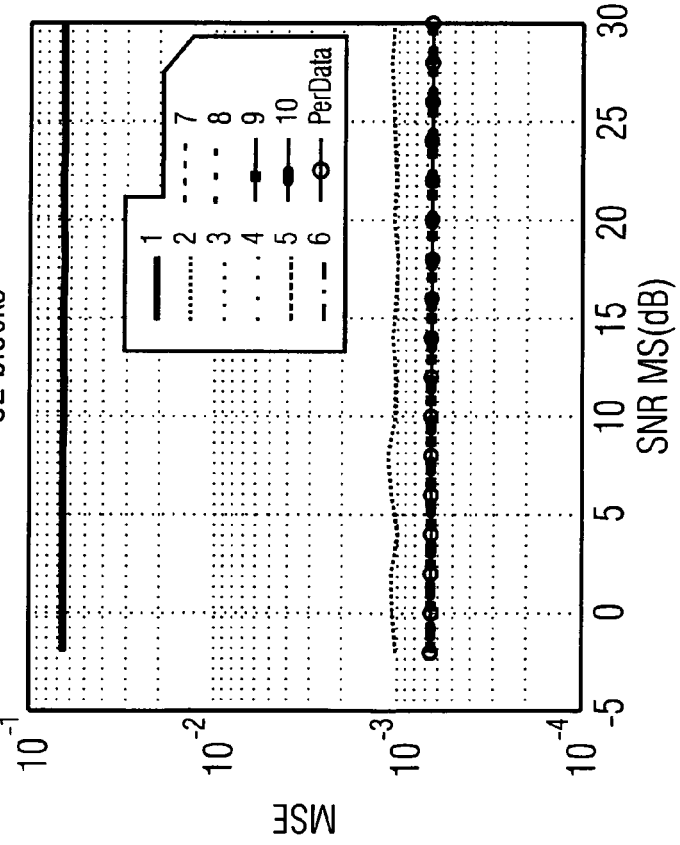
(A) Two way iterative decoding, meanMSE is 1, FEC, 32 blocks
MSE of RS-BS channel estimation
MSE performance of iterative channel estimation with FEC using self-interference (first hop Rayleigh fading), channel remains constant for K = 32 time slots, the hop between BS and RS has $SNR_{BS} = 20dB$ FIG 35
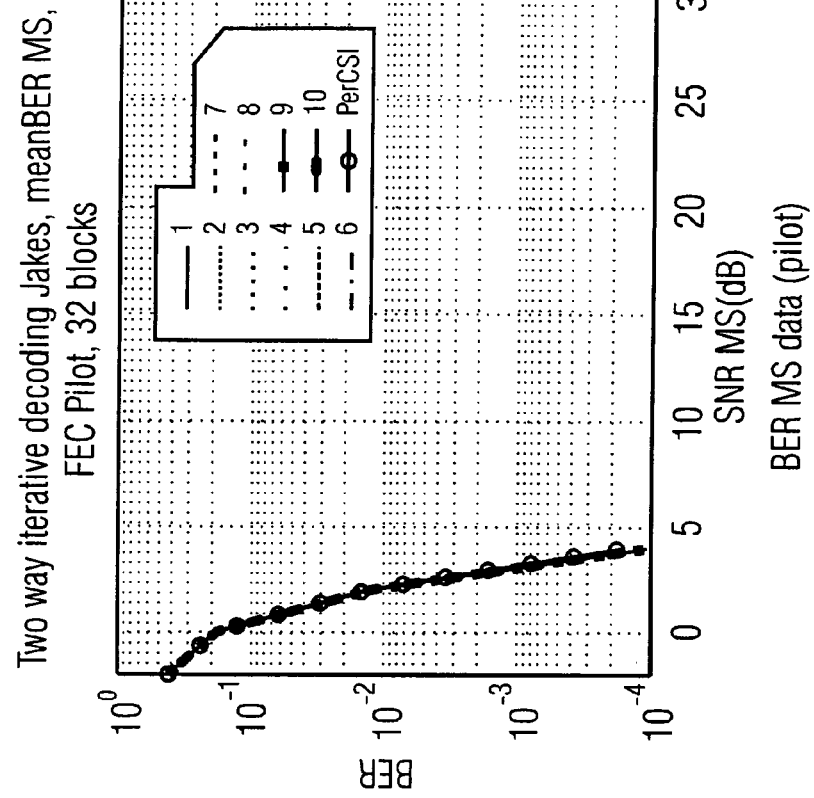
(B) Two way iterative decoding Jakes, meanBER MS, FEC Pilot, 32 blocks
BER MS data (pilot)
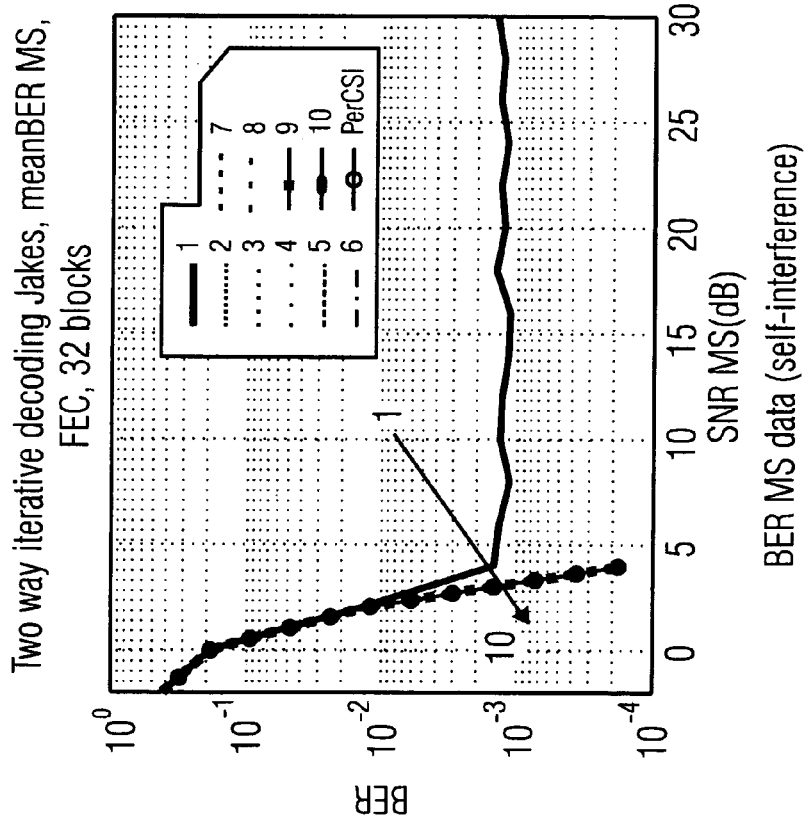
(A) Two way iterative decoding Jakes, meanBER MS, FEC, 32 blocks
BER MS data (self-interference)
Comparison of MS data BER performance of iterative channel estimation with FEC in time-varying channels ($f_D T_s = 0.001$), the hop between BS and RS has $SNR_{BS} = 20dB$

FIG 36
(A)
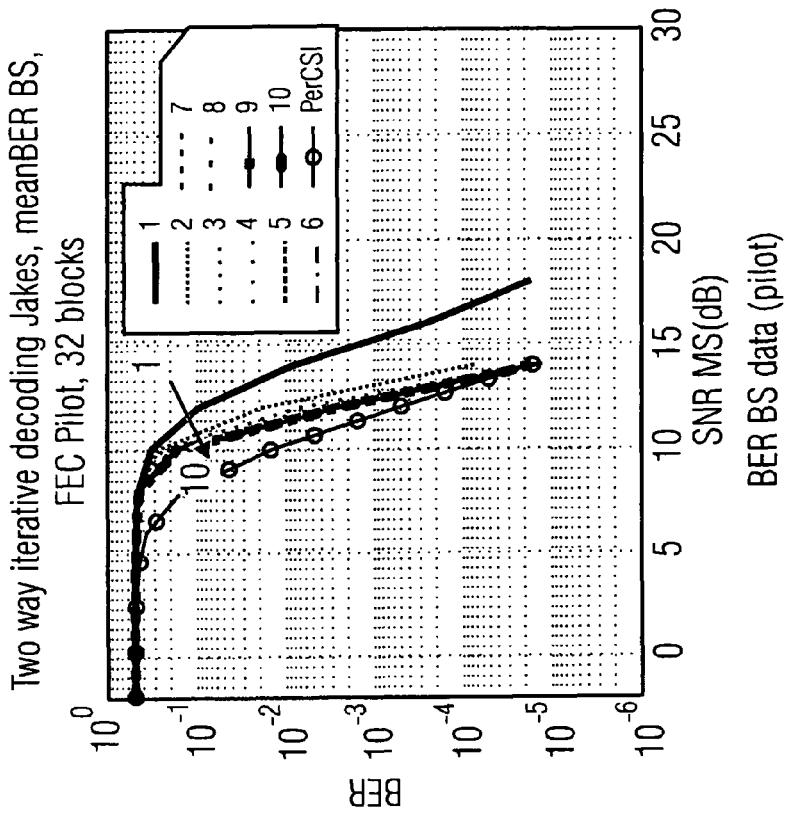
Two way iterative decoding Jakes, meanBER BS, FEC, 32 blocks
BER BS data (self-interference)
(B)
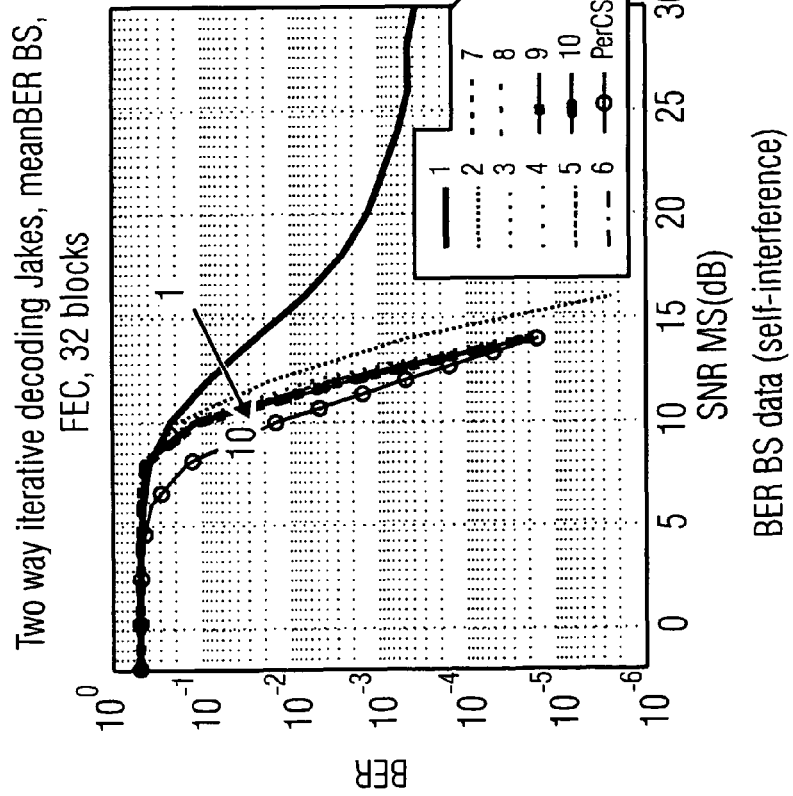
Two way iterative decoding Jakes, meanBER BS, FEC Pilot, 32 blocks
BER BS data (pilot)
Comparison of BS data BER performance of iterative channel estimation with FEC in time-varying channels ($f_D T_s = 0.001$), the hop between BS and RS has $SNR_{BS} = 20dB$ FIG 37
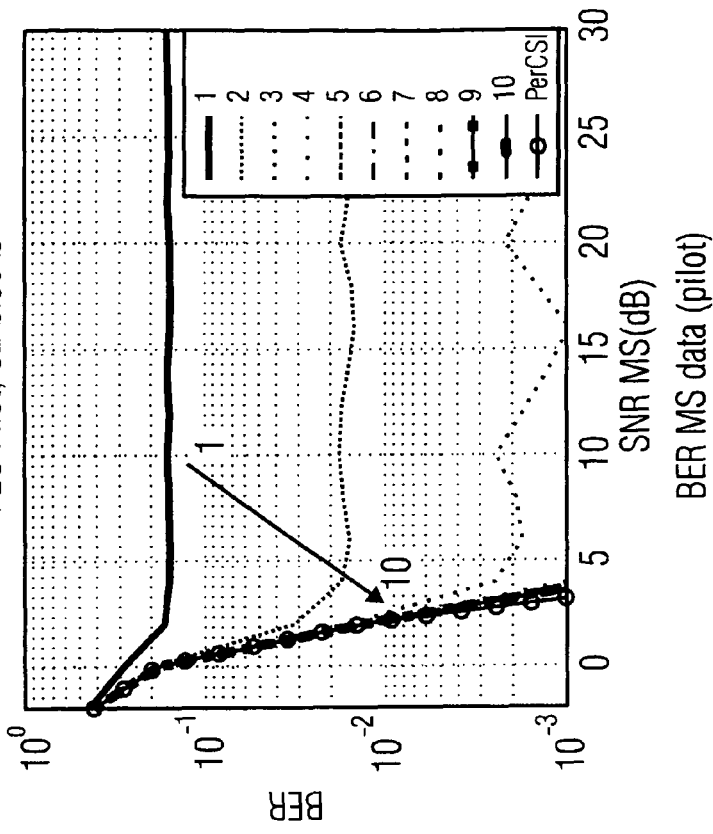
(B)
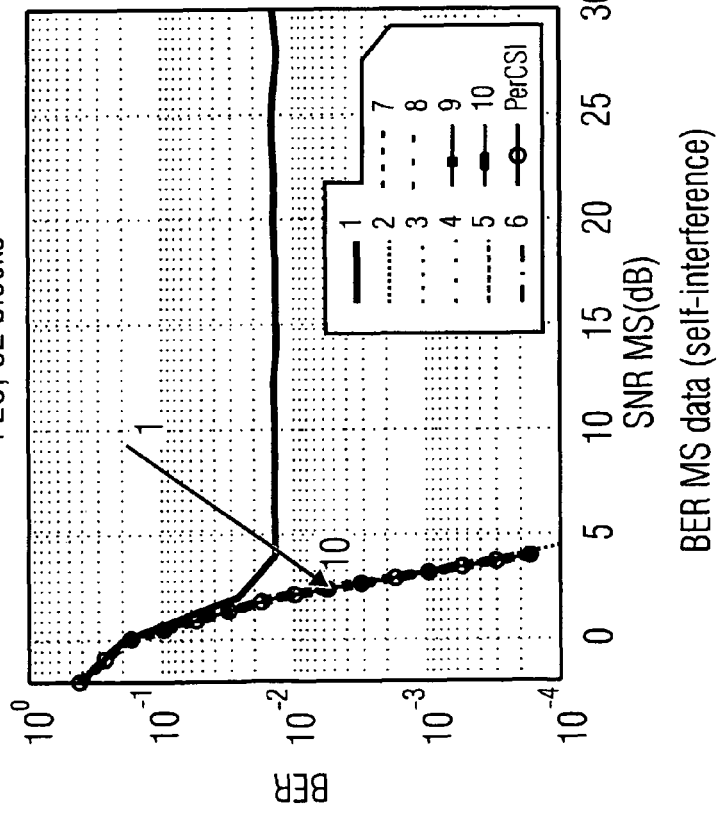
(A)

FIG 38
(A)
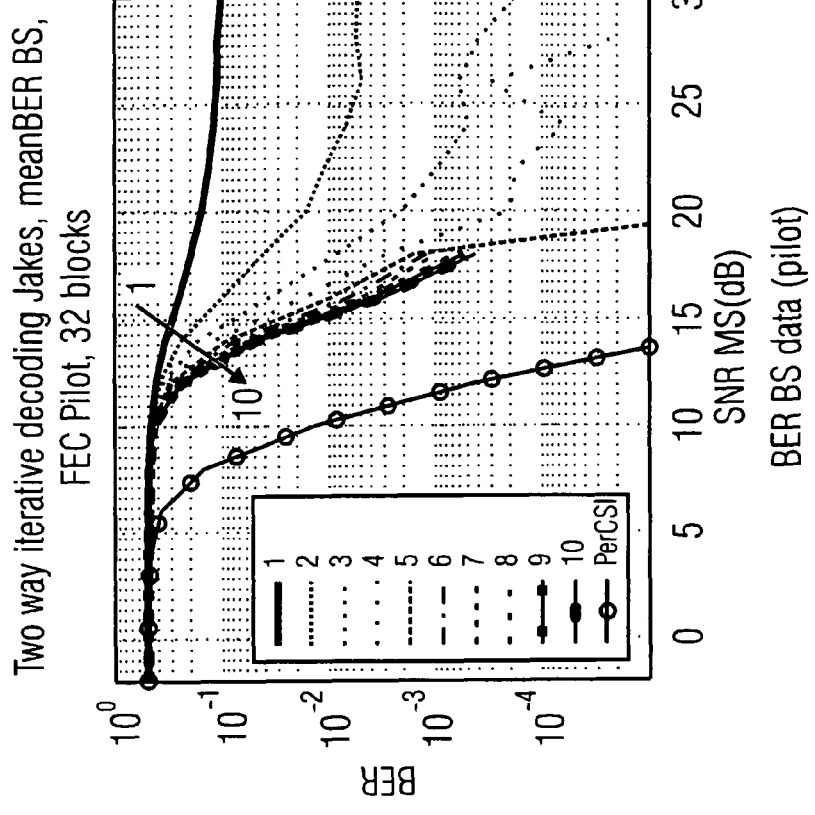
(B)
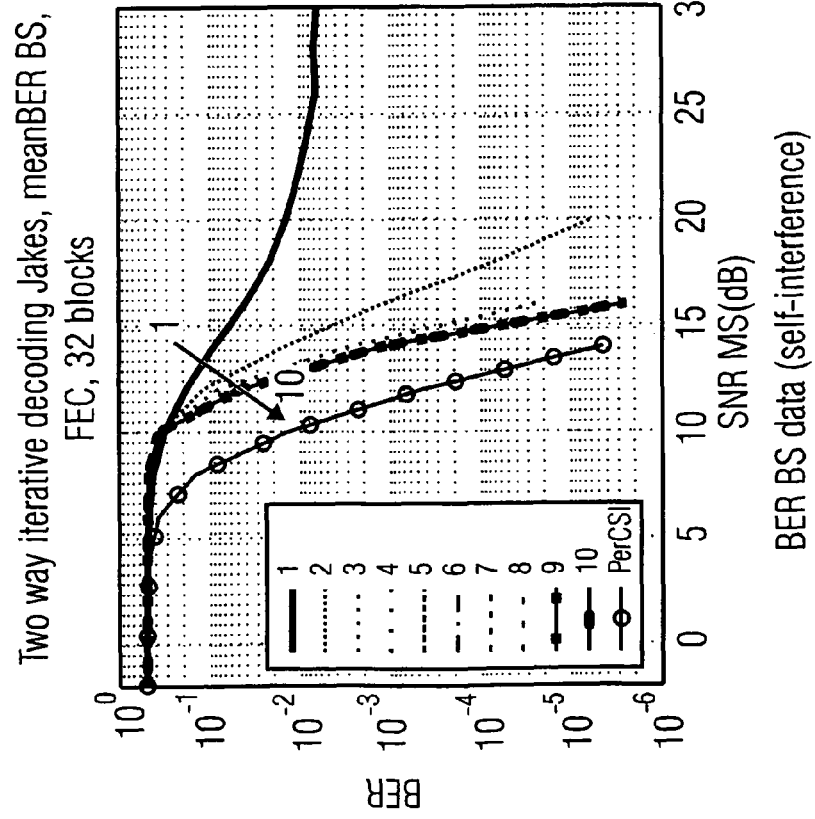
Comparison of BS data BER performance of iterative channel estimation with FEC in time-varying channels ($f_D T_s = 0.005$), the hop between BS and RS has $SNR_{BS} = 20dB$

METHOD, APPARATUS AND SYSTEM FOR CHANNEL ESTIMATION IN TWO-WAY RELAYING NETWORKS

CROSS-REFERENCE TO RELATED APPLICATIONS

This application claims priority from European Patent Application No. 08000511.9, which was filed on Jan. 11, 2008, and is incorporated herein in its entirety by reference.

The present invention relates to communication systems and, more particularly, to methods and apparatus for channel estimation between a relay station and a base or mobile station.

BACKGROUND OF THE INVENTION

Relay technology has been a hot area of research in wireless communication community in recent years. It is widely accepted that relay or multi-hop networks will become essential for beyond 3G mobile radio systems due to the range problem that appears there. As higher carrier frequencies or center frequencies can be envisaged for future mobile radio communication systems, where the expected center frequencies range up to 5-10 GHz and with bandwidth requirements of up to 100 MHz that can be foreseen, a significantly increased pathloss and noise power level has to be expected, which translates into a significantly reduced area a base station can cover.

Using relaying technology, signals can be transmitted much farther away, R. Pabst, B. Walke, D. Schultz, P. Herhold, H. Yanikomeroglu, S. Mukherjee, H. Viswanathan, M. Lott, W. Zirwas, M. Dohler, H. Aghvami, D. Falconer, and G. Fettweis, "Relay-based deployment concepts for wireless and mobile broadband radio," IEEE Commun. Mag., vol. 42, no. 9, pp. 80-89, September 2004, J. Zhao, I. Hammerstroem, M. Kuhn, A. Wittneben, M. Herdin, and G. Bauch, "Coverage analysis for cellular systems with multiple antennas using decode-and-forward relays," in Proc. 65th IEEE Veh. Tech. Conf., Dublin, Ireland, Apr. 22-25, 2007. Furthermore relay signals provide additional diversity and improve the received signal quality, J. N. Laneman, D. N. Tse, and G. W. Wornell, "Cooperative diversity in wireless networks: Efficient protocols and outage behavior," IEEE Trans. Inform. Theory, vol. 50, no. 12, pp. 3062-3080, December 2004.

In order to circumvent the introduction of a denser grid of base stations (BS), the basic idea is to introduce relay stations (RS), which forward data packets to a mobile station (MS) that is out of reach of the base station. Such relay stations can be realized utilizing additional dedicated infrastructure relay stations having fixed power supplies, or they could be built into other mobile stations. Two main concepts of relaying were identified in the past: Amplify-and-Forward (AF) and Decode-and-Forward (DF). While AF has the advantage of being transparent to modulation and coding since a sampled version of the received signal is stored and retransmitted by the relay station without performing any decoding, DF allows for a separate adaptation to both links and avoids also the effect of noise enhancement since DF means that the relay station decodes and re-encodes the signal.

Current relays cannot transmit and receive signals using the same time and frequency channel (half-duplex relays). Half-duplex generally means that communication is possible in both directions, but only one direction at a time (not simultaneously). Hence, traditional relaying schemes suffer from the spectral efficiency loss due to two channel uses.

Recently, a spectral efficient relaying scheme called two-way relaying has been proposed in B. Rankov and A. Wittneben, "Spectral efficient protocols for half-duplex fading relay channels," IEEE J. Select. Areas Commun., vol. 25, no. 2, pp. 379-389, February 2007 and in P. Larsson, N. Johansson, and K.-E. Sunell, "Coded bidirectional relaying," in IEEE Veh. Tech. Conf., vol. 2, Melbourne, Australia, May 7-10, 2006, pp. 851-855. In such a scheme, the source and destination terminals transmit simultaneously in a first time interval. After receiving data signals from the source and the destination terminals in the first time interval, the relay station terminal retransmits the combined or superimposed source and destination data signals in a second time interval. Since both the source and the destination know its own data, respectively, both sides can cancel the so called self-interference, i.e. the own useful data transmitted towards the relay station in the first time interval, and decode the useful data from the other side. Two-way relaying achieves bi-directional transmission between the source and destination in two time intervals or time slots by using half-duplex terminals. Thus it avoids the spectral efficiency loss due to the use of half-duplex relays. Up to now, all the research is focusing on canceling the self-interference instead of utilizing it.

The authors of "Spectral efficient protocols for half-duplex fading relay channels" used a so called superposition coding scheme to re-encode data symbols to be transmitted in the second time interval, while the authors of "Coded bidirectional relaying" applied an XOR-operation on bit level to re-encode the data symbols to be transmitted in the second time interval at the relay station. The comparison of the two re-encoding schemes has been made in I. Hammerstroem, M. Kuhn, C. Esli, J. Zhao, A. Wittneben, and G. Bauch, "MIMO two-way relaying with transmit CSI at the relay," in Proc. SPAWC, Helsinki, Finland, Jun. 17-20, 2007 and T. J. Oechtering, I. Bjelakovic, C. Schnurr, and H. Boche, "Broadcast capacity region of two-phase bidirectional relaying," March 2007, submitted to IEEE Transactions on Information Theory.

MIMO (Multiple-Input-Multiple-Output) technology has been a major breakthrough in the area of wireless communication in recent years. The use of multiple antennas can provide significant increase in capacity, I. E. Telatar, "Capacity of multi-antenna Gaussian channels," Europ. Trans. Telecommun., vol. 10, no. 6, pp. 585-595, November 1999. It is almost certain that most communication systems will be equipped with multiple antennas in the years to come. Accurate channel knowledge may be used in order to take the advantage the MIMO system can offer. However, estimating the channel in a MIMO system is difficult. Traditional channel estimation schemes transmit dedicated, predetermined pilot or training sequences comprising known data symbols on different transmit antennas. Thus the spectrum efficiency is reduced in the traditional channel estimation schemes.

MIMO channel estimation has been a research topic along with MIMO transmission technology. One of the most popular and widely used approaches to estimate a MIMO channel is to transmit orthogonal training sequences from different transmit antennas. The received signal is correlated with the training sequences at the receiver. Based on the received data and the knowledge of the predetermined training sequences, the channel matrices can be calculated. In M. Biguesh and A. B. Gershman, "Training-based MIMO channel estimation: A study of estimator tradeoffs and optimal training signals," IEEE Trans. Signal Processing, vol. 54, no. 3, pp. 884-893, March 2006, the authors considered linear least squares (LS) and minimum mean-squared-error (MMSE) channel estimation approaches and investigated the optimal choice of training sequences. They showed that transmitting orthogonal training sequences from different antennas is optimal for the LS approach.

Instead of multiplexing the training sequences with data symbols, H. Zhu, B. Farhang-Boroujeny, and C. Schlegel, "Pilot embedding for joint channel estimation and data detection in MIMO communication systems," IEEE Commun. Lett., vol. 7, no. 1, pp. 30-32, January 2003, investigated the performance of embedding the training sequences with data to estimate the channel. Unlike conventional methods where predetermined pilot symbols are time-multiplexed with useful information data symbols, a pilot-embedding method was proposed in H. Zhu, B. Farhang-Boroujeny, and C. Schlegel, "Pilot embedding for joint channel estimation and data detection in MIMO communication systems," IEEE Commun. Lett., vol. 7, no. 1, pp. 30-32, January 2003, where low power level predetermined pilots are transmitted concurrently with the useful data, and they are used to obtain an initial estimate of the channel such that a turbo decoding process can be started. Soft information obtained from the turbo decoder is subsequently used to improve channel estimates.

A decision directed iterative channel estimation method was proposed in X. Deng, A. M. Haimovich, and J. Garcia-Frias, "Decision directed iterative channel estimation for MIMO systems," in Proc. IEEE Int. Conf. on Communications, vol. 4, Anchorage, Ak., May 11-15, 2003, pp. 2326-2329.

All the proposed channel estimation schemes rely on an initial estimation of the MIMO channel based on the transmission of pure predetermined training sequences.

SUMMARY

According to an embodiment, an apparatus for estimating a wireless radio channel from a relay station to a first terminal, wherein the first and a second terminal transmit first and second information to the relay station in a first time interval and the relay station transmits a superposition of the first information and the second information to the first and second terminal in a second time interval subsequent to the first time interval, may have: a receiver for receiving, in the second time interval, a signal including the superposition of the first information and the second information; a storage for storing the first information transmitted in the first time interval; and a channel calculator for calculating the wireless radio channel using the received signal and the stored first information as pilot information for the received signal.

According to another embodiment, a wireless communications system may have: a first terminal adapted to transmit first information in a first time interval, and to store the transmitted first information; a second terminal adapted to transmit second information in the first time interval; a relay station adapted to receive the first and second information in the first time interval, and to transmit a signal including a superposition of the received first and second information in a second time interval, wherein the first terminal includes an apparatus for estimating a wireless radio channel from relay station to the first terminal, the apparatus including a receiver for receiving a received version of the signal including the superposition of the received first and second information; and a channel calculator for calculating the wireless radio channel using the received version of the signal and the stored first information as pilot information for the received signal.

According to another embodiment, a method for estimating a wireless radio channel from a relay station to a first terminal, wherein the first and a second terminal transmit first and second information to the relay station in a first time interval and the relay station transmits a superposition of the first information and the second information to the first and second terminal in a second time interval subsequent to the first time interval, may have the steps of: storing the first information transmitted from the first terminal in the first time interval; receiving, in the second time interval, a signal including the superposition of the first information and the second information; and calculating the wireless radio channel using the received signal and the stored first information as pilot information for the received signal.

Another embodiment may have a computer program for performing the method for estimating a wireless radio channel from a relay station to a first terminal, wherein the first and a second terminal transmit first and second information to the relay station in a first time interval and the relay station transmits a superposition of the first information and the second information to the first and second terminal in a second time interval subsequent to the first time interval, the method having the steps of: storing the first information transmitted from the first terminal in the first time interval; receiving, in the second time interval, a signal including the superposition of the first information and the second information; and calculating the wireless radio channel using the received signal and the stored first information as pilot information for the received signal, when the computer program is executed on a computer and/or microcontroller.

In accordance with a further aspect, embodiments of the present invention provide a computer program for carrying out the inventive method for estimating a wireless radio channel.

In accordance with yet a further aspect, the present invention provides a wireless communication system comprising the inventive apparatus for estimating a wireless radio channel.

Embodiments of the present invention provide a method for estimating a wireless radio channel between a first terminal or transmitter device and a relay station, the method comprising storing previously transmitted first information from the first terminal, receiving a signal comprising a superposition of the previously transmitted first information from the first terminal and second information from a second terminal or transmitter device, the second terminal also communicating with the relay station, and calculating the wireless radio channel using the received signal and the stored first information as pilot information for the received signal.

Further embodiments of the present invention provide an apparatus for estimating a wireless radio channel between a first terminal or transmitter device and a relay station, the apparatus comprising a receiver for receiving a signal comprising a superposition of previously transmitted first information from the first terminal and second information from a second terminal or transmitter device, the second terminal also communicating with a relay station, a storage for storing the previously transmitted first information, and a channel calculator for calculating the wireless radio channel using the received signal and the stored first information as pilot information for the received signal.

The first and second terminal transmit the first and second information to the relay station in the first time interval, respectively. In the second time interval, subsequent to the first time interval, the relay station transmits the superposition of the first information and the second information to the first and second terminal. According to embodiments of the present invention, the storage is adapted to store useful data corresponding to the first information in the first time interval. Further, the apparatus is adapted to use the stored useful data as an input for the channel calculator in the subsequent second time interval to obtain an estimate of the wireless radio channel from the relay station to the first terminal. Hence, the channel calculator uses the stored useful data from the first time interval as quasi-pilot symbols for the channel estimation in the second time interval of the two-way relaying scheme. It should be emphasized that the useful data corresponding to the first information of the first time interval is not predetermined pilot information, i.e., it is independent of useful data corresponding to first information transmitted by the first terminal in a time interval subsequent to or preceding the first time interval.

According to embodiments of the present invention the first terminal or transmitter device may be comprised by a mobile station, wherein the second terminal or transmitter device may be comprised by a base station. According to yet further embodiments, the first terminal may be comprised by a base station, wherein the second terminal may be comprised by a mobile station. Hence, an apparatus for estimating the wireless radio channel or a channel estimator according to embodiments of the present invention may be located within a base station or a mobile station. In this specification it is assumed that a channel estimator according to embodiments of the present invention is located within a mobile station although, as mentioned before, it could also be comprised by a base station.

Embodiments of the present invention provide a concept for jointly estimating a wireless radio channel and the second information from the second terminal at the first terminal utilizing the first information re-transmitted by the relay station in the second time interval of the two-way decode-and-forward relaying. The first information can also be considered as self-interference.

In order to further improve an estimation of the wireless radio channel, the channel calculator may be adapted to calculate an estimate of the wireless radio channel in the second time interval using the received signal, the stored first information and, additionally, predetermined pilot or training information received from the relay station in the second time interval.

The inventive concept exploits an inherent quasi-orthogonality of the first information or the self-interference transmitted from different antennas to estimate a wireless MIMO channel. The inventive concept can be used for both frequency flat and frequency selective wireless channels.

Channel estimation and channel tracking in the second time interval can be completely accomplished by utilizing the first information transmitted from e.g. the mobile station to the relay station in the first time interval and send back from the relay station to the mobile station together with the second information from e.g. the base station in the second time interval. Training sequences are no longer needed to be transmitted from the relay station. Alternatively, shorter training sequences can be used together with the first information or the self-interference to achieve better channel estimation performances compared to estimated the wireless radio channel only based on a self-interference. Hence, the benefit of channel estimation comes at no extra costs and spectral efficiency can be improved according to embodiments of the present invention.

Further, embodiments of the present invention provide an iterative channel estimation concept. In a first iteration the wireless radio channel is estimated based on the received signal and the first information (self-interference). Based on this first channel estimate useful data corresponding to the second information from e.g. the base station can be decoded at the mobile station. The decoded second information can be used together with the first information and the received signal in order to obtain an improved estimate of the wireless radio channel.

Conventional channel estimation schemes using superimposed pilots or training sequences spend power on those training sequences to do channel estimation. Traditional two-way relaying schemes just cancel the self-interference instead of utilizing it. Embodiments of the present invention instead utilize the self-interference as quasi-pilot symbols in order to perform a channel estimation. The benefit of this channel estimation comes at no extra costs and spectral efficiency can be further improved since no extra training symbols may be used at the relay station.

BRIEF DESCRIPTION OF THE DRAWINGS

Embodiments of the present invention will be detailed subsequently referring to the appended drawings, in which:

FIGS. 6a,b shows simulation results using orthogonal and non-orthogonal pilots to estimate the wireless radio channel according to embodiments of the present invention.

FIGS. 8a,b show simulation results of a usage of self-interference to improve pilot base channel estimation according to an embodiment of the present invention;

FIGS. 9a,b show simulation results for a comparison of LS versus MMSE channel estimation according to embodiments of the present invention;

FIGS. 13a,b show simulation results for initial channel estimation MSE over frame length according to embodiments of the present invention;

FIGS. 14a,b show simulation results for pilot assisted iterative least-squares channel estimation in a block-fading channel;

FIGS. 15a,b show simulation results for iterative least-squares channel estimation using self-interference block-fading channel according to embodiments of the present invention;

FIGS. 16a,b show simulation results for pilot assisted iterative LS channel estimation in block-fading channel;

FIGS. 17a,b show simulation results for iterative LS channel estimation using self-interference in block-fading channel according to further embodiments of the present invention;

FIGS. 18a,b show simulation results for pilot assisted iterative MMSE channel estimation in block-fading channels;

FIGS. 19a,b show simulation results for iterative MMSE channel estimation using self-interference in block-fading according to further embodiments of the present invention;

FIGS. 20a,b show simulation results for pilot assisted iterative MMSE channel estimation in block-fading channel;

FIGS. 21a,b show performance results for iterative MMSE channel estimation using self-interference block-fading channel according to embodiments of the present invention;

FIGS. 22a,b show simulation results for pilot assisted iterative MMSE channel estimation in time-varying channel;

FIGS. 23a,b show simulation results for iterative MMSE channel estimation using self-interference in time-varying channel according to an embodiment of the present invention;

FIGS. 24a,b show simulation results for pilot assisted iterative MMSE channel estimation without forward error correction;

FIGS. 25a,b show simulation results for iterative MMSE channel estimation using self-interference in time-varying channel according to an embodiment of the present invention;

FIGS. 26a,b show simulation results for pilot assisted iterative LS channel estimation with forward error correction;

FIGS. 27a,b show simulation results for iterative LS channel estimation with forward error correction using self-interference according to an embodiment of the present invention;

FIGS. 28a,b show simulation results for iterative MMSE channel estimation with forward error correction using self-interference according to an embodiment of the present invention;

FIGS. 29a,b show simulation results for pilot assisted iterative channel estimation with forward error correction (time-varying channel);

FIGS. 31a,b show simulation results for pilot assisted iterative channel estimation with forward error correction (time-varying channel);

FIGS. 32a,b show simulation results for self-interference assisted iterative channel estimation with forward error correction according to further embodiments of the present invention (time-varying channel);

FIGS. 33a,b show simulation results for BER performances of iterative channel estimation with forward error correction using self-interference according to embodiments of the present invention;

FIGS. 34a,b show simulation results for MSE performance of iterative channel estimation with forward error correction using self-interference according to embodiments of the present invention;

FIGS. 35a,b show a comparison of MS data BER performance of iterative channel estimation with forward error correction in time-varying channels according to embodiments of the present invention;

FIGS. 36a,b show a comparison of BS data BER performance of iterative channel estimation with FEC in time-varying channels according to embodiments of the present invention;

FIGS. 37a,b show a comparison of MS data BER performance of iterative channel estimation with FEC in time-varying channels according to embodiments of the present invention; and FIGS. 38a,b show a comparison of BS data BER performance of iterative channel estimation with FEC in time-varying channels according to further embodiments of the present invention.

DETAILED DESCRIPTION OF THE INVENTION

Before embodiments of the present invention are explained in further detail a system model shall be elaborated in the following. The two-way relaying transmission scheme has been discussed in J. Zhao, B. Rankov, I. Hammerstroem, M. Kuhn, and A. Wittneben, "Second deliverable on MIMO multihop cellular networks," ETH Zurich, Tech. Rep., April 2006 and J. Zhao, I. Hammerstroem, M. Kuhn, and A. Wittneben, "Third deliverable on MIMO multihop cellular networks—two-way relaying in cellular systems: Coverage analysis and BER performance results," ETH Zurich, Tech. Rep., December 2006. In order to ease the understanding of embodiments of the present invention the underlying system model shall be recapitulated in the following.

Figure 1A:
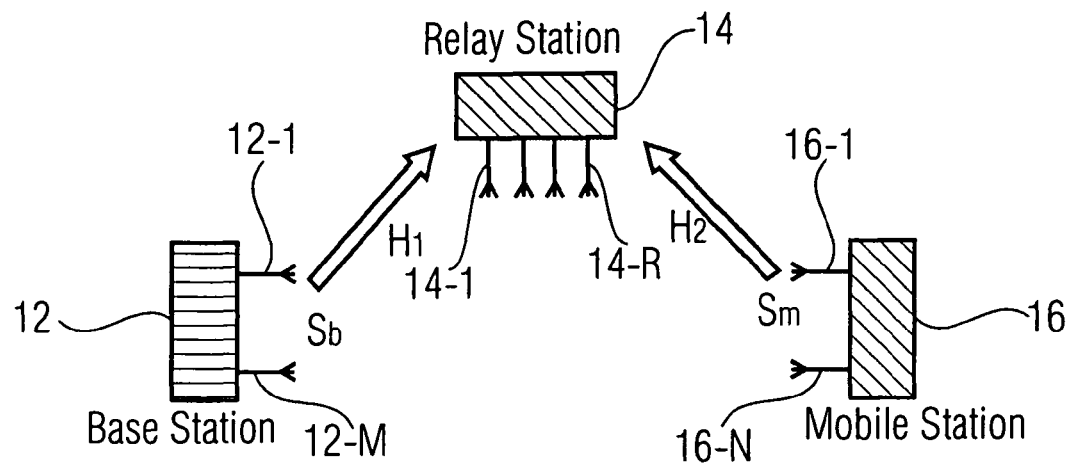
FIG. 1a shows an overview of a data transmission in a two-way relay network in a first time interval.
Figure 1B:
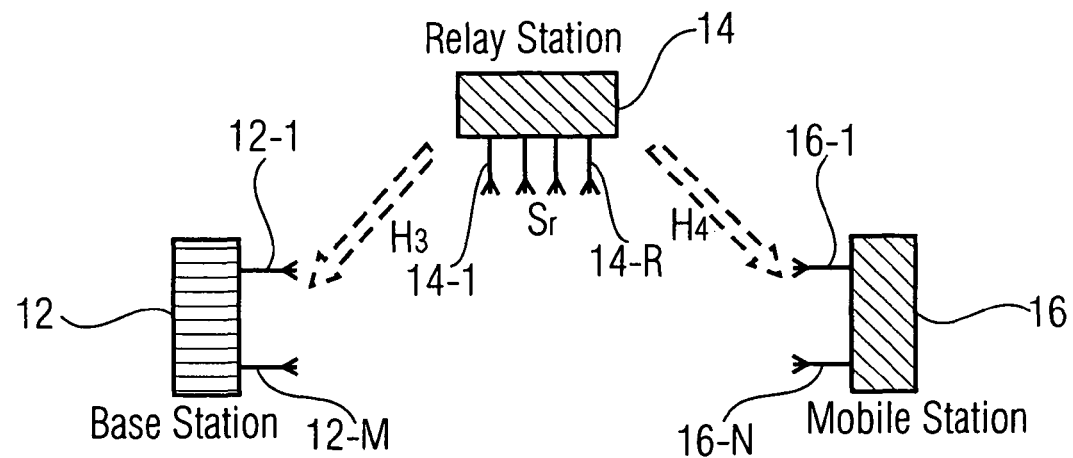
FIG. 1b shows an overview of data transmission in a two-way relay network in a second time interval.

Referring now to FIGS. 1a and 1b a two-way relaying network is shown, where a half-duplex relay station (RS) 14 assists a communication between a base station (BS) 12 and a mobile station (MS) 16. It is assumed that there is no direct connection or line-of-sight between the BS 12 and the MS 16 (e.g. due to shadowing or to large spatial separation). A number of base station antennas 12-1 to 12-M shall be denoted as M. A number of relay station antennas 14-1 to 14-R shall be denoted as R. A number of mobile station antennas 16-1 to 16-N shall be denoted as N.

The RS 14 is a decode-and-forward (DF) relay station, i.e. the RS 14 first decodes received signals from the BS 12 and the MS 16 in a first time interval or time phase $T_1$ before re-transmitting them superimposed in a subsequent second time interval $T_2$. DF relay stations do not suffer from noise enhancement, thus they may be advantageous in cellular systems compared to amplify-and-forward (AF) relay stations. In order to facilitate the decoding of the received signals at the RS 14 in the first time interval $T_1$, the RS 14 is equipped with R=(M+N) antennas 14-$r$ ($r$=1, 2, ..., R). Actually, the RS 14 can also decode the BS and MS signals even if R is smaller than M+N. However, in this case more complicated successive interference information (SIC) schemes would have to be applied, which shall not be described in further detail in this specification. In a realistic scenario the BS 12 may serve a plurality of RS 14 at the same time. I.e. the number of BS antennas may be larger than M, but M spatial streams are used to communicated with the RS 14.

As shown in FIGS. 1a and 1b the two-way relaying transmission scheme comprises two subsequent time intervals $T_1$ and $T_2$. In the first time interval $T_1$ shown in FIG. 1a, the MS 16 and the BS 12 simultaneously transmit first and second information to the RS 14. Exemplarily the information transmitted from the MS 16 to the RS 14 in the first time interval $T_1$ shall be denoted as first information, wherein the information transmitted from the BS 12 to the RS 14 within the first time interval $T_1$ shall be denoted as second information throughout this specification. I.e., MS 16 corresponds to the first terminal and BS 12 corresponds to the second terminal. Naturally the nomenclature could also be vice versa.

Referring to FIG. 1a, a data symbol vector representing the first information transmitted from the MS 16 to the RS 14 during the first time interval $T_1$ at discrete time instant k shall be denoted as $s_{m,k}$. A data symbol vector representing the second information transmitted from the BS 12 to the RS 14 during the first time interval $T_1$ at discrete time instant k shall be denoted as $s_{b,k}$. $s_{b,k}$ and $s_{m,k}$ denote (M×1) and (N×1) complex valued symbol vectors comprising modulated data symbols, e.g. according to PSK—(Phase Shift Keying), QAM—(Quadrature Amplitude Modulation) or other modulation schemes. The data symbol vectors $s_{b,k}$ and $s_{m,k}$ are both subject to a power constraint at the BS 12 and MS 16, i.e. $E(s_{b,k}{}^H s_{b,k})=P_{BS}$ and $E(s_{m,k}{}^H s_{m,k})=P_{MS}$, where $E(.)$ denotes the expected value and $.^H$ denotes the Hermitian transpose. Here, $P_{BS}$ and $P_{MS}$ denote the overall available transmit power for the M BS-antennas 12-m (m=1, . . . , M) and the N MS-antennas 16-n (n=1, . . . , N), respectively.

The received (R×1) signal vector $y_r$ at the RS 14 during the first time interval $T_1$ at time instant k can be expressed as $$y_{r,k} = H_1 s_{b,k} + H_2 s_{m,k} + n_{r,k}, \quad (1)$$

where $H_1$ denotes a (R×M) wireless radio channel matrix from the BS 12 to the RS 14 and $H_2$ denotes a (R×N) wireless radio channel matrix from the MS 16 to the RS 14. $n_{r,k}$ denotes a (R×1) Gaussian noise vector at the RS 14, and it is assumed that $n_{r,k} \sim CN(0, \sigma_r^2 I)$. $\sigma_r^2$ denotes the received noise variance at the RS 14. $CN(x,y)$ thereby indicates a normally distributed complex-valued random variable with mean x and variance $y \geq 0$.

The RS 14 decodes both the data symbols corresponding to the first information from the MS 16 and the data symbols corresponding to the second information from the BS 12 using the received signal vector $y_{r,k}$. This corresponds to a multiple access scenario. Many existing MIMO receiver structures such as, for example, MMSE-SIC (Minimum Mean Square Error Successive Interference Cancellation) receivers are applicable and can be found in literature, e.g. D. Tse and P. Viswanath, "Fundamentals of Wireless Communication", Cambridge University Press, 2005. Typically, the RS 14 has to estimate the wireless MIMO channels $H_1$ and $H_2$ for detecting the symbol vectors $s_{b,k}$ and $s_{m,k}$. Therefore, predetermined training sequences might be send to the RS 14 from the BS 12 and the MS 16 in the first time interval $T_1$, respectively.

Referring now to FIG. 1b, the RS 14 re-encodes the decoded first and second information from the MS 16 and the BS 12, respectively, and then re-transmits a symbol vector $s_{r,k}$ in the second time interval $T_2$ at a discrete time instant k. The symbol vector $s_{r,k}$ is a function of the detected symbol vectors $s_{b,k}$ and $s_{m,k}$, i.e. $s_{r,k}=f(s_{b,k}, s_{m,k})$. For example, XOR-based re-encoding and superposition coding based re-encoding have been discussed in the literature. In this specification only the superposition coding based re-encoding scheme is considered for the re-transmission in the second time interval $T_2$ of the relay scheme.

The decoded symbol vectors corresponding to the first information from the MS 16 and corresponding to the second information from the BS 12 shall be denoted as $\hat{s}_{m,k}$ and $\hat{s}_{b,k}$, respectively. $\hat{s}_{m,k}$ and $\hat{s}_{b,k}$ are (N×1) and (M×1) complex valued symbol vectors, respectively, comprising modulated data symbols. In the second time interval $T_2$, the RS 14 adds the decoded symbol vectors $\hat{s}_{m,k}$ and $\hat{s}_{b,k}$ together and re-transmits the decoded symbol vectors $\hat{s}_{m,k}$ and $\hat{s}_{b,k}$ simultaneously to the BS 12 and the MS 16 according to $$s_{r,k} = R_3 \hat{s}_{b,k} + R_4 \hat{s}_{m,k}, \quad (2)$$

wherein $R_3$ and $R_4$ represent (R×M) and (R×N) preceding matrices, respectively. In order to satisfy the power constraint, $E(s_{r,k}{}^H s_{r,k})=P_{RS}$, wherein $P_{RS}$ denotes the overall available transmit power for the R RS-antennas 14-r (r=1, . . . , R). According to embodiments of the present invention, the preceding matrices $R_3$ and $R_4$ are both known at both the BS 12 and the MS 16. For example, $R_3$ and $R_4$ can both be transferred from the RS 14 to the BS 12 and the MS 16, respectively.

The transmitted information $s_{r,k}$ contains both the MS data symbols $\hat{s}_{m,k}$ corresponding to the decoded first information and the BS data symbols $\hat{s}_{b,k}$ corresponding to the decoded second information. That is, given faultless decoding at the RS 14, part of the data $s_{r,k}$ transmitted from the RS 14 is already known at the BS 12 and/or the MS 16. Hence, in the second time interval $T_2$, the BS 12 and the MS 16 can both cancel their own known data (self-interference) transmitted in the first time interval $T_1$ and decode the data from the other side, respectively. For the MS 16, the self-interference corresponds to the first information $s_{m,k}$ transmitted to the relay station 14 in the first time interval $T_1$. For the BS 12, the self-interference corresponds to the second information $s_{b,k}$ previously transmitted from the BS 12 to the RS 14 in the first time interval $T_1$.

The signal received at the BS 12 in the second time interval $T_2$ at time instant k can be written as $$y_{b,k} = H_3 s_{r,k} + n_{b,k} \quad (3)$$

$$= \underbrace{H_3 R_3 \hat{s}_{b,k}}_{\text{self-interference}} + H_3 R_4 \hat{s}_{m,k} + n_{b,k}. \quad (4)$$

Similarly, the signal received at the MS 16 in the second time interval $T_2$ at time instant k can be written as $$y_{m,k} = H_4 s_{r,k} + n_{m,k} \quad (5)$$

$$= H_4 R_3 \hat{s}_{b,k} + \underbrace{H_4 R_4 \hat{s}_{m,k}}_{\text{self-interference}} + n_{m,k}, \quad (6)$$

where $H_3$ denotes a (M×R) wireless radio channel matrix from the RS 14 to the BS 12 and $H_4$ denotes a (N×R) wireless radio channel matrix from the RS 14 to the MS 16. $n_{b,k}$ is a (M×1) additive Gaussian noise vector at BS 12 with $n_b \sim CN(0, \sigma_b^2 I)$. $\sigma_b^2$ denotes the received noise variance at the BS 12. $n_{m,k}$ is a (N×1) additive noise vector at MS 16 with $n_m \sim CN(0, \sigma_m^2 I)$. $\sigma_m^2$ denotes the received noise variance at the MS 16. The BS 12 and MS 16 know the self-interference part of their own, respectively. If the decoding at RS 14 is prefect in the first time interval $T_1$, we have $\hat{s}_{b,k}=s_{b,k}$ and $\hat{s}_{m,k}=s_{m,k}$.

If the MS 16 (or BS 12) also knows the channel matrix $H_4$ (or $H_3$) together with the precoding matrices $R_3$ and $R_4$, the MS 16 (or BS 12) can also perfectly cancel its self-interference. After canceling the self-interference, the remaining part of $y_{m,k}$ (or $y_{b,k}$) only contains the useful data symbols of the second information transmitted by the BS 12 (or MS 16) in the first time interval. The remaining problem is a conventional MIMO receiver decoding problem.

As it can be seen from the discussions above, the decoding performance at the receivers in the second phase is highly dependent on the accuracy of the channel knowledge about $H_3$ or $H_4$. On the other hand, the first information of the first time interval $T_1$ or the self-interference can also lead to information about the channel $H_4$ in the second time interval $T_2$. In the following, we consider how to use the self-interference to estimate the channel $H_4$ in the second time interval $T_2$ at the MS 16. Similar discussions also apply to the BS 12.

Figure 2:
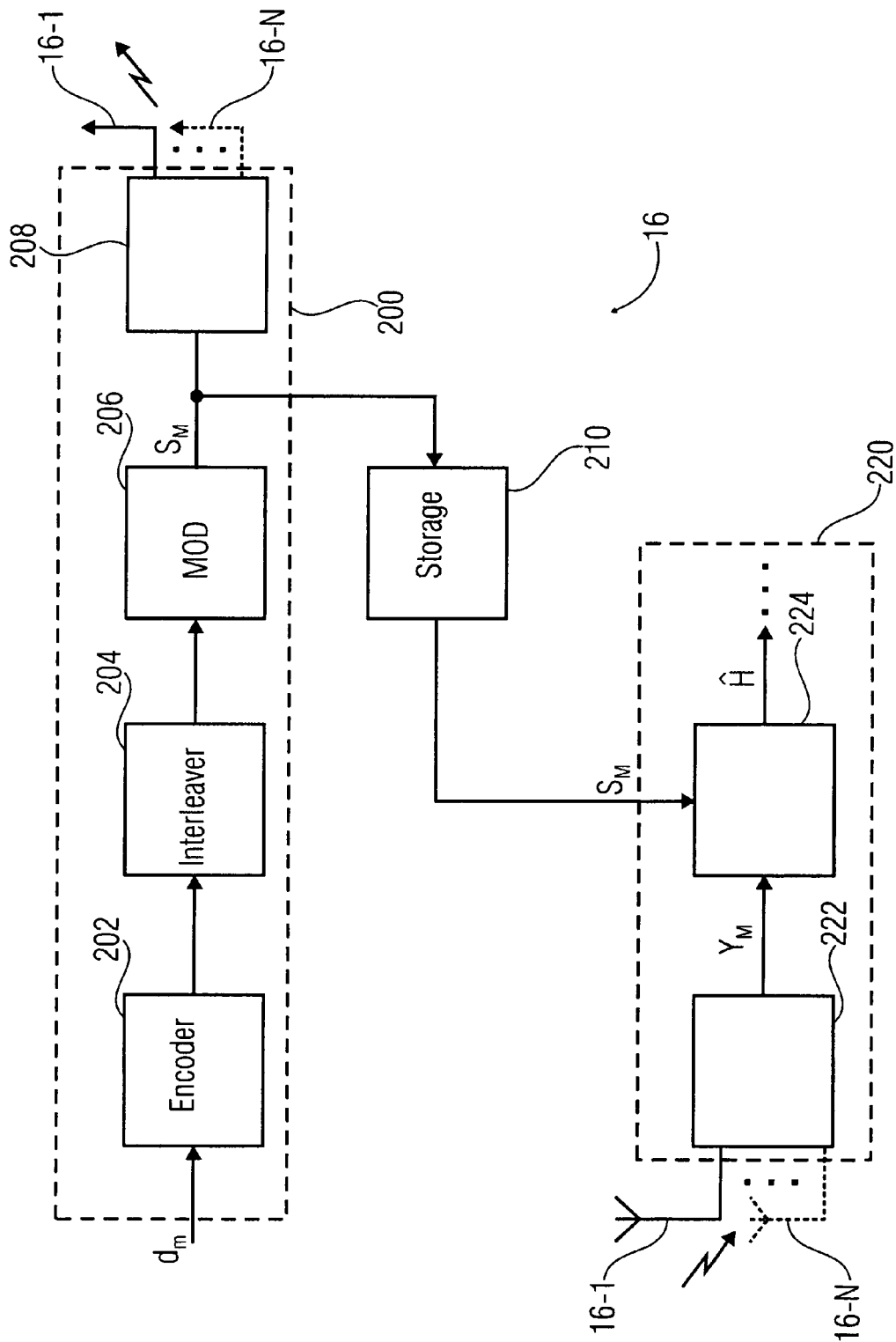
FIG. 2 shows a block diagram of a terminal with an apparatus for estimating a wireless channel according to an embodiment of the present invention.

FIG. 2 shows a block diagram of a MS 16 according to an embodiment of the present invention.

The MS 16 comprises a transmitter section 200 and a receiver section 220. The transmitter section 200 comprises an encoder 202 for encoding data bits $d_m$. The encoder 202 can, for example, be a convolutional channel encoder. An output of the encoder 202 is coupled to an input of an interleaver 204. The interleaver 204 can spread or interleave the encoded data bits $d_m$ over a plurality of successive transmission time intervals in order to reduce negative effects of deep wireless radio channel fades. The interleaver 204 is coupled to a modulator 206 in order to assign a certain number of encoded and interleaved bits to a modulation symbol $s_m$ of a complex code alphabet, such as, for example, M-PSK or QAM modulation, etc. The modulation symbols $s_m$ are then used as an input for a transmitter front end 208 where the modulation symbols $s_m$ are modulated on a carrier and possibly spread over a plurality of antennas 16-1 to 16-M to obtain the data symbol vector $s_{m,k}$ representing the first information transmitted from the MS 16 to the RS 14 during the first time interval $T_1$ at time instant k. For example, the first time interval $T_1$ may comprise K discrete time instants or time slots, such that k=1, . . . , K.

The first information comprising the data symbols $s_m$ or data symbol vectors $s_{m,k}$ (k=1, . . . , K) of the first time interval $T_1$ can be placed into a storage 210. In the storage 210, the data symbols $s_m$ of the first time interval $T_1$ can be stored in suitable format. For example, the data symbol vectors $s_{m,k}$ may be stored in the form $s_m = [R_4 s_{m,1}, R_4 s_{m,2}, \ldots, R_4 s_{m,K}]$. That is, the first information comprising the data symbols $s_m$ can be stored in a symbol matrix $S_m$ which corresponds to a transmission matrix used by the relay station 14. For example, the storage 210 could be a memory, such as an integrated semiconductor memory in form of a dynamic RAM (Random Access Memory). According to embodiments of the present invention, the storage 210 is adapted to store the symbol matrix $S_m$ for the duration of at least one transmission time interval. In other words, by means of the storage 210, the first information $S_m$ can be delayed for the duration of one transmission time interval from first time interval $T_1$ to second time interval $T_2$.

In order to receive a signal comprising a superposition of the previously transmitted first information from the transmitter section 200 and a second information from a second terminal or transmitter device (for example, located in the BS 12), the second terminal also communicating with a relay station 14, the MS 16 comprises a receiver device 220 with a front-end receiver 222 for receiving the signal comprising the superposition of the first and second information.

According to embodiments of the present invention, the receiver device 220 also comprises a channel calculator 224, which is coupled to the front-end receiver 222 and the storage 210. From the front-end receiver 222, the channel calculator 224 can receive the received signal $y_{m,k}$, whereas from the storage 210, the channel calculator 224 can receive the stored first information, e.g. in form of the symbol matrix $S_m$, transmitted from the transmitter section 200 in the previous time interval $T_1$. Based on the received signal $y_{m,k}$ comprising the superposition of the first and second information $s_{m,k}$, $s_{b,k}$ (k=1, . . . , K) and the stored first information $S_m$, the channel calculator 224 can calculate an estimate of the wireless radio channel $H_4$ from the RS 14 to the MS 16. Thereby, the previously transmitted and stored first information $S_m$ can be used as pilot or training information for the received signal $y_{m,k}$ comprising the superposition of the previously transmitted first information $s_{m,k}$ (k=1, . . . , K) from the MS 16 and the second information $s_{b,k}$ (k=1, . . . , K) from the BS 12.

Although embodiments of the present invention are explained using a MS 16, similar discussions also apply to the BS 12. It shall be emphasized that embodiments of the present invention can be incorporated into both BS 12 and/or MS 16.

In the following, a low-mobility environment, where the wireless radio channels are frequency flat block-fading, is considered. This, for example, corresponds to a single sub-carrier in OFDM (Orthogonal Frequency Division Multiplexing) transmission. The (N×1) received signal vector $y_{m,k}$ at the MS 16 in the second time interval $T_2$ has been expressed in equation (5). It is assumed that the wireless radio channel matrix $H_4$ corresponding to the MIMO wireless radio channel between RS 14 and MS 16 remains constant during a transmission period of K symbols per transmit antenna, where K≧R. In other words, K corresponds to the number of discrete time instants k during the second transmission interval $T_2$. It is assumed that the transmitted symbol vectors from the RS 14 during the second transmission interval $T_2$ are $s_{r,1}$, $s_{r,2}$, . . . , $s_{r,K}$. Hence, a corresponding (N×K) received signal matrix at the MS 16 $Y_m = [y_{m,1}, y_{m,2}, \ldots, y_{m,K}]$ can be expressed as $$Y_m = H_4 S_r + N_m \tag{7}$$

$$= H_4(\hat{S}_b + \hat{S}_m) + N_m, \tag{8}$$

where $S_r = [s_{r,1}, s_{r,2}, \ldots, s_{r,K}]$, $\hat{S}_b = [R_3 \hat{s}_{b,1}, \ldots, R_3 \hat{s}_{b,K}]$ and $\hat{S}_m = [R_4 \hat{s}_{m,1}, \ldots, R_4 \hat{s}_{m,K}]$ are the (R×K) transmitted symbol matrices and $N_m = [n_{m,1}, \ldots, n_{m,K}]$ is the (N×K) matrix of additive noise.

Least Square (LS) Channel Estimation

In a traditional training-sequence based channel estimation, both $Y_m$ and $S_r$ are known at the MS receiver device 220, wherein $S_r$ would comprise the predetermined training-sequences. The channel matrix $H_4$ of the wireless MIMO channel from the RS 14 to the MS 16 can be estimated using the least square methods, which can be expressed as $$\hat{H}_{4,LS} = Y_m S_r^\dagger, \tag{9}$$

where $S_r^\dagger = S_r^H (S_r S_r^H)^{-1}$ denotes the Moore-Penrose pseudo-inverse of $S_r$. In M. Biguesh and A. B. Gershman, "Training-based MIMO channel estimation: A study of estimator tradeoffs and optimal training signals," IEEE Trans. Signal Processing, vol. 54, no. 3, pp. 884{893, March 2006, it was shown that subject to a constant transmitted training power constraint, a channel estimation error is minimized when the training matrix $S_r$ has orthogonal rows with the same norm. That is, orthogonal sequences are transmitted by each transmit antenna.

However, in the present two-way relaying case, the matrix $S_r$ is not completely known at the MS receiver device 220 before decoding. It can be seen from equation (8) that the MS receiver device 220 does not have any knowledge of the second information $\hat{S}_b$ before decoding the related data symbols transmitted from the BS 12 in the first time interval $T_1$. However, according to embodiments of the present invention one can still get an estimation of the wireless MIMO radio channel $H_4$ by using the received signal $Y_m$ and the stored first information $S_m = [R_4 s_{m,1}, \ldots, R_4 s_{m,K}]$ as pilot information for the received signal $Y_m$, i.e. the channel estimator 224 is adapted to estimate the wireless channel based on $$\hat{H}_{4,LS} = Y_m S_m^\dagger, \tag{10}$$

$$= [H_4(\hat{S}_b + \hat{S}_m) + N_m] S_m^\dagger. \tag{11}$$

Here it is assumed that $\hat{S}_m = S_m$, i.e., perfect decoding of $S_m$ at RS 14 in the first time interval $T_1$. The transmit power of $S_m$ is limited by the following constraint $$\|S_m\|_F^2 = \text{tr}\{S_m^H S_m\} = \alpha P_{RS} K, \quad (12)$$

wherein $\|.\|_F^2$ denotes the Frobenius norm and $\alpha < 1$ is a constant and denotes the portion of RS power assigned for transmitting MS data.

The mean squared error (MSE) $\epsilon$ of LS channel estimation can be expressed as $$\varepsilon = E\{\|H_4 - \hat{H}_{4,LS}\|_F^2\} \quad (13)$$

$$= E\{\|H_4 \hat{S}_b S_m^\dagger + N_m S_m^\dagger\|_F^2\} \quad (14)$$

$$= E\{\|H_4 \hat{S}_b S_m^H (S_m S_m^H)^{-1}\|_F^2\} + E\{\|N_m S_m^\dagger\|_F^2\}. \quad (15)$$

The first term in equation (15) is minimized when $\hat{S}_b$ and $S_m$ are orthogonal, i.e. $\hat{S}_b S_m^H = 0$. The second term in equation (15) is shown to be minimized in M. Biguesh and A. B. Gershman, "Training-based MIMO channel estimation: A study of estimator tradeoffs and optimal training signals," IEEE Trans. Signal Processing, vol. 54, no. 3, pp. 884-893, March 2006, when the matrix $S_m$ comprising the first information has orthogonal rows with the same norm, subject to the power constraint of equation (12).

Since $\hat{S}_b$ and $S_m$ are data matrices comprising modulated useful information and their length K is finite, the orthogonality condition is rarely satisfied. However, this condition can be approximately satisfied in traditional QAM or PSK modulated systems if the transmitted sequence is long enough, i.e., $K \to \infty$. This is because the MS and BS data streams, i.e. first and second information, are independent, and the data streams transmitted by each RS antenna 14-r ($r = 1, \ldots, R$) are also independent. This means the first term in equation (15) will asymptotically approach 0 as the channel coherence time increases.

In the following simulation results, the MSE of channel estimation is defined as $$\varepsilon_{MSE} = E\left\{\frac{\|H_4 - \hat{H}_{4,LS}\|_F^2}{NR}\right\} \quad (16)$$

and used as a performance measure.

FIGS. 6a,b show simulation results using orthogonal or non-orthogonal pilots transmitted from different antennas to estimate a wireless radio channel assuming a SNR equal to 10 dB and $\alpha = 0.5$.

Figure 5:
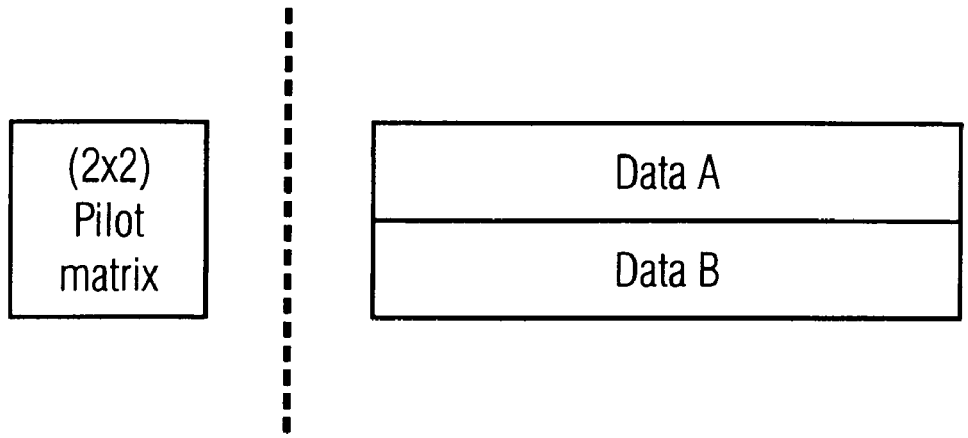
FIG. 5 schematically shows a 2×2 pilot matrix and non-orthogonal first and second information to estimate a wireless radio channel.

FIGS. 6a,b compare the performance of MIMO channel estimation using orthogonal pilot symbol sequences or superimposed non-orthogonal known data sequences (self-interference) using the aforementioned least-squares estimation scheme. In FIG. 6a, a MIMO system is considered, where each transmitter and receiver is equipped with 2 antennas. For the orthogonal pilot case, columns of a unitary matrix are transmitted on different transmit antennas, as indicated on the left side of FIG. 5. The power of each pilot symbol in a first time interval is the same as the power of the superimposed data symbols in a following second time interval. For the non-orthogonal pilot case, two equally powered random sequence of 4QAM symbols are superimposed on each transmit antenna and transmitted. One sequence corresponds to the first information and is known by MS 16 (Data A) and the other corresponds to the second information and is known by BS 12 (Data B) (c.f. FIG. 5 right side). MS 16 and BS 12 use the known data of their own, respectively, to estimate the MIMO channel according to equation (10).

It is shown in FIG. 6a that when orthogonal pilot sequences are used (curves 61, 62), the channel estimation error can be much smaller than in the case when non-orthogonal sequences are used (curves 63, 64). This is because of the remaining estimation error in equation (15) for the finite block or sequence length K. For example, in FIG. 6a, when the block length is K=25 for the non-orthogonal pilot case, the MSE of the LS channel estimation is to be below $\times 10^{-1}$, which can be achieved by transmitting orthogonal pilots and a block length K=2. But as the block length K increases (the longer the channel stays constant), the MSE decreases.

For a (4×4) MIMO channel FIG. 6b shows that the herein presented channel estimation is also efficient. Thus the inventive scheme does not only work for a (2×2) MIMO channel.

Figure 7:
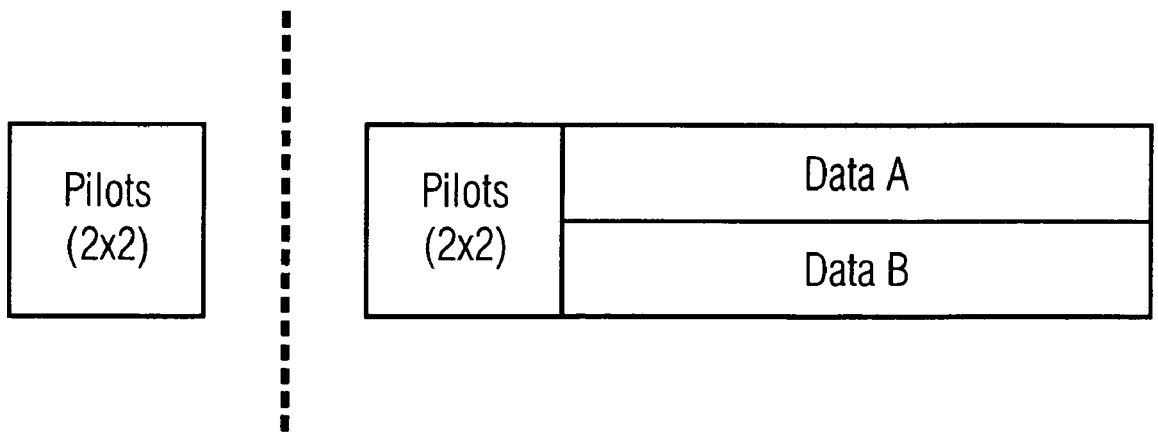
FIG. 7 shows a comparison of orthogonal pilots and orthogonal pilots in combination with non-orthogonal first and second information to improve pilot estimated channel estimation according to an embodiment of the present invention.

In FIGS. 6a,b channel estimation schemes using orthogonal pilot sequences or using superimposed non-orthogonal information as pilot sequences have been compared. According to embodiments of the present invention the benefit of both can be combined by, within the second time interval $T_2$, e.g. first transmitting a short orthogonal pilot sequence $S_{pilot}$ and then transmitting the superimposed first and second data sequences $S_m$, $S_b$, where one data sequence is known at the receiver (e.g. $S_m$). This is shown in FIG. 7. The LS estimation of the channel can be expressed as $$\hat{H}_{4,LS} = Y_m [S_{pilot} S_m]^\dagger, \quad (17)$$

where $S_{pilot}$ stands for the transmitted pilot matrix and $S_m$ stands for the known previously transmitted first information. Hence, according to embodiments of the present invention, the channel calculator 224 is adapted to calculate the estimate $\hat{H}_{4,LS}$ of the wireless radio channel $H_4$ using the received signal $Y_m$, the stored first information $S_m$ and additional predetermined pilot information $S_{pilot}$ received from the relay station 14.

FIGS. 8a,b show simulation results for the channel estimation performance if self-interference is used to improve the pilot-aided channel estimation according to an embodiment of the present invention.

It can be seen that the MSE of channel estimation is better than in the case when self-interference is solely used to estimate the channel (c.f. FIG. 6a). The curve 81 is the same as FIG. 6a. In the curves 83, 84 of FIG. 8a, one (2×2) orthogonal pilot matrix is placed in front of the superimposed data streams comprising the first and second information (cf. FIG. 7, right). Again as in the previous comparison, the power of a pilot symbol is two times the power of a data symbol because of the relay power constraint, i.e., half of the transmission power for the BS and another half for the MS data. No CSIT (Channel State Information at Tx) is available at the RS 14. The MSE of the LS method for the (2×2) pilot with data case (curves 83, 84) increases compared to the (2×2) pilot only case (curves 81, 82). This is because the self-interference interferes the channel estimation of pilots. But at a certain block length K, the MSE will decrease. For example, when the block length K=100, the MSE is smaller than the case that we just use pilots in the first two time instants k=1,2.

In FIG. 8b, the performance of a receiver embodiment is shown that estimates the wireless radio channel only based on pilots if the block length that may be used is not given (curves 87, 88). However, if the block is long enough, the channel estimation is based on pilots and self-interference.

Minimum Mean Square Error (MMSE) Channel Estimation

Now a linear channel estimator that minimizes the channel estimation MSE according to equation (8) shall be derived. It can be expressed in the following general form:

$$\hat{H}_{4,MSE} = Y_m G, \quad (18)$$

where G is obtained so that the MSE of the channel estimation error is minimized, i.e., $$G = \arg\min_G E\{\|H_4 - \hat{H}_{4,MMSE}\|_F^2\} \quad (19)$$

$$= \arg\min_G E\{\|H_4 - Y_m G\|_F^2\}. \quad (20)$$

The estimation error can be expressed as $$\varepsilon = E\{\|H_4 - Y_m G\|_F^2\} \quad (21)$$

$$= tr\{R_H\} - tr\{R_H S_r G\} - tr\{G^H S_r^H R_H\} + \quad (22)$$
$$tr\{G^H(S_r^H R_H S_r + \sigma_d^2 NI)G\}$$

where $R_H = E[H_4^H H_4]$.

The optimal G can be found by $\partial\varepsilon/\partial G = 0$ and is given by $$G = (S_r^H R_H S_r + \sigma_d^2 NI)^{-1} S_r^H R_H. \quad (23)$$

Hence, if $S_r$ and $R_H$ are known at the receiver, the channel calculator 224 can compute a linear MMSE estimate of the wireless channel $H_4$ based on $$\hat{H}_{4,MMSE} = Y_m(S_r^H R_H S_r + \sigma_d^2 NI)^{-1} S_r^H R_H. \quad (24)$$

Schemes on how to estimate the channel autocorrelation matrix $R_H$ at the receiver device 220 can be found in e.g. A. Paulraj, R. Nabar, D. Gore, "Introduction to Space-Time Wireless Communications," Cambridge University Press, 2003.

In the present two-way relaying case, the matrix $S_r$ is not completely known at the MS receiver device 220 before decoding the second information $S_b$. It can be seen from equation (8), the MS receiver device 220 does not have any knowledge of $S_b$ before decoding. According to embodiments of the present invention it is still possible to get an estimation of the wireless MIMO radio channel $H_4$ by just using the first information $S_m = [R_4 s_{m,1}, \ldots, R_4 s_{m,K}]$, i.e., $$\hat{H}_{4,MMSE} = Y_m(S_m^H R_H S_m + R_{S_b H} + \sigma_d^2 NI)^{-1} S_m^H R_H. \quad (25)$$

where $R_{S_b H} = E[S_b^H R_H S_b]$.

FIGS. 9a,b show MSE performance comparisons of the LS method and the MMSE method. A (2×2) MIMO system is considered, i.e. 2 antennas at the RS 14 and 2 antennas at the MS 16 and/or BS 12. It is assumed that no CSIT is available at RS 14, and equal power for MS and BS data, i.e. first and second information, is allocated in the second transmission time interval $T_2$ at RS 14. A block fading channel model is used where it is assumed that the channel remains constant for a block length of K=32. The channel varies from block to block. In each channel realization, each entry in the MIMO channel $H_4$ is an i.i.d. (independently and identically distributed) Rayleigh fading CN(0,1) random variable.

The solid curves 91, 92 assume the transmitted symbol matrix $S_r$ at relay 14 is known and the channel is calculated based on equation (9) or (24). It can be seen that the estimated MSE decreases linearly with the SNR (dB) (SNR=Signal-to-Noise Ratio). Since the transmitted data symbols matrix $S_r$ is known at the receiver device 220, the only cause of the estimated channel error comes from the noise. Another observation is that the LS and MMSE estimation methods have similar performance. In middle or high SNR (>10 dB) regions, their performances are even indistinguishable.

The dashed lines 93, 94 show the MSE performance of channel estimation using self-interference according to equation (10) and equation (25). This time, the MSE of channel estimation is much higher than that in the case when the transmitted data symbols are perfectly known. This is due to the remaining error according to equation (15). The MMSE channel estimation outperforms the LS method.

FIG. 9b shows the MSE of LS and MMSE method by varying the block length K. We can see that the LS (curve 96) and MMSE method (curve 95) have similar performance, especially when the block length is long.

Decision Directed Iterative Channel Estimation

Figure 3:
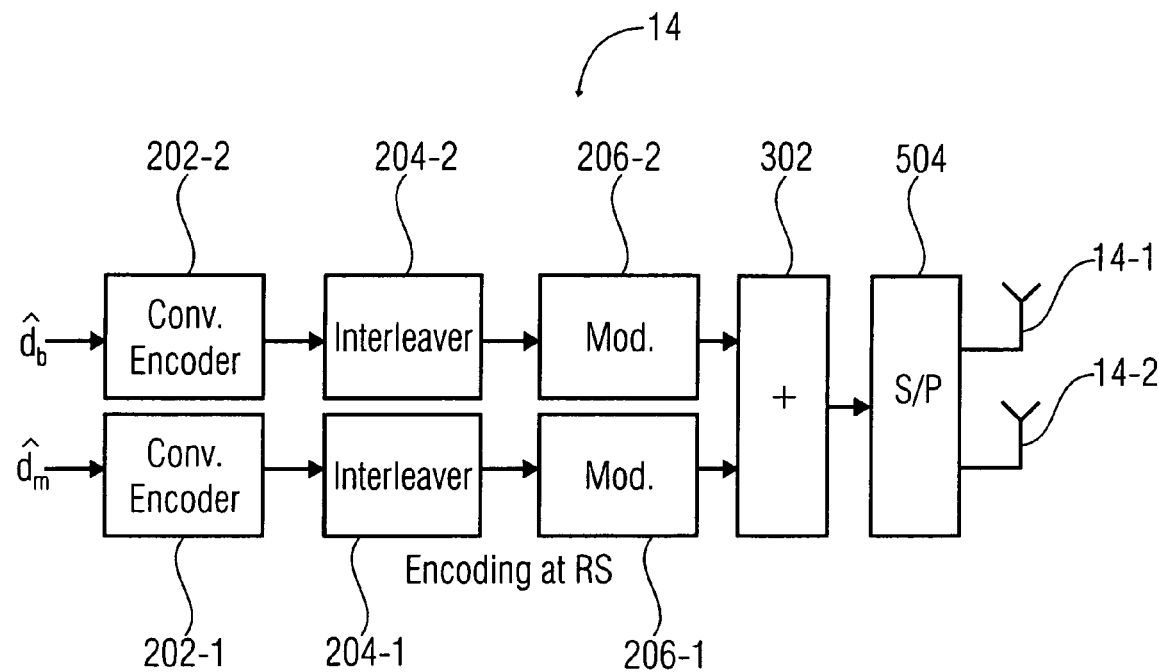
FIG. 3 shows a block diagram of an encoding process at a relay station.
Figure 4:
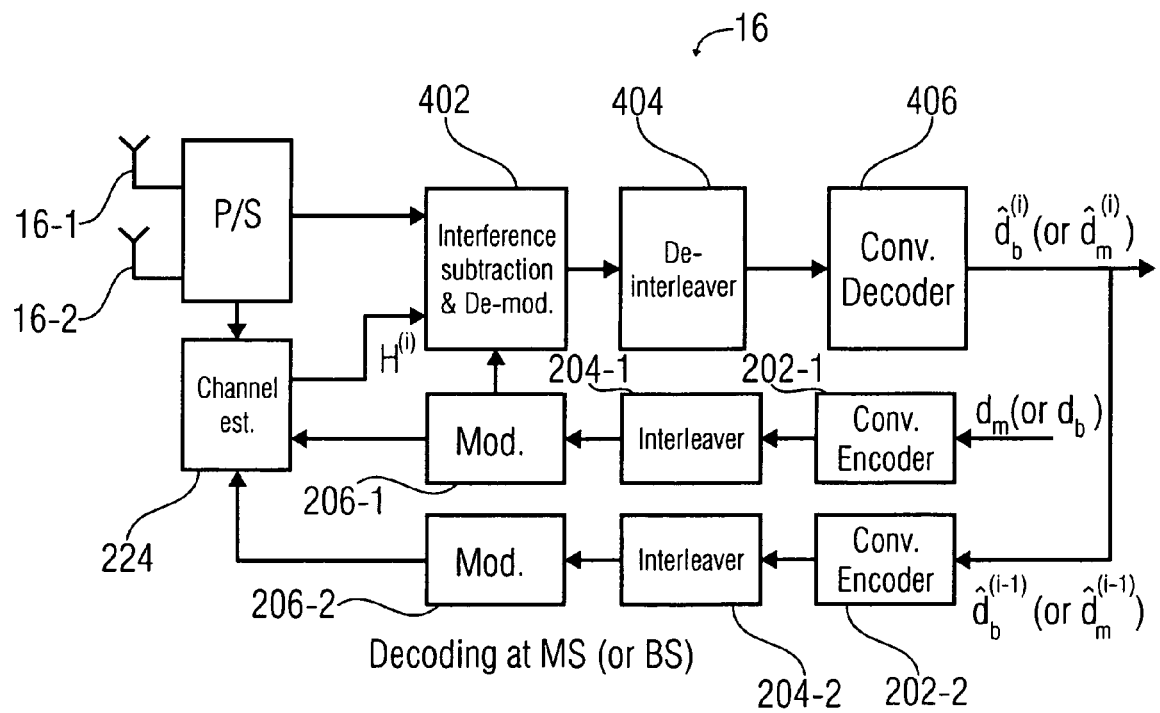
FIG. 4 shows a block diagram of a receiving and decoding procedure of received data at a mobile station or a base station according to an embodiment of the present invention.

FIG. 3 and FIG. 4 show how channel estimation and data detection can be integrated into convolutional coding/decoding in the SC scheme of two-way relaying.

At the RS 14, the MS and BS data (first and second information) decoded in the first time interval $T_1$ have to be firstly re-encoded by convolutional encoders 202-1, 202-2, then interleaved by interleavers 204-1, 204-2, modulated by modulators 206-1, 206-2 using e.g. QAM or PSK modulators and added together or superimposed in block 302. The superimposed first and second information are then serial to parallel converted in block 304 before being transmitted via the antennas 14-1, 14-2 in the second time interval $T_2$. We assume there are no pilot symbols in the RS transmission in the second time interval $T_2$.

FIG. 4 shows an example of a MS receiver device comprising a decision directed iterative channel estimator according to embodiments of the present invention.

According to embodiments of the present invention, the decision directed iterative channel estimator works as follows:

1) An initial estimate $H_4^{(1)}$ of the wireless radio channel is calculated in the channel calculator 224 using the received signal $Y_m$ and the known data corresponding to the first information $S_m$ corresponding to the self interference according to equation (10) or (25);

2) In an interference canceller 402 the first information $S_m$ corresponding to the self interference is then subtracted from the received signal $Y_m$ using the estimate $\hat{H}_4^{(i)}$ (i=1, 2, 3, ...) of the wireless radio channel $H_4$, i.e., $$Y_m - \hat{H}_4^{(i)} S_m = H_4 \hat{S}_b^{(i)} + (H_4 - \hat{H}_4^{(i)})\hat{S}_m + N_m. \quad (26)$$

The BS data symbol matrix $\hat{S}_b^{(i)}$ (i=1, 2, 3, ...) corresponding to the second information is demodulated using the estimate $\hat{H}_4^{(i)}$ (i=1, 2, 3, ...) of the wireless radio channel $H_4$ from the matrix $Y_m - \hat{H}_4^{(i)} S_m$. Here $(H_4 - \hat{H}_4^{(i)})\hat{S}_m + N_m$ is treated as noise.

The detection of the BS data symbol matrix $\hat{S}_b^{(i)}$ (i=1, 2, 3, ...) is of course not perfect due to the channel estimation error and noise. This BS data matrix corresponding to the second information is then de-interleaved in a de-interleaver 404 and decoded using a convolutional decoder 406.

3) For a next iteration (i+1) (i=1, 2, 3, ...), the decoded BS data $\hat{S}_b^{(i)}$ (i=1, 2, 3, ...) corresponding to the second information is re-encoded using a convolutional encoder 202-2, interleaved using a interleaver 204-2 and modulated using a modulator 206-2. The decoded BS data used for the (i+1)-th (i=1, 2, 3, ...) channel estimation iteration is denoted as $\hat{S}_b^{(i)}$ since it stems from the preceding iteration and is added up with $S_m$, i.e.

$$\hat{S}_r^{(i)} = \hat{S}_b^{(i)} + S_m, \quad (27)$$

where $S_r^{(i)}$ represents the i-th estimation of $S_r$. The (i+1)-th estimation $\hat{H}_4^{(i+1)}$ of the wireless radio channel $H_4$ can be calculated based on equation (9) and (24). That is, according to embodiments of the present invention $\hat{H}_4^{(i+1)}$ can be calculated based on $$\hat{H}_{4,LS}^{(i+1)} = Y_m(\hat{S}_r^{(i)})^\dagger, \quad (28)$$

for LS estimation, or calculated based on $$\hat{H}_{4,MMSE} = Y_m((\hat{S}_r^{(i)})^H R_H(\hat{S}_r^{(i)}) + \sigma_d^2 NI)^{-1}(\hat{S}_r^{(i)})^H R_H \quad (29)$$

for MMSE estimation.

4) Go to step 2) and do iterative channel estimation.

The algorithm may stop after a certain number of iterations or when the decoded BER (Bit Error Rate) does not further improve.

Since the convolutional codes correct some errors in the detected BS data $\hat{S}_b^{(i)}$ and provide a better estimation $\hat{S}_r^{(i)}$ of $S_r$ in each iteration, the estimation of wireless radio channel $H_4$ also improves in each iteration. A better estimation of channel $H_4$ also leads to less error in the data detection.

Channel Estimation in a Time Continuously Varying Channel

It was discussed how to estimate a MIMO channel when the wireless radio channel $H_4$ remains constant for a certain block of discrete time instants or time slots in the previous sections. In this section, it will be discussed how to estimate a time varying MIMO channel. The discussions are still constrained to a flat fading MIMO channel, which corresponds to one sub-carrier in OFDM systems. Without loss of generality, it is assumed the N receive antennas 16-*n* (n=1, 2, . . . , N) at the MS 16 are not correlated. We still consider how to estimate the MIMO channel of the second time interval $T_2$ from RS 14 to MS 16 at the MS receiver device 220. The discrete time received signal at the n-th receive antenna at time k can also be written as $$y_{n,k} = s_{r,k}^T h_{n,k} + n_{n,k}, \quad (30)$$

where $s_{r,k}$ is the transmit data symbol vector at RS 14 at time slot k, and $h_{n,k}$ is the (R×1) channel coefficient vector between RS 14 and the n-th MS receive antenna 16-*n*. $n_{n,k}$ represents the AWGN (Additive White Gaussian Noise) at this n-th receive antenna 16-*n*.

The transmission of a frame of K symbol vectors, $s_{r,1}, \ldots, s_{r,K}$ is considered. The received symbol sequence at the n-th receive antenna, denoted by an (K×1) vector $y_{n,k} = [y_{n,1}, \ldots, y_{n,K}]^T$, can be represented as $$y_n = S_r h_n + n_n, \quad (31)$$

where $n_n$ is an (K×1) complex Gaussian noise vector with zero mean and covariance matrix $R_n = E\{n_n n_n^H\}$. $h_n$ is an (NK×1) vector representing the channel, $h_n = [h_{n,1}^T, \ldots, h_{n,K}^T]^T$. The (K×NK) data matrix $S_r$ is defined as $$S_r = \begin{pmatrix} s_{r,1}^T & 0^T & \ldots & 0^T \\ 0^T & s_{r,2}^T & \ldots & 0^T \\ \vdots & \vdots & \ddots & \vdots \\ 0^T & 0^T & \ldots & s_{r,K}^T \end{pmatrix}. \quad (32)$$

For Rayleigh fading, the channel coefficients $h_{n,r,k}$ from the r-th RS antenna 14-*r* to the n-th MS antenna 16-*n* can be modeled as zero mean complex Gaussian random variables. If the transmit antennas are spaced sufficiently far apart, the fading is assumed to be uncorrelated across antennas. For two dimensional isotropic scattering (Jakes model), the correlation function can be expressed as $$E[h_{n_1,m_1,t_1} h^*_{n_2,m_2,t_2}] = \delta_{n_1 n_2} \delta_{m_1 m_2} J_0(2\pi f_D T_s(k_1-k_2)) \quad (33)$$

where $\delta_{n_1 n_2} = 1$ if and only if $n_1 = n_2$. $J_0$ is the zero-th order Bessel function of the first kind. $f_D$ is the Doppler frequency and $T_s$ is the sampling time interval. According to X. Deng, A. M. Haimovich, and J. Garcia-Frias, "Decision directed iterative channel estimation for MIMO systems," in Proc. IEEE Int. Conf. on Communications, vol. 4, Anchorage, Ak., May 11-15, 2003, pp. 2326-2329, The MMSE estimation of $h_n$ based on $y_n$ if $S_r$ is known can be represented as $$\hat{h}_{n,MMSE} = R_h S_r^H (S_r R_H S_r^H + R_n)^{-1} y_n, \quad (34)$$

where $R_H = E[h_n h_n^H]$. Schemes on how to estimate the channel autocorrelation matrix $R_H$ at the receiver device 220 can be found in e.g. K. J. Molnar, L. Krasny, and H. Arslan, "Doppler spread estimation using channel autocorrelation function hypotheses," WO 2001 013537, D. A. V. L. Wautelet Xavier, Herzet Cédric, "MMSE-based and EM iterative channel estimation methods," in SCVT 2003—IEEE 10th Symposium on Communications and Vehicular Technology in the Benelux, Eindhoven, The Netherlands, November 2003, and V. Srivastava, C. K. Ho, P. H. W. Fung, and S. Sun, "Robust MMSE channel estimation in OFDM systems with practical timing synchronization," in IEEE Wirel. Comm. and Netw. Conf. (WCNC), vol. 2, Atlanta, Ga., March 2004, pp. 711-716. If we just know the part of $S_m$, the simplest way to estimate the channel is that $$\hat{h}_{n,LS} = S_m^\dagger y_n. \quad (35)$$

The best linear MMSE estimator we can construct is $$\hat{h}_{n,MMSE} = R_h S_m^H (S_m^H R_H S_m + R_{S_b h} + R_n)^{-1} y_n, \quad (36)$$

where $R_{S_b h} = E[S_b h_n (h_n S_b)^H]$. $S_b$ and $S_r$ are defined similarly as in equation (32).

Figure 10:
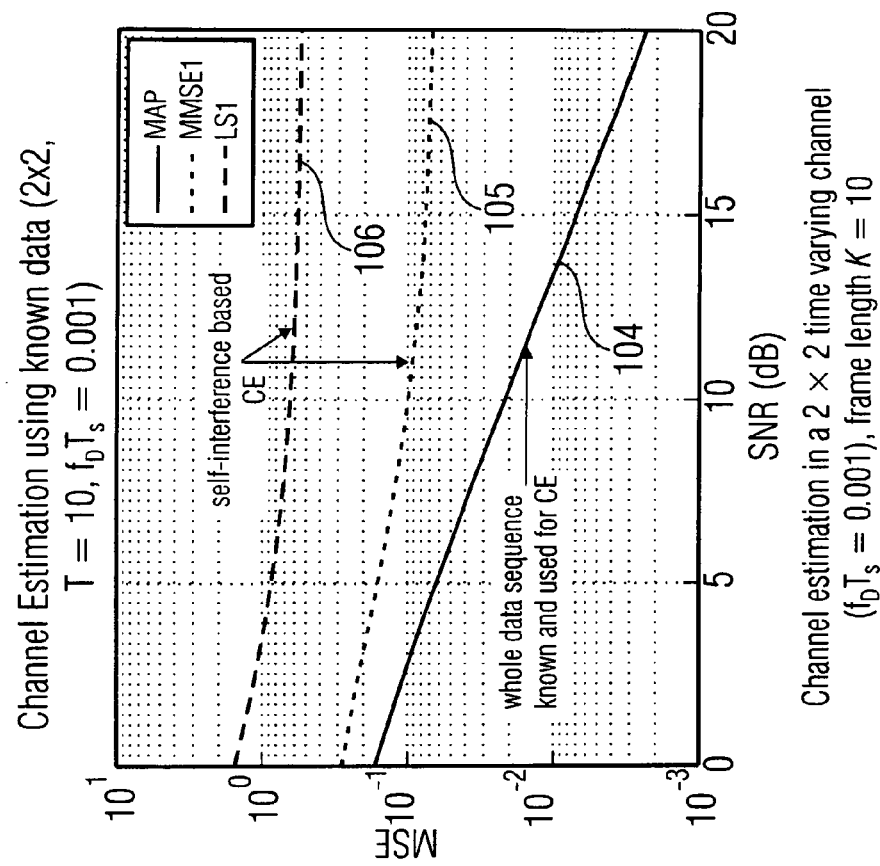
FIG. 10 shows simulation results for a channel estimation in a 2×2 time varying channel according to an embodiment of the present invention.
Figure 11:
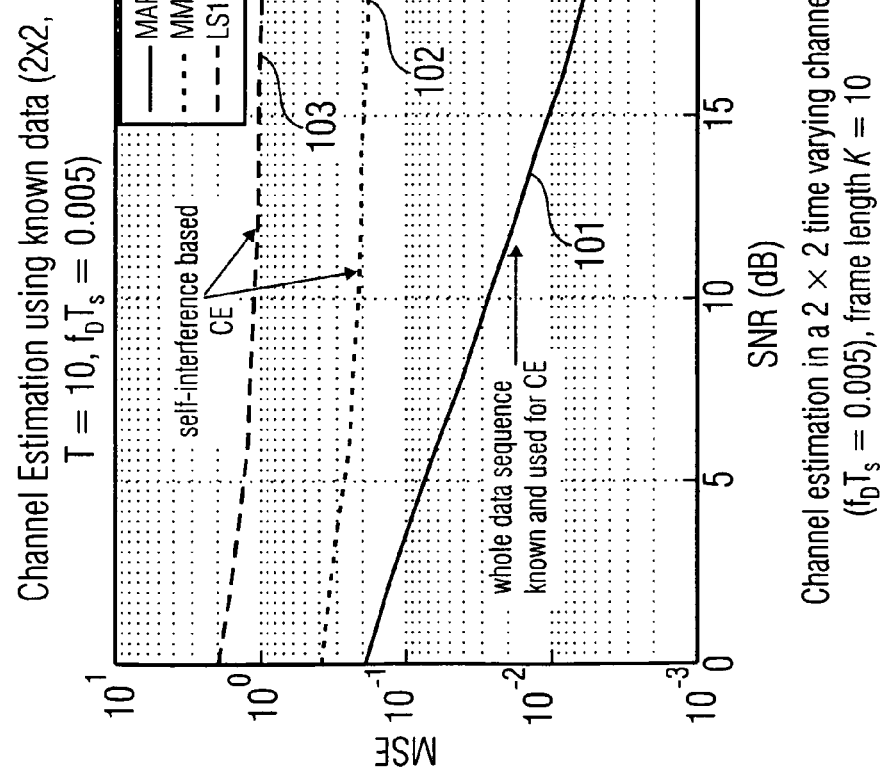
FIG. 11 shows simulation results regarding channel estimation in a 2×2 slowly time-varying channel according to an embodiment of the present invention.

FIG. 10 and FIG. 11 show the MSE performance of channel estimation in a time varying channel. We still consider a (2×2) MIMO channel. In FIG. 10, we assume $f_D T_s = 0.005$ where $f_D$ is the Doppler frequency and $T_s$ is the sampling time period. This corresponds to about 300 km/h velocity movement in a system with $f_c=5$ GHz carrier frequency, bandwidth B=20 MHz, and $N_{FFT}=64$ point FFT. The velocity v of the mobile is calculated according to $$v = \frac{f_D T_s \cdot c \cdot N_{FFT}}{B \cdot f_c}, \quad (37)$$

where c stands for the speed of light.

The channel estimation is based on 10 observations of the channel, i.e. frame length K=10. The solid lines 101, 104 represent the case that we transmit a known data sequences at the transmitter (RS 14), and we calculate the channel according to equation (34). The dashed lines 102, 103, 105, 106 represent the case that we estimate the channel just based on the self-interference according to equation (35) (lines 103, 106) and equation (36) (lines 103, 105).

Comparing FIG. 10 and FIG. 11, we can see that the channel estimation MSE is smaller if $f_D T_s = 0.001$. This corresponds to about 60 km/h velocity movement in a system with 5 GHz carrier frequency, 20 MHz bandwidth, 64 point FFT. That is, if the channel does not vary very fast we can get a more accurate estimate of the channel. Since the MMSE channel estimation using self-interference is much better than LS channel estimation, we only use MMSE channel estimation in the following in a time varying channel.

Figure 12:
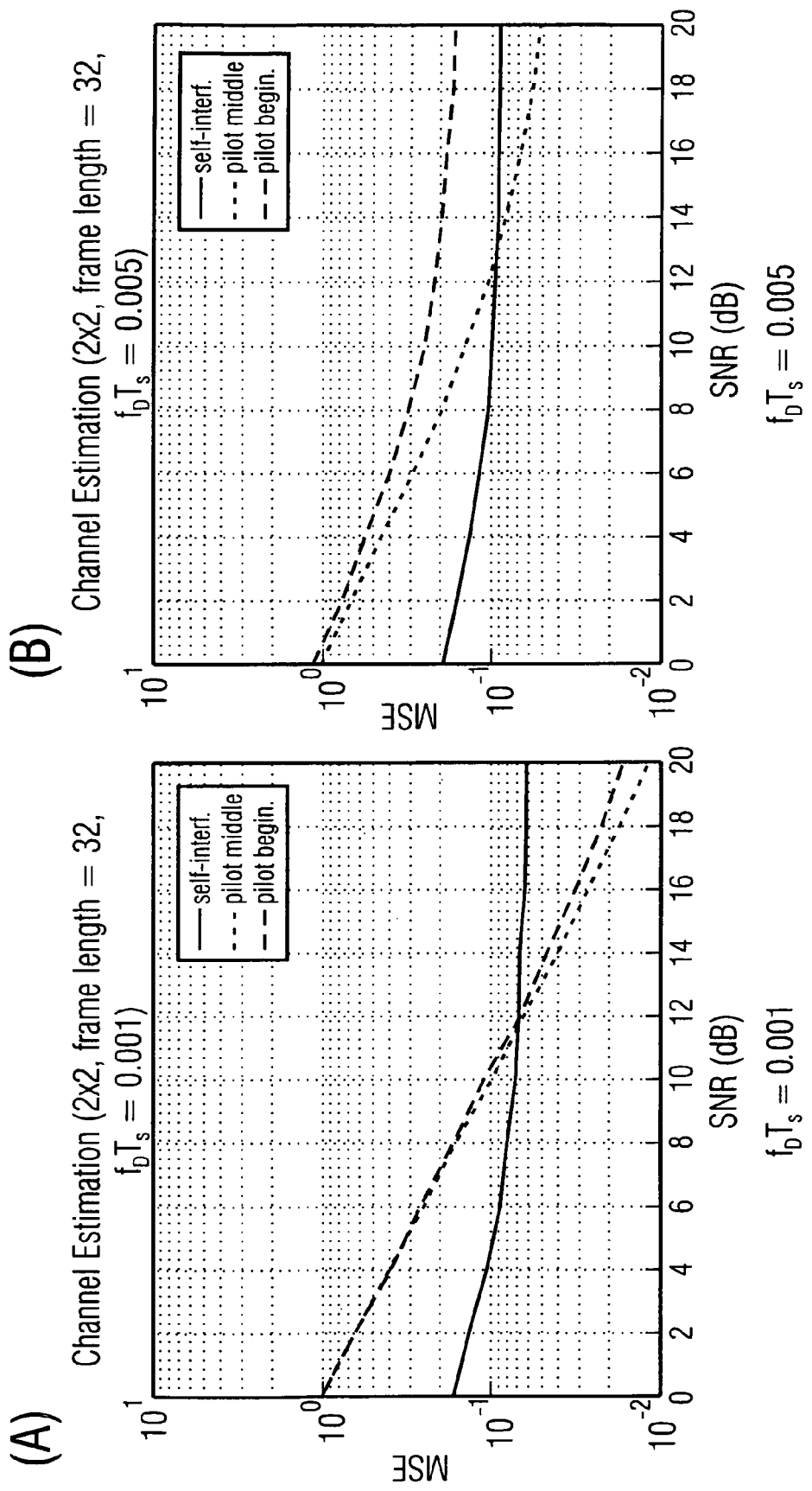
FIGS. 12a,b show simulation results for an initial channel estimation mean-square error in a time-varying channel according to embodiments of the present invention.

FIG. 12*a*,*b* show the initial channel estimation MSE in two different time varying channels. We use the MMSE method to do the first or initial iteration of the channel estimation based on self-interference. The pilot assisted channel estimation is based on one (2×2) pilot matrix transmitted at the beginning or in the middle of the transmitted frame.

FIG. 12a,b show that in a fast fading channel, the channel estimation using self-interference (solid curve) can outperform the pilot assisted channel estimation (dashed curves).

FIG. 13a,b show the initial channel estimation by using self-interference and by using pilots. As the frame length goes long, the channel estimation using pilots (dashed curves) becomes more inaccurate. But the MSE of channel estimation using self-interference (solid curve) does not change much. This is also an advantage of using self-interference according to embodiments of the present invention to estimate the channel.

Simulation Results

In this section, we present the simulation results. In particular, we compare the performance of pilot assisted channel estimation and self-interference based channel estimation according to embodiments of the present invention based on the MSE of the channel estimate and the uncoded as well as the coded BER. The pilots are placed at the beginning of transmission. The simulation setup is a two-way DF relaying system using SPC. The results given for a pilot assisted transmission are found by using only the pilots for the channel estimation, not in a way where pilots and self-interference are utilized jointly to get a first channel estimate.

BER Performance of LS Method

In this subsection, we use the LS method to estimate a block-fading channel. That is, we transmit two independent superimposed uncoded data streams at the RS 14. One stream is known at the MS 16. The channel remains constant for K discrete time instants. We compare two iterative channel estimation schemes:

1) Using pilots to get a first estimate of the channel;
2) Using the self-interference to estimate the channel without inserting pilots.

FIGS. 14a,b show the BER of the data transmission and the MSE of channel estimation errors.

We use 4QAM symbol modulation and equal power allocation. The channel remains constant for K=32 discrete time instants. At the beginning of each block of block length K, we use a short orthogonal training sequence to estimate the channel. After we get a first estimate of the channel, we use the decoded symbols to re-estimate the channel according to equation (9). We can see that the BER performance does not improve any more after three iterations. At high SNR, the BER performance is quite similar to the case when perfect CSI (Channel State Information) is available. The cost is that additional overhead in channel estimation may be used, i.e., orthogonal sequences at different antennas may be used to be transmitted at different antennas. For a (2×2) MIMO channel, the training sequences at least occupy 2 discrete time instants. That means 1/16=6.25% of the bandwidth is used for channel estimation in the considered case where the channel is constant for K=32 discrete time instants or time slots. As the number of antennas increases, the channel estimation overhead will also increase.

In comparison, FIGS. 15a,b show the BER and MSE for the case when we estimate the channel only based on the self-interference.

For a short block length of 128 bits and 4QAM modulation, 32 time slots remain constant for the channel. As we can see, in the first iteration the channel estimation is much worse than the channel estimation based on the pilots. This is due to the remaining estimation error of the unknown data term in equation (15). After we get a first estimate of the channel, we use the decoded symbols to re-estimate the channel according to equation (9). The BER performance converges after 6 iterations. It loses about 2 dB when BER is $10^{-2}$ compared to the case when perfect CSI is available at receiver device.

There is another performance bound "PerData". This is the performance bound when the transmitted data block $S_r$ is perfectly known by a "Genie", but this knowledge is only used for channel estimation (according to equation (9)). The data is decoded based on this channel estimation. Using the estimated channel, we calculate the MSE and the decoded data BER. We can see that the BER of "PerData" case is similar as the case when perfect CSI is known.

As we know, the performance without pilots improves if the channel coherence time allows to transmit longer block lengths while the channel remains constant.

FIGS. 16a,b show the BER of the data transmission and the MSE of channel estimation errors using a short pilot sequence at the beginning of each block.

We use 4QAM symbol modulations and equal power allocation. Here the channel remains constant for 256 time slots. Compared with FIG. 14, we can see its BER performance does not change much. This is because the initial estimation is used for the whole block. We assume the channel remains constant for 256 time slots. Since each antenna transmits two 4QAM symbols at each time slot, 1024 bits are transmitted in each block.

FIGS. 17a,b show the BER of the data transmission and the MSE of channel estimation errors using only the self-interference without pilots.

Again, the channel remains constant for 256 time slots. We can see the BER performance is nearly the same as the perfect CSI case. This is because the channel estimation according to equation (9) becomes better and better as the length of the block becomes longer.

BER Performance of MMSE Method

In this subsection, we use the MMSE method to estimate a block-fading channel. That is, we transmit two independent superimposed uncoded data streams at the RS 14. One stream is known at the MS 16. The channel remains constant for K time slots. We compare two iterative channel estimation schemes:

1) Using pilots to get a first estimate of the channel;
2) Using the self-interference to estimate the channel without inserting pilots.

FIGS. 18a,b show simulation results for pilot assisted iterative MMSE channel estimation in block fading channel (K=32).

FIGS. 19a,b show simulation results of iterative MMSE channel estimation, according to embodiments of the present invention, using self-interference in block fading channel (K=32).

FIGS. 18a,b and FIG. 19a,b show the BER of data transmission and MSE of channel estimation errors when MMSE method is applied for block fading channel. We observe similar performance as the LS case in FIGS. 14a,b and FIGS. 15a,b. In general, the MMSE method entails more complicated calculation to estimate the channel. Thus the LS method is more economical in our channel estimation of block fading channels.

FIGS. 20a,b show simulation results for pilot assisted iterative MMSE channel estimation in block fading channel (K=256).

FIGS. 21a,b show simulation results for iterative MMSE channel estimation, according to embodiments of the present invention, using self-interference in block fading channel (K=256).

Assuming the channel remains constant for 256 time slots, the BER and MSE performance for MMSE channel estimation are shown in FIGS. 20a,b and FIGS. 21a,b. They are quite similar as the LS case in FIGS. 16a,b and FIGS. 17a,b.

Channel Estimation in a Time-Varying Channel, Jakes Model

In this subsection, we want to estimate a time-varying channel as described before. We transmit two independent superimposed uncoded data streams at the RS 14. One stream is known at the MS 16. The frame length of data stream is K time slots. We compare two iterative channel estimation schemes:

1) Using pilots to get a first estimate of the channel;

2) Using the self-interference to estimate the channel without inserting pilots.

FIGS. 22a,b show simulation results for pilot assisted iterative channel estimation in time varying channel ($f_D T_s$=0.001).

FIGS. 23a,b show simulation results for iterative MMSE channel estimation, according to embodiments of the present invention, using self-interference in time varying channel ($f_D T_s$=0.001).

Now we consider the time varying channel. We used a Jakes model according to equation (33). FIGS. 22a,b and FIGS. 23a,b consider the case that $f_D T_s$=0.001. This corresponds to about 60 km/h velocity movement in a system with 5 GHz carrier frequency, 20 MHz bandwidth, and 64 point FFT. This can be considered e.g. as in IEEE 802.11n, "IEEE 802.11n pre-draft," IEEE 802.11n Task Group, pre-release. The channel estimation by just using self-interference is worse than using pilots if $f_D T_s$=0.001. This is because the channel nearly remains constant in this case, using pilots can get a good estimate of the channel in the first estimation while the first estimation using self-interference is not as good.

FIGS. 24a,b show simulation results for pilot assisted iterative channel estimation in time varying channel ($f_D T_s$=0.005).

FIGS. 25a,b show simulation results for iterative MMSE channel estimation, according to embodiments of the present invention, using self-interference in time varying channel ($f_D T_s$=0.005).

FIGS. 24a,b and FIG. 25a,b consider the case that $f_D T_s$=0.005. The velocity of the mobile user is about 300 km/h. In this case, the channel varies faster. The channel estimation using self-interference is a little better than the pilot estimation. This is because the superimposed self-interference traces the channel variation while pilot cannot. This is one advantage of channel estimation using self-interference.

FIGS. 26a,b show simulation results for pilot assisted iterative LS channel estimation with FEC (RS perfect decoding, Rayleigh channel), channel remains constant for K=32 time slots.

FIGS. 27a,b show simulation results for iterative LS channel estimation, according to embodiments of the present invention, with FEC using self-interference (RS perfect decoding, Rayleigh channel), channel remains constant for K=32 time slots.

As we can see, even though the BER performance of the decoded data will improve after each iteration, they converge to a certain limit. One way to improve the channel estimation is to use FEC. In our simulation, we used an rate ½ UMTS convolutional encoder with constraint length of 9 bits and a Viterbi decoder at the receiver side. We used random interleavers and we set the state of the random interleavers at BS/MS and RS encoders to be different. Each interleaver has the length of 6400 bits. The simulation parameters are summarized in Table 1 as follows:

TABLE 1

| | |
|---|---|
| rate | ½ |
| constraint length | 9 bits |
| generator polynomial | (561, 753) |
| traceback length | 45 |
| interleaver type | random |
| interleaver length | 6400 |

We assumed the channel remains constant for K=32 time slots. Each OFDM symbol uses 50 subcarriers to transmit data. Each subcarrier fades independently. The channel is block-fading channel in each subcarrier. FIG. 26 shows the BER and MSE performance when we use a short pilot at each subcarrier to estimate the channel. This wastes at least 1/16 of the bandwidth. In FIG. 27, we estimated the channel using the self-interference. It has similar performance as the case when we use the pilot. When SNR is above 12 dB, the BER performance is identical to the case when perfect CSI is available. On the other hand, we achieve the "PerData" bound (using perfect data for channel estimation) after four iterations when SNR is above 12 dB.

FIGS. 28a,b show simulation results for iterative the MMSE channel estimation, according to embodiments of the present invention, with FEC (Forward Error Correction) using self-interference (RS perfect decoding, Rayleigh channel), channel remains constant for K=32 time slots.

FIG. 28 shows the performance when the MMSE method is employed to estimate the channel using self-interference. We observe similar performance as FIG. 27. Again, we conclude that the LS method leads to a comparable performance at a lower computational complexity.

FIGS. 29a,b show simulation results for pilot assisted iterative channel estimation with FEC (RS perfect decoding, $f_D T_s$=0.001), the hop between BS 12 and RS 14 has $SNR_{BS}$=20 dB; i.e. we consider the case that the distance between BS and RS is fixed and we change the distance between RS and MS to plot the BER curve.

Figure 30:
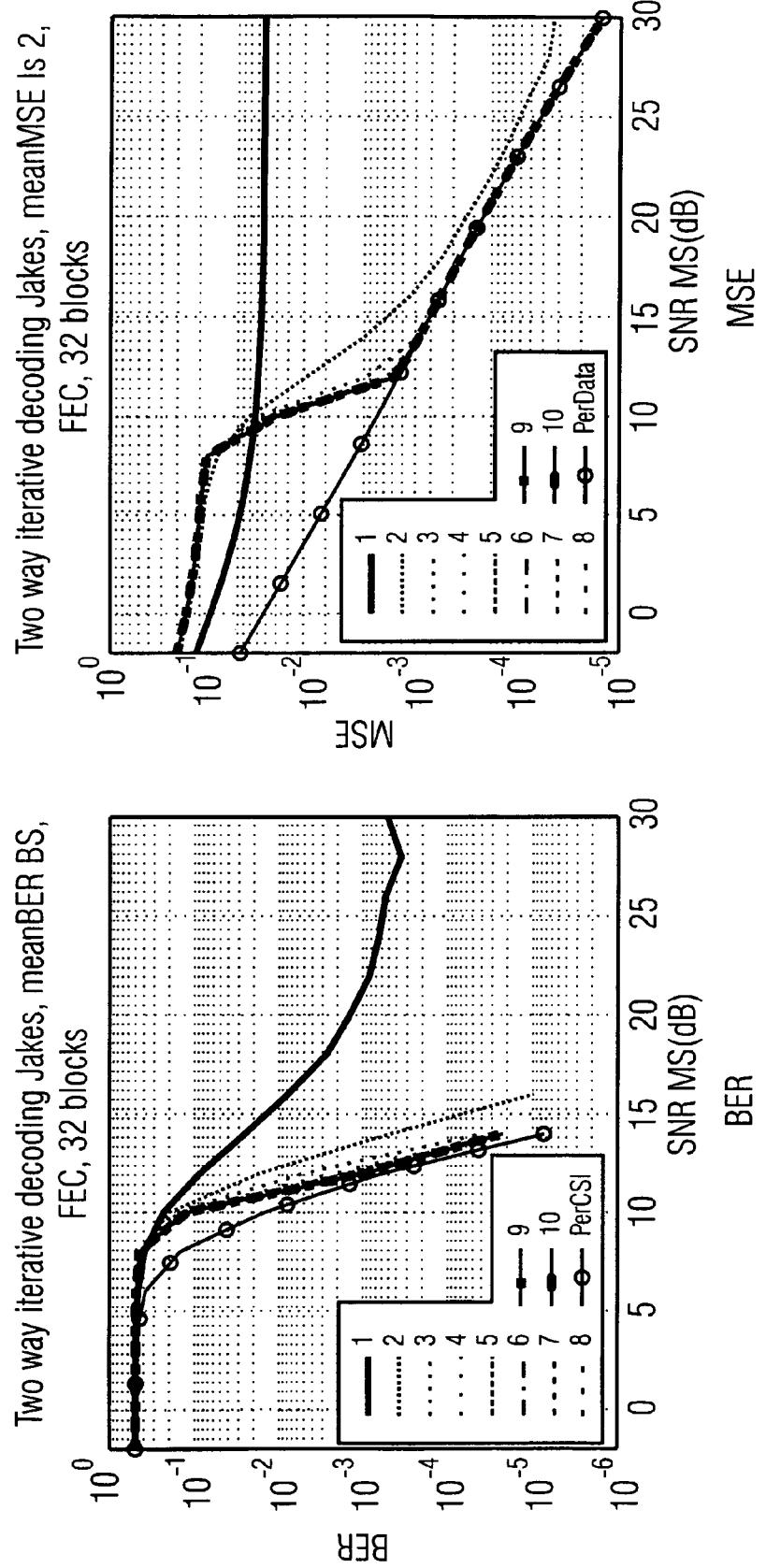
FIGS. 30a,b show simulation results for self-interference assisted iterative channel estimation with forward error correction according to an embodiment of the present invention (time varying-channel)

FIGS. 30a,b show simulation results for self-interference assisted iterative channel estimation with FEC, according to embodiments of the present invention (RS perfect decoding, $f_D T_s$=0.001), the hop between BS 12 and RS 14 has $SNR_{BS}$=20 dB.

Using the same convolutional encoder and decoder as in previous subsection, we can also perform channel estimation in a time-varying channel. FIGS. 29a,b and FIGS. 30a,b compare the BER and MSE performance of the pilot-aided channel estimation and the self-interference aided channel estimation when the RS 14 perfectly decodes the received data from the BS 12 and MS 16 in the first time interval. Here $f_D T_s$ is 0.001. The BS to RS hop has fixed SNR of $SNR_{BS}$=20 dB. FIGS. 29a,b and FIGS. 30a,b depict the BER and MSE of the received data at MS 16. The BER performance is compared with the BER decoding performance with perfect channel knowledge ("PerCSI"), and the MSE performance is compared with the MSE performance with perfect data estimated channel ("PerData").

We can see the performances of pilot-aided channel estimation and the self-interference aided channel estimation are very similar, which is also similar with the performance of channel estimation in block-fading channel depicted in the previous subsection. This is because when $f_D T_s$=0.001, the channel almost remains constant.

FIGS. 31a,b show simulation results for pilot assisted iterative channel estimation with FEC (RS perfect decoding, $f_D T_s$=0.005), the hop between BS 12 and RS 14 has $SNR_{BS}$=20 dB.

FIGS. 32a,b show simulation results for self-interference assisted iterative channel estimation with FEC, according to embodiments of the present invention (RS perfect decoding, $f_D T_s=0.005$), the hop between BS 12 and RS 14 has $SNR_{BS}=20$ dB.

FIGS. 31a,b and FIGS. 32a,b compare the BER and MSE performance of the pilot-aided channel estimation and the self-interference aided channel estimation when $f_D T_s=0.005$. Now the channel varies quickly. We can see that after 10 iterations, the BER of the pilot-aided channel estimation has a gap of about 5 dB to the BER using perfect channel knowledge. When we use self-interference to estimate the channel, the maximum gap decreases to about 2 dB. This means that channel estimation using self-interference, according to embodiments, can have superior performance compared to pilot-aided channel estimation in a fast varying channel.

FIGS. 33a,b show BER performance of iterative channel estimation with FEC using self-interference, according to embodiments of the present invention (First hop Rayleigh fading), channel remains constant for K=32 time slots, the hop between BS 12 and RS 14 has $SNR_{BS}=20$ dB.

FIGS. 34a,b show BER MSE performance of iterative channel estimation with FEC using self-interference, according to embodiments of the present invention (first hop Rayleigh fading), channel remains constant for K 32 time slots, the hop between BS 12 and RS 14 has $SNR_{BS}=20$ dB.

In the previous subsections, we assumed the RS 14 perfectly decodes the received data in the first time interval, i.e. the self-interference is perfectly known at the receivers. Now we remove this assumption and consider channel estimation in a real two-way relaying cellular environment. As discussed in the previous deliverable, the distance between BS 12 and RS 14 is fixed, and the received RS signal SNR at BS 12 is fixed at 20 dB. We change the distance between RS 14 and MS 16, and the received signal SNR at MS 16 also varies accordingly. We also assume the channels remain constant for K=32 time slots.

In FIGS. 33a,b and FIGS. 34a,b, we assume the BS-RS and RS-MS channels are Rayleigh fading channels. In this case, channel estimation based on self-interference works pretty well in middle to high SNR regions. We have to distinguish between the BER of the MS data (decoded at BS in the second time interval, c.f. FIG. 33a) and the BER of the BS data (decoded at MS in the second time interval FIG. 33b).

If we compare FIG. 33b and FIG. 34b with the corresponding FIG. 27a and FIG. 27b in the previous subsection, we can see that the performance is quite similar (note the SNR range is different). The MS 16 achieves the same BER as using perfect CSI for decoding when the SNR at MS 16 is above 12 dB after 5 iterations. The higher estimation error below 10 dB in FIG. 34b is due to the performance of the convolutional decoder at low SNR.

FIGS. 35a,b show a comparison of MS data BER performance of iterative channel estimation with FEC in time-varying channels, according to embodiments of the present invention ($f_D T_s=0.001$), the hop between BS and RS has $SNR_{BS}=20$ dB.

FIGS. 36a,b show a comparison of BS data BER performance of iterative channel estimation with FEC in time-varying channels, according to embodiments of the present invention ($f_D T_s=0.001$), the hop between BS and RS has $SNR_{BS}=20$ dB.

In this subsection, we are interested in the performance of self-interference aided channel estimation in the time-varying channel in a two-way relaying system. In order to make a fair comparison with the block-fading case (described in the previous subsection), we use a block-fading channel model for the first time interval of two-way relaying, which is the same as in the previous subsection. The second time interval is assumed to be time-varying, which depends on the parameter $f_D T_s$. Here the BER performance is calculated according to the data received after the whole two time intervals of two-way relaying, i.e., we considered the decoding errors at the relay 14 here.

FIGS. 35a,b and FIGS. 36a,b show the BER performance in the time varying channel ($f_D T_s=0.001$). We estimate the channel every $32^{nd}$ time slot, and we use 2 time slots to send the pilot sequence in the "Pilot" case. When we use pilots, the first iteration can already give us a good channel estimate as shown in FIG. 36b because the RS 14 has high SNR to BS 12 ($SNR_{BS}=20$ dB) and the channel almost remains constant now. After 10 iterations, the BER performances for MS data in FIGS. 35a,b converge to the BER performance when perfect channel knowledge is available "PerCSI").

In FIG. 36a, the BER performance of BS data using self-interference estimated channel has a maximum gap of 2 dB to the "PerCSI" case and the gap is decreasing in high MS SNR. Similar performance results are observed in FIG. 36b. So when the channel does not very fast ($f_D T_s=0.001$), both pilot-aided channel estimation and self-interference aided channel estimation have similar performances.

FIGS. 37a,b show a comparison of MS data BER performance of iterative channel estimation with FEC in time-varying channels ($f_D T_s=0.005$), according to embodiments of the present invention, the hop between BS and RS has $SNR_{BS}=20$ dB.

FIGS. 38a,b show a comparison of BS data BER performance of iterative channel estimation with FEC in time-varying channels ($f_D T_s=0.005$), according to embodiments of the present invention, the hop between BS and RS has $SNR_{BS}=20$ dB.

FIGS. 37a,b and FIGS. 38a,b show the BER performance in the fast varying channel ($f_D T_s=0.005$). The bumpy behavior of some iterations in FIG. 37b is due to the number of simulation runs. But on the other hand, we can see that the pilot-aided channel estimation converges slowly. Self-interference aided channel estimation has superior performance compared to pilot aided channel estimation in this case (using 2 time slots to estimate the channel).

In FIG. 37a, the BER performance of MS data in the case of the self-interference estimated channel converges to the BER performance when perfect channel knowledge is available "PerCSI") after two iterations. But for the pilot-aided channel estimation case in FIG. 37b, it converges to the "PerCSI" case after 5 iterations.

In FIG. 38a, the BER performance of BS data using the self-interference estimated channel has a maximum gap of 3 dB to the "PerCSI" case and the gap is decreasing in high MS SNR, while the gap is about 5 dB for the pilot-aided channel estimation in FIG. 38b. This is because short pilot sequences cannot capture the changing characteristics in the fast varying channel when $f_D T_s=0.005$. We can use longer pilot sequences, but at the cost of more bandwidth. Thus self-interference based iterative channel estimation shows advantages compared to pilot based channel estimation in fast-varying channels in our simulation environment.

To summarize, embodiments of the present invention provide a concept to estimate the second time interval channel using the self-interference in superposition coding based two-way relaying systems. The main idea is to use the self-interference as superimposed training sequence. We use the self-interference to get a first estimation of channel. We can improve our channel estimation in an iterative decision-directed process. We considered both block-fading channels and time varying channels. In block-fading channels, the BER performance based on self-interference estimated channel is comparable to the performance based on the pilot estimated channel. Furthermore, if the block length is long enough, we can get perfect estimation of the channel at least in high SNR. In a time-varying channel, using self-interference to estimate the channel provides some advantages since the time-multiplexed pilots can not track the channel variation or large amount of pilots have to be inserted in the data transmission.

In order to further improve the performance, we also considered using forward-error correcting codes (e.g. convolutional codes). The convolutional codes can improve the iterative channel estimation because some decoded data will be corrected due to the strong error-correcting capability of FEC in each iteration. This will lead to a better channel estimation in the next iteration, and the improved channel estimation will further improve the performance in decoding the data. Our simulation results show that the performance of channel estimation using self-interference can be greatly improved. On the other hand, the BER performance by just using self-interference is similar as that by using pilots.

The advantage to use self-interference for channel estimation, according to embodiments of the present invention, is that it can be used to improve the pilot based channel estimation if used together with pilots. In fast fading situations, channel estimation according to embodiments of the present invention shows advantages compared to pilot assisted schemes, because the self-interference can be exploited as a superimposed pilot sequence that tracks the channel variations. In cases where we have quite short bursts (but long enough to allow for self-interference based channel estimation), channel estimation according to embodiments of the present invention is an attractive approach because the use of pilots may lead to prohibitive overhead.

The second phase or time interval of two-way DF (decode-and-forward) relaying systems based on superposition coding was considered. Both nodes or terminals receive a linear superposition of unknown (but desired) signals and known self-interference. The intension of utilizing self-interference for the channel estimation in two way relaying may be seen as follows:

The use of self-interference may reduce the amount of dimensions which have to be spent for pilot signals, and thus may increase the spectral efficiency.

Assuming a system where pilots are placed in the beginning of each transmitted frame, self-interference might be used for tracking the temporal variations of the channels.

Assuming an OFDM (orthogonal frequency division multiplexing) system, usually several subcarriers are used exclusively for pilots. The channel coefficients of the other subcarriers are estimated via interpolation over the frequency domain. In this case self-interference may increase the performance of the interpolation in the frequency domain.

In particular, it should be understood that depending on the circumstances, inventive methods for operating a transponder may also be implemented in software. Implementation may occur on a digital storage medium, in particular a disc, a DVD or a CD with electronically readable control signals which can interact with a programmable computer system such that the respective method is executed. Generally, the invention thus also consists in a computer program product with a program code stored on a machine-readable carrier for performing the inventive method, when the computer program product runs on a PC and/or a microcontroller. In other words, the invention may thus be realized as a computer program with a program code for performing the method when, the computer program runs on a computer and/or a microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for estimating a wireless radio channel from a relay station to a first terminal, wherein the first and a second terminal transmit first and second information to the relay station in a first time interval and the relay station transmits a superposition of the first information and the second information to the first and second terminal in a second time interval subsequent to the first time interval, the apparatus comprising:

a receiver for receiving, in the second time interval, a signal comprising the superposition of the first information and the second information;

a storage for storing the first information transmitted in the first time interval; and a channel calculator for calculating the wireless radio channel using the received signal and the stored first information as pilot information for the received signal.

2. The apparatus according to claim 1, wherein the storage is adapted to store useful data corresponding to the first information in the first time interval, and wherein the apparatus is adapted to use the stored useful data as an input for the channel calculator in the subsequent second time interval.

3. The apparatus according to claim 2, wherein the useful data corresponding to the first information of the first time interval is independent of useful data corresponding to first information transmitted by the first terminal in a time interval subsequent to or preceding the first time interval.

4. The apparatus according to claim 1, wherein the channel calculator is adapted to calculate an estimate of the wireless radio channel using the received signal, the stored first information and additional predetermined pilot information received from the relay station.

5. The apparatus according to claim 1, wherein the channel calculator is adapted to determine the wireless radio channel based on $$\hat{H}_{LS} = Y_m S_m^\dagger,$$

wherein $\hat{H}_{LS}$ denotes an (N×R) channel matrix comprising (N×R) channel coefficients corresponding to the wireless radio channel, wherein N denotes a number of receiver antennas and R denotes a number of relay station antennas, wherein $Y_m$ denotes an (N×K) received signal matrix comprising (N×K) received signal samples at the N receiver antennas from K subsequent symbols of the first transmission time interval, and wherein $S_m$ denotes a (R×K) symbol matrix comprising data symbols corresponding to the first information transmitted to the receiver device by the relay station.

6. The apparatus according to claim 1, wherein the channel calculator is adapted to determine the wireless radio channel based on $$\hat{H}_{MMSE} = Y_m (S_m^H R_H S_m + R_{S_bH} + \sigma_d^2 NI)^{-1} S_m^H R_H,$$

wherein $\hat{H}_{MMSE}$ denotes an (N×R) channel matrix comprising (N×R) channel coefficients corresponding to the wireless radio channel, wherein N denotes a number of receiver antennas and R denotes a number of relay station antennas, wherein $Y_m$ denotes an (N×K) received signal matrix comprising (N×K) received signal samples at the N receiver antennas from K subsequent symbols of the first transmission time interval, wherein $S_m$ denotes a (R×K) symbol matrix comprising data symbols corresponding to the first information transmitted to the receiver device by the relay station, wherein $R_H$ corresponds to a channel auto-covariance matrix, and wherein $R_{S_b H}$ corresponds to an expected value of $S_b^H R_H S_b$ with $S_b$ corresponding to a symbol matrix comprising data symbols corresponding to the second information.

7. The apparatus according to claim 5, wherein the symbol matrix comprising data symbols corresponding to the first information further comprises data symbols corresponding to predetermined pilot symbol sequences sent from at least one relay station antenna, such that a plurality of pilot symbol sequences from different relay station antennas are mutually orthogonal to each other.

8. The apparatus according to claim 1, wherein the channel calculator is adapted to iteratively calculate estimates of the wireless radio channel using the received signal, the stored first information and estimates of the second information from the second terminal in a plurality of iterations.

9. The apparatus according to claim 8, wherein an initial estimate of the wireless radio channel is calculated using the received signal and the stored first information.

10. The apparatus according to claim 8, wherein the channel calculator comprises an interference canceller, which is adapted to subtracted the stored first information from the received signal using a previously calculated estimate of the wireless radio channel to achieve an interference cancelled received signal based on $$Y_m - \hat{H}_4^{(i)} S_m.$$

11. The apparatus according to claim 10, wherein the receiver device is adapted to determine estimates of the second information from the second terminal based on the interference cancelled received signal.

12. The apparatus according to claim 8, wherein the channel calculator is adapted to compute an (i+1)-th estimate of the wireless radio channel based on the received signal, the stored first information and an i-th estimate of the second information from the second transmitter.

13. A wireless communications system, comprising:
a first terminal adapted to transmit first information in a first time interval, and to store the transmitted first information;
a second terminal adapted to transmit second information in the first time interval;
a relay station adapted to receive the first and second information in the first time interval, and to transmit a signal comprising a superposition of the received first and second information in a second time interval,
wherein the first terminal comprises an apparatus for estimating a wireless radio channel from the relay station to the first terminal, the apparatus comprising
a receiver for receiving a received version of the signal comprising the superposition of the received first and second information; and
a channel calculator for calculating the wireless radio channel using the received version of the signal and the stored first information as pilot information for the received signal.

14. A method for estimating a wireless radio channel from a relay station to a first terminal, wherein the first and a second terminal transmit first and second information to the relay station in a first time interval and the relay station transmits a superposition of the first information and the second information to the first and second terminal in a second time interval subsequent to the first time interval, the method comprising:
storing the first information transmitted from the first terminal in the first time interval;
receiving, in the second time interval, a signal comprising the superposition of the first information and the second information; and
calculating the wireless radio channel using the received signal and the stored first information as pilot information for the received signal.

15. A computer program for performing the method for estimating a wireless radio channel from a relay station to a first terminal, wherein the first and a second terminal transmit first and second information to the relay station in a first time interval and the relay station transmits a superposition of the first information and the second information to the first and second terminal in a second time interval subsequent to the first time interval, the method comprising:
storing the first information transmitted from the first terminal in the first time interval;
receiving, in the second time interval, a signal comprising the superposition of the first information and the second information; and
calculating the wireless radio channel using the received signal and the stored first information as pilot information for the received signal,
when the computer program is executed on a computer and/or microcontroller.

* * * * *